(12) United States Patent
Omatsu et al.

(10) Patent No.: US 12,097,996 B2
(45) Date of Patent: Sep. 24, 2024

(54) CONTAINER, METHOD FOR MANUFACTURING CONTAINER, AND CHEMICAL LIQUID STORAGE BODY

(71) Applicant: FUJIFILM Corporation, Tokyo (JP)

(72) Inventors: Tadashi Omatsu, Haibara-gun (JP); Tetsuya Kamimura, Haibara-gun (JP); Tetsuya Shimizu, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 529 days.

(21) Appl. No.: 16/710,618

(22) Filed: Dec. 11, 2019

(65) Prior Publication Data

US 2020/0115105 A1 Apr. 16, 2020

Related U.S. Application Data

(63) Continuation of application No. PCT/JP2018/026718, filed on Jul. 17, 2018.

(30) Foreign Application Priority Data

Jul. 18, 2017 (JP) ................................ 2017-139022
Jul. 13, 2018 (JP) ................................ 2018-133571

(51) Int. Cl.
 *B65D 25/14* (2006.01)
 *B08B 9/08* (2006.01)
 *B65D 1/16* (2006.01)

(52) U.S. Cl.
 CPC ................ *B65D 25/14* (2013.01); *B08B 9/08* (2013.01); *B65D 1/16* (2013.01); *B08B 2209/08* (2013.01)

(58) Field of Classification Search
 CPC ............ B65D 25/14; B65D 1/16; B08B 9/08; B08B 2209/08
 See application file for complete search history.

(56) References Cited

U.S. PATENT DOCUMENTS

| | | | | |
|---|---|---|---|---|
| 3,136,747 A * | 6/1964 | Bonner | ................ | C08F 110/02 502/154 |
| 3,793,263 A * | 2/1974 | Morris | .................... | C08F 10/00 526/98 |
| 6,225,424 B1 * | 5/2001 | Nishikawa | ............ | C08F 297/08 524/451 |
| 2009/0230132 A1 | 9/2009 | Takedutsumi et al. | | |
| 2016/0089622 A1 | 3/2016 | Takashima et al. | | |
| 2018/0294373 A1 | 10/2018 | Ishikawa et al. | | |

FOREIGN PATENT DOCUMENTS

| | | |
|---|---|---|
| JP | 10-000436 A | 1/1998 |
| JP | 11-246714 A | 9/1999 |
| JP | 2001-284309 A | 10/2001 |
| JP | 2007-152712 A | 6/2007 |
| JP | 2008-007153 A | 1/2008 |
| JP | 2008-110940 A | 5/2008 |
| JP | 2008-192641 A | 8/2008 |
| JP | 2009-138122 A | 6/2009 |
| JP | 2010-182754 A | 8/2010 |
| JP | 2013-249094 A | 12/2013 |
| JP | 2015-101680 A | 6/2015 |
| JP | 2015-183130 A | 10/2015 |
| JP | 2016-071020 A | 5/2016 |
| JP | 2017-68262 A | 4/2017 |
| WO | 2017/111169 A1 | 6/2017 |
| WO | 2017099121 A1 | 6/2017 |

OTHER PUBLICATIONS

Decision of Refusal dated Jun. 15, 2021 from the Japanese Patent Office in JP Application No. 2019-531035.
International Search Report dated Sep. 25, 2018, issued by the International Searching Authority in application No. PCT/JP2018/026718.
Written Opinion dated Sep. 25, 2018, issued by the International Searching Authority in application No. PCT/JP2018/026718.
International Preliminary Report on Patentability dated Jan. 21, 2020, issued by the International Bureau in application No. PCT/JP2018/026718.
Communication issued Sep. 27, 2021 by the Korean Patent Office in application No. 10-2019-7035617.
Communication issued Dec. 22, 2020 by the Japanese Patent Office in application No. 2019-531035.
Communication dated Apr. 26, 2022 from the Korean Intellectual Property Office in Application No. 10-2019-7035617.

* cited by examiner

*Primary Examiner* — Michael C Miggins
(74) *Attorney, Agent, or Firm* — Sughrue Mion, PLLC

(57) ABSTRACT

A container has a base material and a coating layer which is disposed on at least a portion of the base material, contains a composition containing at least one kind of metal component selected from the group consisting of Ti, Al, Mg, Zr, Hf, Fe, Ni, Sn, Zn, Cr, and Mo, and has a thickness equal to or greater than 50 μm. In a case where the composition contains one kind of metal component, a ratio RCAs calculated by CA1s/CA2s is less than 1.0. Alternatively, in a case where the composition contains two or more kinds of metal components, in at least a portion of the coating layer, an average of RCAs determined for each of two or more kinds of the metal components is less than 1.0.

4 Claims, No Drawings

CONTAINER, METHOD FOR MANUFACTURING CONTAINER, AND CHEMICAL LIQUID STORAGE BODY

CROSS-REFERENCE TO RELATED APPLICATIONS

This application is a Continuation of PCT International Application No. PCT/JP2018/026718, filed on Jul. 17, 2018, which claims priority under 35 U.S.C. § 119(a) to Japanese Patent Application No. 2017-139022, filed on Jul. 18, 2017 and Japanese Patent Application No. 2018-133571, filed on Jul. 13, 2018. Each of the above application(s) is hereby expressly incorporated by reference, in its entirety, into the present application.

BACKGROUND OF THE INVENTION

1. Field of the Invention

The present invention relates to a container, a method for manufacturing a container, and a chemical liquid storage body.

2. Description of the Related Art

At the time of manufacturing semiconductor devices, a chemical liquid containing a solvent (typically, an organic solvent) is used. In recent years, there has been a demand for a further reduction in impurities in the chemical liquid. In addition, the manufacturing of semiconductor devices at a node equal to or smaller than 10 nm is being examined, and accordingly, the aforementioned demand is increasing.

JP2013-249094A describes "a container formed of a polyethylene resin composition containing high-density polyethylene having density equal to or higher than 945 $kg/cm^3$ and an organic nucleating agent at 50 ppm to 2,000 ppm, in which the content of hydrocarbon components having 18 carbon atoms and 20 carbon atoms extracted using ethanol is equal to or smaller than 100 ppm, and the total content of Al, Mg, Ti, Zr and Hf is equal to or smaller than 40 ppm".

SUMMARY OF THE INVENTION

The inventors of the present invention prepared a chemical liquid storage body by storing a chemical liquid in the container described in JP2013-249094A and examined the container. As a result, it has been revealed that in a case where the chemical liquid storage body is stored, sometimes the performance of the chemical liquid taken out of the chemical liquid storage body after storage deteriorates.

An object of the present invention is to provide a container preventing the performance of a chemical liquid from deteriorating over time (hereinafter, described as "having the effects of the present invention" as well) even in a case where the container is stored for a long period of time while storing the chemical liquid. Another object of the present invention is to provide a method for manufacturing a container and a chemical liquid storage body.

As a result of conducting intensive examinations, the inventors have found that the objects can be achieved by the following constitution.

[1] A container having a base material and a coating layer which is disposed on at least a portion of the base material, contains a composition containing a polyolefin and at least one kind of metal component selected from the group consisting of Ti, Al, Mg, Zr, Hf, Fe, Ni, Sn, Zn, Cr, and Mo, and has a thickness equal to or greater than 50 µm, in which in a case where the composition contains one kind of metal component, provided that a region between a surface of the coating layer and a position 10 nm below the surface of in a thickness direction of the coating layer is a surface region, a region between a position 30 µm below the surface in the thickness direction of the coating layer and a position 50 µm below the surface in the thickness direction of the coating layer is an internal region, the surface region and the internal region are measured using a time-of-flight secondary ion mass spectrometer, CA1s represents an intensity ratio of a peak intensity of secondary ions derived from the metal component in the surface region to a peak intensity of secondary ions derived from the polyolefin in the surface region in at least a portion of the coating layer, and CA2s represents an intensity ratio of a peak intensity of secondary ions derived from the metal component in the internal region to a peak intensity of secondary ions derived from the polyolefin in the internal region in at least a portion of the coating layer, a ratio RCAs calculated by CA1s/CA2s is less than 1.00, or in a case where the composition contains two or more kinds of metal components, an average of RCAs determined for each of two or more kinds of the metal components is less than 1.00 in at least a portion the coating layer.

[2] The container formed of a composition containing a polyolefin and at least one kind of metal component selected from the group consisting of Ti, Al, Mg, Zr, Hf, Fe, Ni, Sn, Zn, Cr, and Mo, in which in a case where the composition contains one kind of metal component, provided that a region between a surface of the container and a position 10 nm below the surface in a thickness direction of the container is a surface region, a region between a position 30 µm below the surface in the thickness direction of the container and a position 50 µm below the surface in the thickness direction of the container is an internal region, the surface region and the internal region are measured using a time-of-flight secondary ion mass spectrometer, CA1 represents an intensity ratio of a peak intensity of secondary ions derived from the metal component in the surface region to a peak intensity of secondary ions derived from the polyolefin in the surface region in at least a portion of the container, and CA2 represents an intensity ratio of a peak intensity of secondary ions derived from the metal component in the internal region to a peak intensity of secondary ions derived from the polyolefin in the internal region in at least a portion of the container, a ratio RCA calculated by CA1/CA2 is less than 1.00, or in a case where the composition contains two or more kinds of metal components, an average of RCA determined for each of two or more kinds of the metal components is less than 1.00 in at least a portion the container.

[3] A container having a base material and a coating layer which is disposed on at least a portion of the base material, contains a composition containing a polyolefin and at least one kind of metal component selected from the group consisting of Ti, Al, Mg, Zr, Hf, Fe, Ni, Sn, Zn, Cr, and Mo, and has a thickness less than 50 µm, in which in a case where the composition contains one kind of metal component, provided that a region between a surface of the coating layer and a position 10 nm below the surface in a thickness direction of the coating layer is a surface region, a region between a position that is apart from the surface in the thickness direction of the coating layer by a distance taking up 70% of the total thickness of the coating layer and a position that is apart from the surface in the thickness direction of the coating layer by a distance taking up 100% of the total thickness of the coating layer is an internal region, the surface region and the internal region are measured using a time-of-flight secondary ion mass spectrometer, CA1t represents an intensity ratio of a peak intensity of secondary ions derived from the metal component in the surface region to a peak intensity of secondary ions derived from the polyolefin in the surface region in at least a portion of the coating layer, and CA2t represents an intensity ratio of a peak intensity of secondary ions derived from the metal component in the internal region to a peak intensity of secondary ions derived from the polyolefin in the internal region in at least a portion of the coating layer, a ratio RCAt calculated by CA1t/CA2t is less than 1.00, or in a case where the composition contains two or more kinds of metal components, an average of RCAt determined for each of two or more kinds of the metal components is less than 1.00 in at least a portion of the coating layer.

[4] The container described in [1] or [3], in which provided that CB1 represents an average of an intensity ratio of a peak intensity of secondary ions represented by $C_nH_{2n}^-$ to a peak intensity of secondary ions derived from the polyolefin measured in the surface region in at least a portion of the coating layer by using a time-of-flight secondary ion mass spectrometer, an intensity ratio of a peak intensity of secondary ions represented by $C_pH_{2p}COO^-$ to a peak intensity of secondary ions derived from the polyolefin measured in the surface region in at least a portion of the coating layer by using a time-of-flight secondary ion mass spectrometer, and an intensity ratio of a peak intensity of secondary ions represented by $C_qH_{2q}PO_2^-$ to a peak intensity of secondary ions derived from the polyolefin measured in the surface region in at least a portion of the coating layer by using a time-of-flight secondary ion mass spectrometer, and CB2 represents an average of an intensity ratio of a peak intensity of secondary ions represented by $C_nH_{2n}^-$ to a peak intensity of secondary ions derived from the polyolefin measured in the internal region in at least a portion of the coating layer by using a time-of-flight secondary ion mass spectrometer, an intensity ratio of a peak intensity of secondary ions represented by $C_pH_{2p}COO^-$ to a peak intensity of secondary ions derived from the polyolefin measured in the internal region in at least a portion of the coating layer by using a time-of-flight secondary ion mass spectrometer, and an intensity ratio of a peak intensity of secondary ions represented by $C_qH_{2q}PO_2^-$ to a peak intensity of secondary ions derived from the polyolefin measured in the internal region in at least a portion of the coating layer by using a time-of-flight secondary ion mass spectrometer, a ratio RCB calculated by CB1/CB2 is less than 1.00, n is an integer of 12 to 20, p is an integer of 8 to 24, and q is an integer of 8 to 24.

[5] The container described in [2], in which provided that CB1 represents an average of an intensity ratio of a peak intensity of secondary ions represented by $C_nH_{2n}^-$ to a peak intensity of secondary ions derived from the polyolefin measured in the surface region in at least a portion of the surface by using a time-of-flight secondary ion mass spectrometer, an intensity ratio of a peak intensity of secondary ions represented by $C_pH_{2p}COO^-$ to a peak intensity of secondary ions derived from the polyolefin measured in the surface region in at least a portion of the surface by using a time-of-flight secondary ion mass spectrometer, and an intensity ratio of a peak intensity of secondary ions represented by $C_qH_{2q}PO_2^-$ to a peak intensity of secondary ions derived from the polyolefin measured in the surface region in at least a portion of the surface by using a time-of-flight secondary ion mass spectrometer, and CB2 represents an average of an intensity ratio of a peak intensity of secondary ions represented by $C_nH_{2n}^-$ to a peak intensity of secondary ions derived from the polyolefin measured in the internal region in at least a portion of the surface by using a time-of-flight secondary ion mass spectrometer, an intensity ratio of a peak intensity of secondary ions represented by $C_pH_{2p}COO^-$ to a peak intensity of secondary ions derived from the polyolefin measured in the internal region in at least a portion of the surface by using a time-of-flight secondary ion mass spectrometer, and an intensity ratio of a peak intensity of secondary ions represented by $C_qH_{2q}PO_2^-$ to a peak intensity of secondary ions derived from the polyolefin measured in the internal region in at least a portion of the surface by using a time-of-flight secondary ion mass spectrometer, a ratio RCB calculated by CB1/CB2 is less than 1.00, n is an integer of 12 to 20, p is an integer of 8 to 24, and q is an integer of 8 to 24.

[6] The container described in any one of [1] to [5], in which in a case where 100 ml of pure water at 40° C. is stored in the container such that the pure water takes up 50% of a volume of the container and kept as it is for 1 day, provided that the pure water contains Fe after 1 day of the storage, an Fe content in the pure water with respect to the total mass of the pure water is 0.01 mass ppt to 0.3 mass ppb, provided that the pure water contains Cr after 1 day of the storage, a Cr content with respect to the total mass of the pure water is 0.01 mass ppt to 0.3 mass ppb, and provided that the pure water contains Ni after 1 day of the storage, a Ni content with respect to the total mass of the pure water is 0.01 mass ppt to 0.3 mass ppb.

[7] The container described in any one of [1] to [6], in which in a case where 100 ml of pure water at 40° C. is stored in the container such that the pure water takes up 50% of a volume of the container and kept as it is for 1 day, the pure water after 1 day of the storage contains a compound selected from the group consisting of an aliphatic amide and an organic substance having a boiling point equal to or higher than 300° C., a content of the compound with respect to the total mass of the pure water is 0.1 mass ppb to 1,000 mass ppm, and the organic substance having a boiling point equal to or higher than 300° C. contains an alkyl olefin or the aliphatic amide contains an aliphatic chain having 16 or more carbon atoms that is linked to a carbonyl group.

[8] A method for manufacturing a container, having a step of forming a coating layer not yet being washed by bringing a composition, which contains a polyolefin and at least one kind of metal component selected from the group consisting of Ti, Al, Mg, Zr, Hf, Fe, Ni, Sn, Zn, Cr, and Mo, into contact with a surface of a base material, and a step of obtaining the container described in [1] or [3] by washing the coating layer not yet being washed by using a washing solution containing at least one kind of component selected from the group consisting of pure water, an acid, a base, and an organic solvent.

[9] The method for manufacturing a container described in [8], in which a content of metal ions in the washing solution is equal to or smaller than 100 mass ppt, a content of organic impurities in the washing solution is equal to or smaller than 100 mass ppm, and the number of objects to be counted having a size equal to or greater than 30 nm that are counted by a light scattering-type liquid-borne particle counter is equal to or smaller than 50 per 1 ml of the washing solution.

[10] A method for manufacturing a container, including washing a substrate formed of a composition, which contains a polyolefin and at least one kind of metal component selected from the group consisting of Ti, Al, Mg, Zr, Hf, Fe, Ni, Sn, Zn, Cr, and Mo, by using a washing solution containing at least one kind of component selected from the group consisting of pure water, an acid, a base, and an organic solvent so as to obtain the container described in [2], in which a content of metal ions in the washing solution is equal to or smaller than 100 mass ppt, a content of organic impurities in the washing solution is equal to or smaller than 100 mass ppm, and the number of objects to be counted having a size equal to or greater than 30 nm that are counted by light scattering-type liquid-borne particle counter is equal to or smaller than 50 per 1 ml of the washing solution.

[11] The method for manufacturing a container described in any one of [8] to [10], in which in a case where the washing solution having been used for washing contains one kind of ions selected from the group consisting of Ti, Al, Mg, Zr, Hf, Fe, Ni, Sn, Zn, Cr, and Mo, a content of one kind of the ions with respect to the total mass of the washing solution having been used for washing is 0.01 mass ppt to 1.0 mass ppm, and in a case where the washing solution having been used for washing contains two or more kinds of ions selected from the group consisting of Ti, Al, Mg, Zr, Hf, Fe, Ni, Sn, Zn, Cr, and Mo, an average of a content of two or more kinds of the ions with respect to the total mass of the washing solution having been used for washing is 001 mass ppt to 1.0 mass ppm.

[12] The method for manufacturing a container described in any one of [8] to [11], in which a content of organic impurities in the washing solution having been used for washing is 1.0 mass ppt to 500 mass ppm.

[13] The method for manufacturing a container described in any one of [8] to [12], in which washing is repeated until the washing solution having been used for washing satisfies a condition 1 and a condition 2 which will be described later.

[14] A chemical liquid storage body having the container described in any one of [1] to [7], and a chemical liquid stored in the container.

[15] The chemical liquid storage body described in [14], in which a filling rate determined by Equation (X), which will be described later, is equal to or higher than 60% by volume.

[16] The chemical liquid storage body described in [14] or [15], in which a concentration of organic substances determined by Equation (Y), which will be described later, is equal to or lower than 1 volume ppm.

[17] The chemical liquid storage body described in any one of [14] to [16], in which the chemical liquid contains water, a content of water in the chemical liquid is equal to or greater than 50% by mass, and in a case where a surface of a substrate is coated with the chemical liquid and measured using a particle inspection device before and after the coating with the chemical liquid, a change in density of particles on the substrate having a particle diameter equal to or smaller than 19 nm is equal to or smaller than 0.3 particles/cm$^2$.

[18] The chemical liquid storage body described in any one of [14] to [17], in which the chemical liquid contains water, a content of the water in the chemical liquid is equal to or smaller than 50% by mass, and a content of particle-like substances, which are measured using a single particle inductively coupled plasma mass spectrometer and have a particle diameter equal to or smaller than 30 nm, in the chemical liquid is equal to or smaller than 1.0 mass ppb with respect to the total mass of the chemical liquid.

[19] The chemical liquid storage body described in any one of [14] to [18], in which the chemical liquid further contains a surfactant.

According to the present invention, it is possible to provide a container which prevents the performance of a chemical liquid from deteriorating over time even in a case where the container is stored for a long period of time while storing the chemical liquid. Furthermore, according to the present invention it is possible to provide a method for manufacturing a container and a chemical liquid storage body.

DESCRIPTION OF THE PREFERRED EMBODIMENTS

Hereinafter, the present invention will be specifically described.

The following constituents will be described based on typical embodiments of the present invention in some cases, but the present invention is not limited to the embodiments.

In the present specification, a range of numerical values described using "to" means a range including the numerical values listed before and after "to" as a lower limit and an upper limit respectively.

In the present specification, "average" simply means arithmetic mean.

In the present invention, "preparation" means not only the preparation of a specific material by means of synthesis or mixing but also the preparation of a predetermined substance by means of purchase and the like.

In the present specification, "ppm" means "parts-per-million ($10^{-6}$)", "ppb" means "parts-per-billion ($10^{-9}$)", "ppt" means "parts-per-trillion ($10^{-12}$)", and "ppq" means "parts-per-quadrillion ($10^{-15}$)".

[Container (First Embodiment)]

The container according to a first embodiment of the present invention is a container having a base material (container body) and a coating layer which is disposed on at least a portion of the base material, contains a composition (hereinafter, referred to as "specific composition" as well) containing a polyolefin and at least one kind of metal component (hereinafter, referred to as "specific metal" as well) selected from the group consisting of Ti, Al, Mg, Zr, Hf, Fe, Ni, Sn, Zn, Cr, and Mo, and has a thickness equal to or greater than 50 μm. The container satisfies conditions which will be described later. The specific metal described above may be in the form of particles or ions.

Either or both of the high-purity chemical liquid used in a semiconductor manufacturing process and high-purity chemical liquid used for medical purposes such as sterilization or disinfection are required to have a certain degree of cleanness (reduction in amounts of impurities migrating to the chemical liquid from a container).

In the container described in JP2013-249094A, amounts of specific hydrocarbon components and metal components extracted by ethanol are suppressed to be equal to or smaller than a certain level. However, according to the examination of the inventors of the present invention, it has been revealed that in a case where a chemical liquid having high purity that satisfies the currently required level is stored in the container, impurity components are eluted from the container over time, and accordingly, sometimes the performance of the chemical liquid deteriorates.

That is, it has been found that the container described in JP2013-249094A is insufficient for storing a chemical liquid having high purity that satisfies the currently required level.

In order to achieve the aforementioned objects, the inventors of the present invention repeated intensive examinations. As a result, the inventors have found that in the aforementioned container, by controlling the distribution of specific components in a region (surface region) between a surface (surface means the interface between the coating layer and another phase) of a coating layer and a position 10 nm below the surface in a thickness direction of the coating layer and a region (internal region) between a position 30 μm below the surface of the coating layer in a thickness direction of the coating layer and a position 50 μm below the surface in the thickness direction of the coating layer, the aforementioned problem can be solved. Based on the finding, the inventors have accomplished the present invention.

That is, the container according to the present embodiment is a container in which in a case where the composition contains one kind of specific metal, provided that the surface region and the internal region are measured using a time-of-flight secondary ion mass spectrometer, CA1s represents an intensity ratio of a peak intensity of secondary ions derived from the specific metal in the surface region to a peak intensity of secondary ions derived from the polyolefin in the surface region in at least a portion of the coating layer, and CA2s represents an intensity ratio of a peak intensity of secondary ions derived from one kind of the metal component in the internal region to a peak intensity of secondary ions derived from the polyolefin in the internal region in at least a portion of the coating layer, a ratio RCAs calculated by CA1s/CA2s is less than 1.00, or in a case where the composition contains two or more kinds of metal components, an average of RCAs determined for each of two or more kinds of the specific metals is less than 1.00 in at least a portion of the coating layer.

Hereinafter, the materials and physical properties of the container will be specifically described.

The container according to the present embodiment (hereinafter, referred to as "present container" as well) is a container having a coating layer which is disposed on at least a portion of a base material, contains the specific composition, and has a thickness equal to or greater than 50 μm. It is preferable that the container has a coating layer which is formed of the specific composition and has a thickness equal to or greater than 50 μm.

It is preferable that the present container has a coating layer in at least a portion of a liquid contact portion (a portion which is likely to contact a stored liquid in a case where a liquid is stored in the present container). That is, the present container has a coating layer preferably in at least a portion of a part that will be a liquid contact portion on the base material, more preferably in the entirety of the liquid contact portion, even more preferably in the entirety of the internal surface of the container, and particularly preferably in the entirety of the surface of the container.

In other words, in the present container, the coating layer is disposed on the entirety of the surface of a storage portion of the container body (corresponding to the base material) having the storage portion being able to store a chemical liquid, and more preferably on the entire surface of the container body.

[Base Material]

The container according to the present embodiment has the coating layer containing the specific composition on the base material. As the base material, it is possible to use, for example, an organic material (a resin or the like) and an inorganic material (glass, a metal, or the like) without particular limitation.

It is preferable that the base material is the container body having the storage portion being able to store a chemical liquid.

Particularly, in view of obtaining a container having further improved effects of the present invention, the base material preferably contains a polyolefin and/or an anticorrosive material that will be described later, and is preferably formed of a polyolefin and/or an anticorrosive material.

<Anticorrosive Material>

The base material is formed of at least one kind of material (anticorrosive material) selected from the group consisting of a fluororesin and an electropolished metallic material. The metallic material contains at least one kind of metal selected from the group consisting of chromium and nickel. The total content of chromium and nickel with respect to the total mass of the metallic material is preferably greater than 25% by mass.

<Electropolished Metallic Material (Metallic Material Having Undergone Electropolishing)>

The metallic material used for manufacturing the aforementioned electropolished metallic material is not particularly limited as long as the metallic material contains at least one kind of metal selected from the group consisting of chromium and nickel and in which the total content of chromium and nickel with respect to the total mass of the metallic material is greater than 25% by mass. Examples thereof include stainless steel, a nickel-chromium alloy, and the like.

The total content of chromium and nickel in the metallic material with respect to the total mass of the metallic material is preferably equal to or greater than 25% by mass, and more preferably equal to or greater than 30% by mass.

The upper limit of the total content of chromium and nickel in the metallic material is not particularly limited, but is preferably equal to or smaller than 90% by mass in general.

As the stainless steel, known stainless steel can be used without particular limitation. Among these, an alloy with a nickel content equal to or higher than 8% by mass is preferable, and austenite-based stainless steel with a nickel content equal to or higher than 8% by mass is more preferable. Examples of the austenite-based stainless steel include Steel Use Stainless (SUS) 304 (Ni content: 8% by mass, Cr content: 18% by mass), SUS304L (Ni content: 9% by mass, Cr content: 18% by mass), SUS316 (Ni content: 10% by mass, Cr content: 16% by mass), SUS316L (Ni content: 12% by mass, Cr content: 16% by mass), and the like.

The Ni content and the Cr content in the above parenthesis is a content with respect to the total mass of the metallic material.

As the nickel-chromium alloy, known nickel-chromium alloys can be used without particular limitation. Among these, a nickel-chromium alloy is preferable in which the nickel content is 40% to 75% by mass and the chromium content is 1% to 30% by mass with respect to the total mass of the metallic material.

Examples of the nickel-chromium alloy include HASTELLOY (trade name, the same is true for the following description), MONEL (trade name, the same is true for the following description), INCONEL (trade name, the same is true for the following description), and the like. More specifically, examples thereof include HASTELLOY C-276 (Ni content: 63% by mass, Cr content: 16% by mass), HASTELLOY C (Ni content: 60% by mass, Cr content: 17% by mass), HASTELLOY C-22 (Ni content: 61% by mass, Cr content: 22% by mass), and the like.

Furthermore, if necessary, the nickel-chromium alloy may further contain boron, silicon, tungsten, molybdenum, copper, cobalt, and the like in addition to the aforementioned alloy.

As the method for electropolishing the metallic material, known methods can be used without particular limitation. For example, it is possible to use the methods described in paragraphs "0011" to "0014" in JP2015-227501A, paragraphs "0036" to "0042" in JP2008-264929A, and the like.

Presumably, in a case where the metallic material is electropolished, the chromium content in a passive layer on the surface thereof may become higher than the chromium content in the parent phase.

The metallic material may have undergone buffing. As the buffing method, known methods can be used without particular limitation. The size of abrasive grains used for finishing the buffing is not particularly limited, but is preferably equal to or smaller than #400 because such grains make it easy to further reduce the surface asperity of the metallic material. The buffing is preferably performed before the electropolishing.

(Fluororesin)

As the fluororesin, known fluororesins can be used without particular limitation as long as they are resins (polymers) containing fluorine atoms. Examples of the fluororesin include polytetrafluoroethylene, polychlorotrifluoroethylene, polyvinylidene fluoride, a tetrafluoroethylene-hexafluoropropylene copolymer, a tetrafluoroethylene-perfluoroalkylvinylether copolymer, a tetrafluoroethylene-ethylene copolymer, a chlorotrifluoroethylene-ethylene copolymer, a cyclized perfluoro (butenyl vinyl ether) polymer (CYTOP (registered trademark)), and the like.

The thickness of the base material is not particularly limited, but is preferably 100 μm to 500 mm in general.

The container according to the present embodiment has the coating layer disposed on the base material. It is preferable that the coating layer contains the specific composition and is formed of the specific composition.

The thickness of the coating layer is not particularly limited as long as it is equal to or greater than 50 μm. Generally, the thickness of the coating layer is preferably equal to or smaller than 3,000 μm, and more preferably equal to or smaller than 2,000 μm.

[Composition]

<Polyolefin>

The specific composition contains a polyolefin and a specific metal. The content of the polyolefin in the specific composition is not particularly limited. Generally, the content of the polyolefin with respect to the total mass of the composition is preferably equal to or greater than 95.0% by mass, and more preferably equal to or greater than 98.0% by mass. The upper limit thereof is not particularly limited, but is preferably equal to or smaller than 99.99999% by mass in general.

In the present specification, the polyolefin means a polymer synthesized using olefins as a monomer. Examples of the polyolefin include polyethylene, polypropylene, and the like. Furthermore, as the polyolefin, a copolymer of ethylene and another α-olefin can be used. The α-olefin is not particularly limited, and examples thereof include an α-olefin having 3 to 20 carbon atoms. More specifically, examples thereof include propylene, 1-butene, 4-methyl-1-pentene, 1-hexene, 1-octene, 1-nonene, 1-decene, 1-undecene, 1-dodecene, 1-tridecene, 1-tetradecene, and the like. One kind of polyolefin may be used singly, or two or more kinds of polyolefins may be used in combination. In a case where two or more kinds of polyolefins are used in combination, the total content thereof is preferably within the above range.

Particularly, in view of obtaining a container having further improved effects of the present invention, the polyolefin is preferably at least one kind of polymer selected from the group consisting of polyethylene and a copolymer of ethylene and α-olefin, and more preferably polyethylene. Among these, in view of obtaining a container having further improved effects of the present invention, a high-density polyethylene (HDPE) is even more preferable.

The weight-average molecular weight (Mw) of HDPE is not particularly limited. Generally, the weight-average molecular weight of HDPE is preferably 1,000 to 1,000,000, and more preferably 5,000 to 500,000.

The molecular weight distribution (Mw/Mn) of HDPE is not particularly limited, but is preferably 2.0 to 6.0. In a case where the value of Mw/Mn is equal to or greater than 2.0, high-density polyethylene which has excellent fluidity and is easy to mold by blow molding and injection molding is obtained. In a case where the value of Mw/Mn is equal to or smaller than 6.0, amounts of low-molecular-weight components are reduced, and accordingly, not only cleanness but also impact resistance are improved. The value of Mw/Mn of the high-density polyethylene is more preferably 2.5 to 5.5, and even more preferably 3.0 to 5.0. In the present specification, the weight-average molecular weight (Mw) and the number-average molecular weight (Mn) mean values determined by gel permeation chromatography and expression in terms of polystyrene.

<Specific Metal>

The specific composition contains a specific metal. The content of the specific metal in the specific composition is not particularly limited. Generally, the content of the specific metal with respect to the total mass of the specific composition is preferably 0.1 to 100 mass ppm, more preferably 0.1 to 30 mass ppm, and even more preferably 0.1 to 20 mass ppm.

The specific metal may be incorporated into the specific composition by being intentionally mixed with the polyolefin, or may be unintentionally incorporated into the composition (for example, as impurities derived from raw materials or by contamination occurring in the manufacturing process, and the like).

Typically, for example, the specific composition contains the specific metal as a polymerization catalyst of the polyolefin in some cases. That is, for example, sometimes a polymerization catalyst containing the specific metal used in the process of polymerizing the polyolefin also remains in the specific composition.

The polymerization catalyst is not particularly limited, and examples thereof include the Ziegler-Nattar catalyst, a metallocene catalyst, the Phillips catalyst, and the like. One kind of each of these catalysts may be used singly, or two or more kinds of these catalysts may be used in combination.

Ziegler-Nattar Catalyst

Examples of the Ziegler-Nattar catalyst include catalysts formed of a solid catalyst component containing Mg, Ti, halogen, and an electron donor and an organic aluminum compound. The electron donor is an organic compound containing oxygen atoms, and examples thereof include ethers and esters. Among these, esters are preferable.

Specific examples of the solid catalyst component include $TiCl_4$, $TiBr_4$, $Ti(OEt)_3Cl$, $Ti(OEt)_2Br_2$, analogues of these, and the like.

The organic aluminum compound is a compound containing at least one or more kinds of aluminum (Al)-carbon bonds. Examples thereof include trimethyl Al, triethyl Al, triisobutyl Al, and the like.

Metallocene Catalyst

Examples of the metallocene catalyst include catalysts formed of aluminoxane and a group 4 transition metal complex having a group containing a cyclopentadiene-type anion skeleton.

Examples of the group containing a cyclopentadiene-type anion skeleton include a cyclopentadienyl group, a n-butylcyclopentadienyl group, an indenyl group, and the like. Among these, a n-butylcyclopentadienyl group or an indenyl group is preferable. Furthermore, examples of the group containing a cyclopentadiene-type anion skeleton include a dimethylsilylene bisindenyl group, an ethylene bisindenyl group, and the like that are obtained by crosslinking the above groups through an alkylene group, a silylene group, and the like.

Examples of the group 4 transition metal atom include Ti, Zr, Hf, and the like. Among these, Zr is preferable.

Examples of the group 4 transition metal atom complex having a group containing a cyclopentadiene-type anion skeleton include dicyclopentadienyl Zr dichloride, di-n-butylcyclopentadienyl Zr dichloride, dimethylsilylene bisindenyl Zr dichloride, ethylene bisindenyl Zr dichloride, and the like.

Aluminoxane is a compound containing a structure represented by —(Al(R)—O)n-. R represents an alkyl group having 1 to 4 carbon atoms. The alkyl groups may be the same as or different from each other. n represents a number of 2 to 50.

Examples of the alkyl group (R) in the aluminoxane include a methyl group, an ethyl group, and the like. n is preferably 10 to 30.

Examples of the aluminoxane include methyl aluminoxane, ethyl aluminoxane, and the like.

Phillips Catalyst

The Phillips catalyst is a chromium catalyst obtained by causing a chromium compound to be supported on an inorganic oxide support such as silica-alumina, silica-titanic, or the like. In a case where the Phillips catalyst is activated in a non-reducing atmosphere, at least some of the supported chromium elements become hexavalent chromium.

Examples of the Phillips catalyst include $CrO_3$, chromocene, silyl chromate, and analogues of these. These are described in U.S. Pat. Nos. 4,124,532A and 4,302,565A.

Post-Metallocene Catalyst

Among post-metallocene catalysts (for example, "Polyethylene Technique Reader; published from Kogyo Chosakai Publishing Co., Ltd., 2001", "Living Polymerization by Homogenous System Transition Metal Catalyst; published from Information Process Center, 1999", "Practical Dictionary of Catalysts; published from Kogyo Chosakai Publishing Co., Ltd., 2004" and the like), catalysts containing Ti, Zr, or Hf, which belongs to group 4B on the periodic table, as a central metal or catalysts containing Cr, Fe, or Ni as a central metal exhibit high activity.

Examples of other catalysts include a standard catalyst, which is constituted with a main catalyst containing molybdenum oxide and a catalyst support formed of an oxide of aluminum, a nickel-based catalyst, and the like. These catalysts are described in JP1993-175072A (JP-H05-175072A), JP1994-122721A (JP-H06-122721A), and the like.

The polymerization catalyst is supported on a support in some cases. The support is not particularly limited. Examples of organic supports include a (co)polymer of α-olefin having 2 to 10 carbon atoms (polyethylene, polypropylene, polybutene-1, an ethylene-propylene copolymer, an ethylene-butene-1 copolymer, an ethylene-hexene-1 copolymer, a propylene-butene-1 copolymer, a propylene-divinylbenzene copolymer, or the like), an aromatic unsaturated hydrocarbon polymer (polystyrene, a styrene-divinylbenzene copolymer, or the like), and a polar group-containing polymer (a polyacrylic acid ester, a polymethacrylic acid ester, polyacrylonitrile, polyvinyl chloride, polyamide, polycarbonate, or the like).

Examples of inorganic supports include $SiO_2$, $Al_2O_3$, $MgO$, $TiO_2$, $B_2O_3$, $CaO$, $ZnO$, $BaO$, $ThO$, $SiO_2$—$MgO$, $SiO_2$—$Al_2O_3$, $SiO_2$—$V_2O_5$, $MgCl_2$, $AlCl_3$, $MnCl_2$, $Na_2CO_3$, $K_2CO_3$, $CaCO_3$, $MgCO_3$, $Al_2(SO_4)_3$, $BaSO_4$, $KNO_3$, $Mg(NO_3)_2$, $Mg(OH)_2$, $Al(OH)_3$, $Ca(OH)_2$, and the like. The particle diameter of the catalyst is not particularly limited. Generally, the particle diameter of the catalyst is preferably 1 to 3,000 µm, more preferably 5 to 2,000 µm, and even more preferably 10 to 1,000 µm.

The specific composition contains the specific metal in any form without particular limitation. For example, Ti, Al, Mg, Zr, Hf, Fe, Ni, Sn, Zn, Cr, and Mo may migrate as impurities to the polyolefin from the liquid contact portion of a polyolefin manufacturing device (a reaction tank, a storage tank, a pipe line, or the like), and as a result, the composition may contain the specific metal.

<Other Components>

The specific composition may contain components other than the above. Examples of the components other than the above include a nucleating agent (a crystal nucleating agent) and the like. Examples of the nucleating agent include a phosphoric acid ester metal salt, a carboxylic acid ester metal salt, a rosin metal salt, benzylidene sorbitol, quinacridone, cyanine blue, talc, and the like. Among these, in view of obtaining a container having further improved effects of the present invention, a phosphoric acid ester metal salt or a carboxylic acid ester metal salt is preferable.

The content of the nucleating agent in the specific composition is not particularly limited. Generally, the content of the nucleating agent with respect to the total mass of the composition is preferably 0.01% to 2.0% by mass. One kind of nucleating agent may be used singly, or two or more kinds of nucleating agents may be used in combination. In a case where two or more kinds of nucleating agents are used in combination, the total content thereof is preferably within the above range.

Examples of the phosphoric acid ester metal salt include sodium-2,2'-methylene-bis(4,6-di-t-butylphenyl)phosphate, sodium-2,2'-ethylidene-bis(4,6-di-t-butylphenyl)phosphate, lithium-2,2'-methylene-bis(4,6-di-t-butylphenyl)phosphate, lithium-2,2'-ethylidene-bis(4,6-di-t-butylphenyl)phosphate, calcium-bis[2,2'-methylene-bis(4,6-di-t-butylphenyl)phosphate], magnesium-bis[2,2'-methylene-bis(4,6-di-t-butylphenyl)phosphate], aluminum-tris[2,2'-methylene-bis(4,6-di-t-butylphenyl)phosphate], a 2,2'-methylenebis(4,6-di-t-butylphenyl)phosphate basic aluminum salt, bis(2,4,8,10-tetra-t-butyl-hydroxy-12H-dibenzo[d,g][1,3,2] dioxaphosphosin-6-oxide) aluminum hydroxide, and the like.

Examples of the carboxylic acid ester metal salt include metal salts of an aromatic carboxylic acid or an aliphatic carboxylic acid. Specifically, examples thereof include a benzoic acid aluminum salt, a p-t-butyl benzoic acid aluminum salt, sodium adipate, sodium thiophene carboxylate, sodium pyrrole carboxylate, and the like.

[Physical Properties of Container]

<RCAs>

The container according to the embodiment of the present invention is a container in which in a case where the specific composition contains one kind of specific metal, provided that a region between a surface $S_0$ of at least a portion of the coating layer and a position $S_{10}$ 10 nm below the surface $S_0$ in a thickness direction of the coating layer is a surface region; CA1s represents an intensity ratio ($M_{10}/I_{10}$) of a peak intensity $M_{10}$ of secondary ions derived from the specific metal to a peak intensity $I_{10}$ of secondary ions derived from the polyolefin measured in the surface region by using a time-of-flight secondary ion mass spectrometer; a region between a position 30 μm below the surface in the thickness direction of the coating layer and a position 50 μm below the surface in the thickness direction of the coating layer is an internal region; and CA2s represents an intensity ratio ($M_{50k}/I_{50k}$) of a peak intensity $M_{50k}$ of secondary ions derived from one kind of the specific metal to a peak intensity $I_{50k}$ of secondary ions derived from the polyolefin measured in the internal region by using a time-of-flight secondary ion mass spectrometer; a ratio RCAs calculated by CA1s/CA2s is less than 1.00, or in a case where the specific composition contains two or more kinds of specific metals, an average of RCAs determined for each of two or more kinds of the specific metals is less than 1.00 in at least a portion of the coating layer.

$I_{10}$ means the average of the peak intensity (integrated intensity) of secondary ions derived from the polyolefin that is measured at each of the measurement spots in the surface region. The number of measurement spots in the surface region is 20. The same is true for $M_{10}$.

$I_{50k}$ means the average of peak intensity (integrated intensity) of secondary ions derived from the polyolefin that is measured at each of the measurement spots in the internal region. The number of measurement spots in the internal region is 20. The same is true for $M_{50k}$.

Specific measurement conditions are as described in Examples.

In a case where the container satisfies RCAs<1.00, this means that the content of the specific metal is relatively smaller in the surface region than in the internal region. In a case where the liquid contact portion satisfies the above relationship in the container, even though the container is stored for a long period of time while storing a chemical liquid, impurities and the like are hardly eluted from the container, and the performance of the chemical liquid tends to be maintained for a longer period of time.

RCAs is not particularly limited as long as it is less than 1.00. In view of obtaining a container having further improved effects of the present invention, RCAs is preferably equal to or lower than 0.90, more preferably less than 0.70, even more preferably less than 0.40, and particularly preferably equal to or lower than 0.25. The lower limit thereof is not particularly limited, but is preferably equal to or higher than 0.001 in general.

RCAs is a numerical value that can be calculated from $I_{10}$, $M_{10}$, $I_{50k}$, and $M_{50k}$ which can be measured by time-of-flight secondary ion mass spectrometry. The method for preparing a sample for measuring RCAs and the measurement conditions are as described in Examples.

The relationship described above may be satisfied in at least a portion of the coating layer. In view of obtaining a container having further improved effects of the present invention, the relationship described above is preferably satisfied in a portion of the coating layer which will be a liquid contact portion, more preferably satisfied in the entirety of the coating layer which will be a liquid contact portion, and even more preferably satisfied in the entirety of the coating layer.

The container according to the present embodiment may be a container with a lid that additionally has a lid. In a case where the container according to the present embodiment has a lid, it is preferable that the lid is formed of the same material as the container described above and has the same characteristics as the container described above.

[Container (Second Embodiment)]

The container according to a second embodiment of the present invention is a container formed of a specific composition and satisfies conditions which will be described later.

Hereinafter, the container according to the above embodiment will be described. The materials, the conditions, and the like that will not be described below are the same as the materials, the conditions, and the like of the first embodiment.

Either or both of the high-purity chemical liquid used in a semiconductor manufacturing process and high-purity chemical liquid used for medical purposes such as sterilization or disinfection are required to have a certain degree of cleanness (reduction in amounts of impurities migrating to the chemical liquid from a container).

In the container described in JP2013-249094A, amounts of specific hydrocarbon components and metal components extracted by ethanol are suppressed to be equal to or smaller than a certain level. However, according to the examination of the inventors of the present invention, it has been revealed that in a case where a chemical liquid having high purity that satisfies the currently required level is stored in the container, impurity components are eluted from the container over time, and accordingly, sometimes the performance of the chemical liquid deteriorates.

That is, it has been found that the container described in JP2013-249094A is insufficient for storing a chemical liquid having high purity that satisfies the currently required level.

In order to solve the above problem, the inventors of the present invention repeated intensive examinations. As a result, the inventors have found that in the container formed of the specific composition, by controlling the distribution of specific components in a region (surface region) between a surface of the container and a position 10 nm below the surface in a thickness direction of the coating layer and a region (internal region) between a position 30 μm below the surface of the container in a thickness direction of a container and a position 50 μm below the surface in the thickness direction of the container, the aforementioned problem can be solved. Based on the finding, the inventors have accomplished the present invention.

That is, the container according to the present embodiment is a container in which in a case where the specific composition contains one kind of specific metal, provided that a region between a surface of the container and a position 10 nm below the surface in a thickness direction of the container is a surface region; a region between a position 30 μm below the surface in the thickness direction of the container and a position 50 μm below the surface in the thickness direction of the container is an internal region; the surface region and the internal region are measured using a time-of-flight secondary ion mass spectrometer; CA1 represents an intensity ratio of a peak intensity of secondary ions derived from the metal component in the surface region to a peak intensity of secondary ions derived from the polyolefin in the surface region in at least a portion of the container; and CA2 represents an intensity ratio of a peak intensity of secondary ions derived from the metal component in the internal region to a peak intensity of secondary ions derived from the polyolefin in the internal region in at least a portion of the container; a ratio RCA calculated by CA1/CA2 is less than 1.00, or in a case where the specific composition contains two or more kinds of metal components, an average of RCA determined for each of two or more kinds of the metal components is less than 1.00 in at least a portion of the container.

[Physical Properties of Container]

The container according to the embodiment of the present invention is a container in which in a case where the specific composition contains one kind of specific metal, provided that a region between a surface $S_0$ and a position $S_{10}$ 10 nm below the surface $S_0$ in a thickness direction of the container in at least a portion of the surface is a surface region; CA1 ($M_{10}/I_{10}$) represents an intensity ratio of a peak intensity $M_{10}$ of secondary ions derived from the specific metal to a peak intensity $I_{10}$ of secondary ions derived from the polyolefin measured in the surface region by using a time-of-flight secondary ion mass spectrometer; a region between a position 30 μm below the surface in the thickness direction of the container and a position 50 μm below the surface in the thickness direction of the container is an internal region; and CA2 ($M_{50k}/I_{50k}$) represents an intensity ratio of a peak intensity $M_{50k}$ of secondary ions derived from one kind of the specific metal to a peak intensity $I_{50k}$ of secondary ions derived from the polyolefin measured in the internal region by using a time-of-flight secondary ion mass spectrometer; a ratio RCA calculated by CA1/CA2 is less than 1.00, or in a case where the composition contains two or more kinds of specific metals, an average of RCA determined for each of two or more kinds of the specific metals is less than 1.00 in at least a portion of the surface.

$I_{10}$ means the average of the peak intensity (integrated intensity) of secondary ions derived from the polyolefin measured at each of the measurement spots in the surface region. The number of measurement spots in the surface region is 20. The same is true for $M_{10}$.

$I_{50k}$ means the average of the peak intensity (integrated intensity) of secondary ions derived from the polyolefin measured at each of the measurement spots in the internal region. The number of measurement spots in the internal region is 20. The same is true for $M_{50k}$.

In a case where the container satisfies RCA<1.00, this means that the content of the specific metal is relatively smaller in the surface region than in the internal region. In the container, in a case where the liquid contact portion satisfies the relationship described above, even though the container is stored for a long period of time while storing a chemical liquid, impurities are hardly eluted from the container, and the performance of the chemical liquid tends to be maintained for a longer period of time.

RCA is not particularly limited as long as it is less than 1.00. In view of obtaining a container having further improved effects of the present invention, RCA is preferably equal to or lower than 0.90, more preferably less than 0.70, even more preferably less than 0.40, and particularly preferably equal to or lower than 0.25. The lower limit thereof is not particularly limited, but is preferably equal to or higher than 0.001 in general.

RCA is a numerical value that can be measured by time-of-flight secondary ion mass spectrometry. The method for preparing a sample for measuring RCA and the measurement conditions are as described in Examples.

The relationship described above may be satisfied in at least a portion of the container. In view of obtaining a container having further improved effects of the present invention, the relationship is preferably satisfied in a portion of the liquid contact portion in the container, more preferably satisfied in the entirety of the liquid contact portion in the container, and particularly preferably satisfied in the entirety of the container.

The container according to the present embodiment may be a container with a lid that additionally has a lid. In a case where the container according to the present embodiment has a lid, it is preferable that the lid is formed of the same material as the container and has the same characteristics as the container.

The thickness of the container according to the present embodiment is not particularly limited. Generally, the thickness of the container is preferably greater than 50 μm, more preferably equal to or greater than 100 μm, and even more preferably equal to or greater than 200 μm. Furthermore, the thickness of the container is preferably equal to or smaller than 100 mm, more preferably equal to or smaller than 80 mm, and even more preferably equal to or smaller than 50 mm.

[Container (Third Embodiment)]

The container according to a third embodiment of the present invention is a container having a coating layer, which contains the specific composition and has a thickness less than 50 μm, on a base material. It is preferable that the container has a coating layer which is formed of the specific composition and has a thickness less than 50 μm.

Either or both of the high-purity chemical liquid used in a semiconductor manufacturing process and high-purity chemical liquid used for medical purposes such as sterilization or disinfection are required to have a certain degree of cleanness (reduction in amounts of impurities migrating to the chemical liquid from a container).

In the container described in JP2013-249094A, amounts of specific hydrocarbon components and metal components extracted by ethanol are suppressed to be equal to or smaller than a certain level. However, according to the examination of the inventors of the present invention, it has been revealed that in a case where a chemical liquid having high purity that satisfies the currently required level is stored in the container, impurity components are eluted from the container over time, and accordingly, sometimes the performance of the chemical liquid deteriorates.

That is, it has been found that the container described in JP2013-249094A is insufficient for storing a chemical liquid having high purity that satisfies the currently required level.

In order to solve the above problem, the inventors of the present invention repeated intensive examinations. As a result, the inventors have found that in the container, by controlling the distribution of specific components in a region (surface region) between a surface of a coating layer and a position 10 nm below the surface in a thickness direction of the coating layer and a region (internal region) between a position that is apart from the surface of the coating layer in the thickness direction of the coating layer by a distance taking up 70% of the total thickness of the coating layer and a position that is apart from the surface of the coating layer in the thickness direction of the coating layer by a distance taking up 100% of the total thickness of the coating layer, the aforementioned problem can be solved. Based on the finding, the inventors have accomplished the present invention.

That is the container according to the present embodiment is a container having a base material and a coating layer that is disposed on at least a portion of the base material, contains the specific composition, and has a thickness less than 50 μm, in which in a case where the specific composition contains one kind of specific metal, provided that a region between a surface of the coating layer and a position 10 nm below the surface in a thickness direction of the coating layer is a surface region; a region between a position, which is apart from the surface in the thickness direction of the coating layer by a distance taking up 70% of the total thickness of the coating layer, and a position which is apart from the surface in the thickness direction of the coating layer by a distance taking up 100% of the total thickness of the coating layer is an internal region; the surface region and the internal region are measured using a time-of-flight secondary ion mass spectrometer; CA1t represents an intensity ratio of a peak intensity of secondary ions derived from the metal component in the surface region to a peak intensity of secondary ions derived from the polyolefin in the surface region in at least a portion of the coating layer; and CA2t represents an intensity ratio of a peak intensity of secondary ions derived from the metal component in the internal region to a peak intensity of secondary ions derived from the polyolefin in the internal region in at least a portion of the coating layer; a ratio RCAt calculated by CA1t/CA2t is less than 1.00, or in a case where the specific composition contains two or more kinds of metal components, an average of RCAt determined for each of two or more kinds of the metal components is less than 1.00 in at least a portion of the coating layer.

In a case where the container satisfies RCAt<1.00, this means that the content of the specific metal is relatively smaller in the surface region than in the internal region. In the container, in a case where the liquid contact portion satisfies the relationship described above, even though the container is stored for a long period of time while storing a chemical liquid, impurities and the like are hardly eluted from the container, and the performance of the chemical liquid tends to be maintained for a longer period of time.

RCAt is not particularly limited as long as it is less than 1.00. In view of obtaining a container having further improved effects of the present invention, RCAt is preferably equal to or lower than 0.90, more preferably less than 0.70, even more preferably less than 0.40, and particularly preferably equal to or lower than 0.25. The lower limit thereof is not particularly limited, but is preferably equal to or higher than 0.001 in general.

RCAt is a numerical value that can be measured by time-of-flight secondary ion mass spectrometry. The method for preparing a sample for measuring RCAt and the measurement conditions are as described in Examples.

The relationship described above may be satisfied in at least a portion of the surface of the coating layer. In view of obtaining a container having further improved effects of the present invention, the relationship is preferably satisfied in a portion of the liquid contact portion, more preferably satisfied in the entirety of the liquid contact portion, and particularly preferably satisfied in the entirety of the surface of the coating layer.

The container according to the present embodiment may be a container with a lid that additionally has a lid. In a case where the container according to the present embodiment has a lid, it is preferable that the lid is formed of the same material as the container and has the same characteristics as the container.

The container according to the present embodiment has a coating layer disposed on a base material. It is preferable that the coating layer contains the specific composition and is formed of the specific composition.

The thickness of the coating layer is not particularly limited as long as it is less than 50 μm. Generally, the thickness of the coating layer is preferably equal to or greater than 20 μm, and more preferably equal to or greater than 30 μm.

[Physical Properties of Container (Others)]
[RCB]

In the container according to each of the embodiments of the present invention described so far, in order for the container to have further improved effects of the present invention, RCB determined by the following method is preferably less than 1.0 in at least a portion of the container (or a coating layer in a case where the container has a coating layer). In view of obtaining a container having further improved effects of the present invention, the relationship described above is preferably satisfied in a portion of the liquid contact portion, more preferably satisfied in the entirety of the liquid contact portion, and even more preferably satisfied in the entirety of the surface (or the coating layer).

As will be described later, RCB is a numerical value reflecting the distribution of components derived from a polyolefin (particularly, a polyolefin of a low degree of polymerization) and components derived from a nucleating agent in the container. In a case where RCB is less than 1.0 in a portion of the surface, this means that the content of the components derived from a polyolefin (particularly, a polyolefin of a low degree of polymerization) and/or the components derived from a nucleating agent is relatively smaller in the surface region than in the internal region. According to the examination conducted by the inventors of the present invention, it has been found that because the components derived from a polyolefin (particularly, a polyolefin of a low degree of polymerization) and the components derived from a nucleating agent are eluted into the chemical liquid stored in the container over time, in a case where the container is stored for a long period of time, these components become one of the factors deteriorating the performance of the chemical liquid. "Components derived from" includes the components, reaction products of the components, and decomposition products of the components.

In a case where the container according to the embodiment of the present invention satisfies RCB<1.00, either or both of the components derived from an polyolefin (particularly, a polyolefin of a low degree of polymerization) and the components derived from a nucleating agent are hardly eluted to the chemical liquid stored in the container, and consequently, the performance of the chemical liquid tends to be maintained for a long period of time.

Hereinafter, the method for calculating RCB will be described.

(CB1)

CB1 is determined by calculating the arithmetic mean of the following $L_{10}/I_{10}$, $A_{10}/I_{10}$, and $P_{10}/I_{10}$ measured in the surface region by using a time-of-flight secondary ion mass spectrometer.

(A) Intensity ratio ($L_{10}/I_{10}$) of peak intensity $L_{10}$ of secondary ions represented by $C_nH_{2n}^-$ to peak intensity $I_{10}$ of secondary ions derived from polyolefin (B) Intensity ratio ($A_{10}/I_{10}$) of peak intensity $A_{10}$ of secondary ions represented by $C_pH_{2p}COO^-$ to intensity ratio $I_{10}$ of secondary ions derived from polyolefin (C) Intensity ratio ($P_{10}/I_{10}$) of peak intensity $P_{10}$ of secondary ions represented by $C_qH_{2q}PO_2^-$ to intensity ratio $I_{10}$ of secondary ions derived from polyolefin n represents an integer of 12 to 20, p represents an integer of 8 to 24, and q represents an integer of 8 to 24.

(A) is a numerical value reflecting the content of the components derived from a polyolefin of a low degree of polymerization in the surface region, and each of (B) and (C) is a numerical value reflecting the content of the components derived from a nucleating agent in the surface region.

(CB2)

CB2 is determined by calculating the arithmetic mean of the following $L_{50k}/I_{50k}$, $A_{50k}/I_{50k}$, and $P_{50k}/I_{50k}$ measured in the internal region by using a time-of-flight secondary ion mass spectrometer.
- (a) Intensity ratio ($L_{50k}/I_{50k}$) of peak intensity ($L_{50k}$) of secondary ions represented by $C_nH_{2n}$— to peak intensity $I_{50k}$ of secondary ions derived from polyolefin
- (b) Intensity ratio ($A_{50k}/I_{50k}$) of peak intensity ($A_{50k}$) of secondary ions represented by $C_pH_{2p}COO$— to peak intensity ($I_{50k}$) of secondary ions derived from polyolefin
- (c) Intensity ratio ($P_{50k}/I_{50k}$) of peak intensity ($P_{50k}$) of secondary ions represented by $C_qH_{2q}PO_2$— to peak intensity ($I_{50k}$) of secondary ions derived from polyolefin
- n, p, and q have the same definition as n, p, and q described above.

RCB calculated by CB1/CB2 is not particularly limited as long as it is less than 1.00. In view of obtaining a container having further improved effects of the present invention, RCB is more preferably less than 0.70, and even more preferably less than 0.40. The lower limit thereof is not particularly limited, but is preferably equal to or higher than 0.001 in general.

RCB is a numerical value capable of being calculated from $I_{10}$, $L_{10}$, $A_{10}$, $P_{10}$, $I_{50k}$, $A_{50k}$, and $P_{50k}$ that can be measured by time-of-flight secondary ion mass spectrometry. The method for preparing a sample for measuring RCB and the measurement conditions are as described in Examples.

[Amount of Metal Components and Organic Impurities Eluted into Pure Water]

In view of obtaining a container having further improved effects of the present invention, the container preferably satisfies the following condition A and/or condition B in the following elution test, and more preferably satisfies the condition A and the condition B in the following elution test.

Elution test: 100 ml of pure water at 40° C. is stored in the container such that the pure water takes up 50% of the volume of the container and kept as it is for 1 day.
- Condition A: The average of a content of metal components contained in the pure water having been subjected to the elution test is equal to or smaller than 1.0 mass ppb (preferably equal to or smaller than 10 mass ppt, and more preferably equal to or smaller than 1 mass ppt).
- Condition B: Total organic carbon (TOC) in the pure water having been subjected to the elution test is equal to or smaller than 1,000 mass ppm (preferably equal to or smaller than 100 mass ppm and more preferably equal to or smaller than 1 mass ppm).

In the elution test, the pure water having been subjected to the elution test may contain any of metallic elements such as Fe, Cr, and Ni.

In a case where the pure water having been subjected to the elution test contains Fe, an Fe content in the pure water having been subjected to the elution test is preferably 0.01 mass ppt to 0.30 mass ppb. The upper limit thereof is preferably equal to or smaller than 0.1 mass ppb, more preferably equal to or smaller than 0.01 mass ppb, and even more preferably equal to or smaller than 0.001 mass ppb.

In a case where the pure water having been subjected to the elution test contains Cr, a Cr content in the pure water having been subjected to the elution test is preferably 0.01 mass ppt to 0.30 mass ppb. The upper limit thereof is preferably equal to or smaller than 0.1 mass ppb, more preferably equal to or smaller than 0.01 mass ppb, even more preferably equal to or smaller than 0.001 mass ppb.

In a case where the pure water having been subjected to the elution test contains Ni, a Ni content in the pure water having been subjected to the elution test is preferably 0.01 mass ppt to 0.30 mass ppb. The upper limit thereof is preferably equal to or smaller than 0.1 mass ppb, more preferably equal to or smaller than 0.01 mass ppb, and even more preferably equal to or smaller than 0.001 mass ppb.

In a case where the content of each of the metallic elements (Fe, Cr, and Ni) is equal to or smaller than the upper limit described above, the occurrence of defects, which are caused after a wafer is treated with the chemical liquid stored in the container, is further inhibited. Furthermore, in a case where the content of each of the metallic elements (Fe, Cr, and Ni) is equal to or greater than the lower limit described above, the load applied to the container by a washing treatment can be reduced. As a result, it is possible to inhibit the container from being damaged by the washing treatment and to inhibit the elution of organic impurities from the container.

In the elution test, the pure water having been subjected to the elution test may contain a compound selected from the group consisting of an aliphatic amide and an organic substance having a boiling point equal to or higher than 300° C. The pure water may contain an alkyl olefin (preferably an alkyl olefin of a low degree of polymerization) as the organic substance having a boiling point equal to or higher than 300° C. The alkyl olefin of a low degree of polymerization means an alkyl olefin having 22 or less carbon atoms. The aliphatic amide may contain an aliphatic chain having 16 or more carbon atoms that is linked to a carbonyl group. The aliphatic chain may have a substituent. The boiling point means a boiling point at 1 atm.

In the pure water having been subjected to the elution test, the content of the compound described above with respect to the total mass of the pure water is preferably 0.1 mass ppb to 1,000 mass ppm.

In the pure water having been subjected to the elution test, the content of the aliphatic amide is preferably 0.1 mass ppb to 1,000 mass ppm.

In the pure water having been subjected to the elution test, the content of the alkyl olefin is preferably 0.1 mass ppb to 1,000 mass ppm.

In a case where the content of the aforementioned component is equal to or smaller than the upper limit described above, the occurrence of defects, which are caused after a wafer is treated with the chemical liquid stored in the container, is further inhibited. In a case where the content of the aforementioned component (particularly, the aliphatic amide) is equal to or greater than the lower limit described above, provided that the chemical liquid stored in the container is used after being stored for a long period of time, a further aggravation of defects can be inhibited. The inhibitory mechanism is unclear. Presumably, a trace of component described above may be eluted into the chemical liquid from the container and stabilize inorganic impurities and metal ions by interacting with the inorganic impurities and the metal ions contained in the chemical liquid in extremely small amounts, and accordingly, the growth of the source of defects resulting from the inorganic impurities and the metal ions could be inhibited.

The content of metal components can be measured using ICP-MS. TOC can be measured using a total organic carbon analyzer.

In order to improve detection sensitivity, the chemical liquid to be evaluated may be concentrated before being evaluated. As a concentration factor, an optimal factor is appropriately selected within a range of about 2× to 100,000×.

First Embodiment of Method for Manufacturing Container

A first embodiment of the method for manufacturing a container of the present invention is a method for manufacturing a container, including a step of forming a coating layer not yet being washed by bringing a specific composition into contact with a surface of a base material, and a step of obtaining a container by washing the coating layer not yet being washed by using a washing solution containing at least one kind of component selected from the group consisting of pure water, an acid, a base, and an organic solvent. Hereinafter, aspects of each of the steps will be specifically described.

<Step of Forming Coating Layer not Yet being Washed>

In the present step, first, a base material is prepared. The material of the base material prepared by the present step is not particularly limited. It is preferable to use the base material described above. The shape of the base material is not particularly limited. It is preferable that the base material has a shape suited for storing a chemical liquid. Furthermore, the base material may be formed of a specific composition. In this case, this specific composition is different from the specific composition forming the coating layer not yet being washed.

The shape of the base material is not particularly limited, but may be a shape preferred for the container to store a chemical liquid.

The present step may additionally has a step of performing an easy adhesion treatment on a portion or the entirety of the surface of the base material and/or a step of forming an easily adhesive layer on a portion or the entirety of the surface of the base material. That is, the base material may be a base material having undergone an easy adhesion treatment or a base material with an easily adhesive layer.

The easy adhesion treatment is not particularly limited, and examples thereof include a method of irradiating the surface of the base material with plasma, a method of irradiating the surface of the base material with ionizing radiation, and the like. Furthermore, the easily adhesive layer can be formed by coating the base material with a known adhesive.

The present step is a step of obtaining a coating layer not yet being washed by bringing the specific composition into contact with the surface of the base material. The surface of the base material means at least a portion of the surface of the base material. The surface of the base material is preferably a portion of a part forming a liquid contact portion in the formed container, more preferably the entirety of the part forming the liquid contact portion, and even more preferably the entirety of the surface.

The method for bringing the composition into contact with the surface of the base material is not particularly limited. Examples thereof include a method of forming a base material and a coating layer not yet being washed at once by a co-extrusion method (lamination, blowing, and the like), a method of forming a coating film-like coating layer not yet being washed by coating the base material with the specific composition and drying and/or baking the specific composition, and the like. Among these, the co-extrusion method is preferable because this method makes it possible to more simply obtain a container.

The specific composition for forming a coating layer that is used for forming a coating layer not yet being washed will be described.

The specific composition for forming a coating layer is not particularly limited as long as it contains a polyolefin and a specific metal. In a case where the container is formed by the co-extrusion method, typically, the specific composition for forming a coating layer is prepared as pellets, and the pellets are melted and subjected to extrusion molding. At this time, it is preferable that the pellets are washed with the washing solution described above. In a case where the pellets are washed, it is easy to obtain a container satisfying predetermined conditions.

The present manufacturing method includes a washing step after the step of forming a coating layer not yet being washed. The washing step is a step of washing the surface of the coating layer not yet being washed by using the washing solution which will be described below. In a case where the surface of the coating layer not yet being washed is washed with a predetermined washing solution, the content of the specific metal tends to be smaller in the surface region than in the internal region in the obtained coating layer. In the present step, "surface" means a portion of the coating layer. The surface is preferably a portion of a part constituting a liquid contact portion in the coating layer, more preferably the entirety of a part constituting a liquid contact portion in the coating layer, even more preferably the entirety of the coating layer, and particularly preferably the entirety of the surface of the container.

Washing Step

The washing step is a step of washing the coating layer not yet being washed by using a washing solution containing at least one kind of component selected from the group consisting of pure water, an acid, a base, and an organic solvent.

The washing solution may contain at least one kind of component (hereinafter, referred to as "main agent" as well) selected from the group consisting of pure water, an acid, a base, and an organic solvent. The washing solution may contain two or more kinds of main agents. Particularly, in view of obtaining a container having further improved effects of the present invention, it is preferable that the washing solution contains at least one kind of main agent selected from the group consisting of an acid, a base, and an organic solvent.

The content of the main agent in the washing solution is not particularly limited. Generally, the content of the main agent with respect to the total mass of the washing solution is preferably 99.98% to 100% by mass. One kind of main agent may be used singly, or two or more kinds of main agents may be used in combination. In a case where two or more kinds of main agents are used in combination, the total content thereof is preferably within the above range.

The acid as a main agent is not particularly limited, and acids known to be used for a washing solution can be used. Examples of the acid include hydrochloric acid, hydrofluoric acid, sulfuric acid, nitric acid, phosphoric acid ($H_3PO_4$), phosphonic acid ($H_3PO_3$), an organic acid, a mixture of these and water, and the like.

As the organic acid, for example, it is possible to use the acids described in paragraph "0031" and paragraph "0032" in JP2014-232872A.

The base as a main agent is not particularly limited, and bases known to be used for a washing solution can be used. Examples of the base include an ammonium salt such as ammonium sulfate; a water-soluble nitrogen-containing compound such as triethanolamine or diethanolamine; a mixture of ammonium sulfate and water; and the like. In addition, for example, it is possible to use the inorganic bases, organic bases, and the like described in paragraphs "0030" to "0068" in JP2014-232874A.

The organic solvent as a main agent is not particularly limited, and organic solvents known to be used for a washing solution can be used. The organic solvent can be appropriately selected from at least one kind of organic solvent selected from the group consisting of a hydrocarbon-based solvent, a ketone-based solvent, an ester-based solvent, an alcohol-based solvent, an amide-based solvent, and an ether-based solvent. Specifically, examples of the organic solvent include isopropyl alcohol (IPA), propylene glycol monoalkyl ether, methyl isobutyl carbinol, cyclohexane, methyl ethyl ketone, methyl isobutyl ketone, butyl acetate, isopropyl acetate, propylene glycol monomethyl ether acetate, ethyl lactate, γ-butyrolactone, a mixture of these, a mixture of these and water, and the like.

The washing solution used in the washing step may contain metal ions. The content of the metal ions is not particularly limited, but is preferably equal to or smaller than 100 mass ppt, more preferably equal to or smaller than 50 mass ppt, and even more preferably equal to or smaller than 20 mass ppt. The lower limit thereof is not particularly limited. However, in view of quantitative lower limit, the lower limit is preferably equal to or greater than 0.01 mass ppt. In the present specification, the content of the metal ions contained in the washing solution can be measured using inductively coupled plasma mass spectrometer (ICP-MS). In a case where the washing solution contains two or more kinds of metal ions, the aforementioned content is the arithmetic mean of the content of each of the metal ions.

The washing solution used in the washing step may contain organic impurities. In the present specification, organic impurities mean organic compounds other than the main agent in the washing solution. The content of the organic impurities in the washing solution is not particularly limited, but is preferably equal to or smaller than 100 mass ppm, more preferably equal to or smaller than 50 mass ppm, and even more preferably equal to or smaller than 30 mass ppm. The lower limit thereof is not particularly limited. From the viewpoint of quantitative lower limit, the lower limit is preferably equal to or greater than 1.0 mass ppt, and more preferably equal to or greater than 0.1 mass ppm.

In the present specification, the content of the organic impurities contained in the washing solution can be measured using gas chromatography mass spectrometer (GC-MS) by the method described in Examples.

In a case where the washing solution contains two or more kinds of organic impurities, the aforementioned content is the arithmetic mean of the content of each of the organic impurities.

In the washing solution, the number of objects to be counted having a size equal to or greater than 30 nm that are counted by a light scattering-type liquid-borne particle counter is preferably equal to or smaller than 50 per 1 ml of the washing solution. In view of obtaining a container having further improved effects, the number of objects to be counted per 1 ml of the washing solution is preferably equal to or smaller than 100, and more preferably equal to or smaller than 50. The lower limit thereof is not particularly limited. From the viewpoint of quantitative lower limit, the lower limit is preferably equal to or greater than 0.1 in general.

Particularly, in view of obtaining a container having further improved effects of the present invention, for the washing solution, the content of the metal ions in the washing solution is preferably equal to or smaller than 100 mass ppt, the content of the organic impurities in the washing solution is preferably equal to or smaller than 100 mass ppm, and the number of objects to be counted having a size equal to or greater than 30 nm that are counted by a light scattering-type liquid-borne particle counter is preferably equal to or smaller than 50 per 1 ml of the washing solution.

The method for washing the coating layer not yet being washed is not particularly limited. Examples thereof include methods such as immersing the coating layer not yet being washed in the washing solution (by irradiating the immersed coating layer not yet being washed with ultrasound and/or by heating the washing solution, the effect can be further improved) and spraying the washing solution to the coating layer not yet being washed.

One kind of washing solution may be used singly, or two or more kinds of washing solutions may be used in combination. In a case where two or more kinds of washing solutions are used in combination, the washing solutions may be used by being mixed together, or the coating layer not yet being washed may be sequentially washed with two or more kinds of the washing solutions. Particularly, in view of obtaining a container having further improved effects of the present invention, it is preferable to sequentially wash the coating layer not yet being washed by using two or more kinds of the washing solutions.

Checking Step

The washing step may additionally has a checking step for measuring the content of impurities and the like contained in the washing solution having been used for washing and checking whether the content is within a preset range of numerical values. In the checking step, by checking the content of impurities and the like contained in the washing solution, it is possible to ascertain how thoroughly the substrate is washed.

Examples of the impurities and the like checked in the checking step include metal ions (particularly preferably ions of the specific metal) and organic impurities contained in the washing solution having been used for washing.

It is preferable that washing is repeated until the washing solution having been used for washing is found to satisfy the following condition 1 and condition 2 by the checking step.

Condition 1: in a case where the washing solution having been used for washing contains one kind of specific metal ions (ions of the specific metal), the content of one kind of the specific metal ions becomes equal to or smaller than 1.0 mass ppt (more preferably 0.01 mass ppt to 0.5 mass ppm), or in a case where the washing solution having been used for washing contains two or more kinds of specific metal ions, the average of the content of two or more kinds of the specific metal ions becomes equal to or smaller than 1.0 mass ppt (more preferably 0.01 mass ppt to 0.5 mass ppm).

Condition 2: in a case where the washing solution having been used for washing contains one kind of organic impurities, the content of the organic impurities is equal to or smaller than 500 mass ppm, or in a case where the washing solution having been used for washing contains two or more kinds of organic impurities, the average of the content of two or more kinds of the organic impurities is equal to or smaller than 500 mass ppt (more preferably 1.0 mass ppt to 300 mass ppm).

The content of the specific metal ions contained in the washing solution can be measured using ICP-MS.

The content of the organic impurities contained in the washing solution can be measured using GC-MS.

In the condition 1 and the condition 2, in a case where the content of each of the aforementioned components contained in the washing solutions is equal to or smaller than the upper limit, the coating layer is regarded as being thoroughly washed, and even though washing is performed plural times by using the same washing solution, the aforementioned components are inhibited from adhering again to the object of washing. Generally, the lower limit of the content is selected from quantitative lower limits.

In the washing step, washing may be performed once or plural times. Particularly, in view of obtaining a container having further improved effects of the present invention, the washing step is preferably a step of washing the substrate with the washing solution and then repeatedly washing the coating layer with the washing solution until the content of specific metal ions in the washing solution having been used for washing becomes equal to or smaller than 1.0 mass ppm and the content of organic impurities in the washing solution having been used for washing becomes equal to or smaller than 500 mass ppm.

By checking the content of the impurities and the like contained in the washing solution having been used for washing by the aforementioned method while repeatedly using the washing solution, it is possible to ascertain how thoroughly the coating layer is washed. According to the method for manufacturing a container having the steps described above, it is possible to more reliably manufacture a container satisfying predetermined conditions.

Second Embodiment of Method for Manufacturing Container

A second embodiment of the method for manufacturing a container of the present invention is a method for manufacturing a container formed of a composition, and has the following steps. Hereinafter, aspects of each of the steps will be specifically described.

<Step of Preparing Substrate>

The step of obtaining a substrate is a step of preparing a substrate formed of a composition containing a polyolefin and a specific metal. The substrate is prepared, for example, by purchasing, procurement, synthesis, and molding.

As the method for synthesizing the polyolefin used in the substrate, known synthesis methods can be used without particular limitation. Examples of the known synthesis methods include a slurry polymerization method, a vapor-phase polymerization method, and the like. The polymerization pressure is not particularly limited, but is preferably 1 to 100 atm and more preferably 3 to 30 atm. The polymerization temperature is not particularly limited, but is preferably 20° C. to 115° C. and more preferably 50° C. to 90° C. Particularly, in view of obtaining a container having further improved effects of the present invention, a slurry polymerization method is preferable. Examples of solvents used in the slurry polymerization method include isobutane, isopentane, heptane, hexane, octane, and the like.

As the method for forming a substrate by molding the polyolefin synthesized as above, known methods can be used without particular limitation. Examples of known molding methods include a blow molding method, an injection molding method, and the like, and the molding conditions are also known.

<Washing Step>

The washing step is a step of washing the prepared substrate with a washing solution, which contains at least one kind of component selected from the group consisting of pure water, an acid, a base, and an organic solvent, so as to obtain a container.

The washing solution and the washing method are the same as those described above in the first embodiment.

[Chemical Liquid Storage Body]

The chemical liquid storage body according to an embodiment of the present invention has the aforementioned container and a chemical liquid stored in the container. The container satisfies predetermined conditions. Therefore, even though the chemical liquid storage body is stored for a long period of time, the performance of the stored chemical liquid hardly deteriorates.

In view of inhibiting TOC components contained in voids from contaminating the chemical liquid and inhibiting oxygen contained in voids from deteriorating the chemical liquid, a filling rate in the container determined by Equation (X) is preferably equal to or higher than 60% by volume, more preferably equal to or higher than 70% by volume, and even more preferably equal to or higher than 85% by volume. The upper limit thereof is not particularly limited, but is equal to or lower than 99% by volume in many cases.

$$\text{Filling rate} = (\text{volume of chemical liquid in container}/\text{volume of container}) \times 100 \quad \text{Equation (X):}$$

In view of inhibiting TOC components contained in voids from contaminating the chemical liquid, the concentration of organic substances determined by Equation (Y) is preferably equal to or lower than 1 volume ppm. The lower limit of the concentration of organic substances is not particularly limited, but is equal to or higher than 0.1 volume ppb in many cases.

$$\text{Concentration of organic substances} = (\text{volume of organic substances contained in space not being filled with chemical liquid in container}/\text{volume of space not being filled with chemical liquid in container}) \times 100 \quad \text{Equation (Y):}$$

Here, the organic substances do not include the components contained in the chemical liquid.

The volume of the organic substances is calculated as 1 g/1 mL.

[Chemical Liquid]

The chemical liquid contained in the chemical liquid storage body is not particularly limited, and may be aqueous or based on an organic solvent. In the present specification, "aqueous" means that the content of moisture contained in the chemical liquid is greater than 50% by mass with respect to the total mass of the chemical liquid, and "based on a solvent" means that the content of an organic solvent contained in the chemical liquid (total amount in a case where the chemical liquid contains two or more kinds of organic solvents) is greater than 50% by mass.

<Aqueous Chemical Liquid>

The aqueous chemical liquid contains water. The content of the water in the chemical liquid is not particularly limited as long as it is greater than 50% by mass with respect to the total mass of the chemical liquid.

Examples of components contained in the aqueous chemical liquid include an alkaline developer, a resist stripping solution, an etching solution, a chemical mechanical polishing (CMP) slurry, a post-CMP cleaner, and the like.

The water is not particularly limited. As the water, ultrapure water used for semiconductor manufacturing is preferable, and water, which is obtained by further purifying ultrapure water so as to reduce the content of inorganic anions and metal ions, is more preferable. The purification method is not particularly limited, but is preferably purification using a filtration membrane or an ion exchange membrane and purification by distillation. In addition, for example, it is preferable to purify the water by the method described in JP2007-254168A.

It is preferable that the content of metals in the water is less than 0.001 mass ppt.

First Embodiment of Aqueous Chemical Liquid

Examples of a first embodiment of the aqueous chemical liquid include a chemical liquid containing (1) hydrofluoric acid or a salt of hydrofluoric acid (examples of salt include organic amines such as hydroxylamines, a primary, secondary, or tertiary aliphatic amine, an alicyclic amine, an aromatic amine, and a heterocyclic amine, aqueous ammonia, lower alkyl quaternary ammonium hydroxide, and the like), (2) an alkali compound (for example, one kind of compound selected from the group consisting of hydroxylamine or a salt thereof, amine, an amidine compound, and a quaternary ammonium compound), (3) others (a water-soluble organic solvent, a pH adjuster, a surfactant, an anticorrosive, and the like), and water.

This chemical liquid can be used as a resist stripping solution, an etching solution, a washing solution, and the like.

Second Embodiment of Aqueous Chemical Liquid

Examples of a second embodiment of the aqueous chemical liquid include a chemical liquid containing (1) abrasive grains such as colloidal silica, (2) an oxidant such as aqueous hydrogen peroxide, (3) an anticorrosive such as an azole compound, (4) others (an amino acid, a pH adjuster, a surfactant, and the like), and water. This chemical liquid can be used as a CMP slurry.

Third Embodiment of Aqueous Chemical Liquid

Examples of a third embodiment of the aqueous chemical liquid include a mixture of sulfuric acid, hydrogen peroxide, and water. This chemical liquid can be used as a stripping solution, a washing solution, and the like.

Fourth Embodiment of Aqueous Chemical Liquid

Examples of a fourth embodiment of the aqueous chemical liquid include a chemical liquid containing a quaternary ammonium compound and water. This chemical liquid can be used as a developer.

Quaternary Ammonium Compound

The aforementioned chemical liquid contains a quaternary ammonium compound represented by the following General Formula (N).

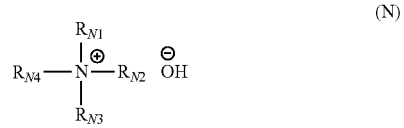

In General Formula (N), $R_{N1}$ to $R_{N4}$ each independently represent an alkyl group, a phenyl group, a benzyl group, or a cyclohexyl group. These groups may have a substituent.

The alkyl group represented by $R_{N1}$ to $R_{N4}$ preferably has 1 to 8 carbon atoms, and more preferably has 1 to 4 carbon atoms.

Examples of the substituent that the alkyl group, the phenyl group, the benzyl group, or the cyclohexyl group represented by $R_{N1}$ to $R_{N4}$ may have include a hydroxy group and the like.

Examples of the quaternary ammonium compound include tetramethylammonium hydroxide (TMAH), tetraethylammonium hydroxide (TEAH), tetrapropylammonium hydroxide, tetrabutylammonium hydroxide (TBAH), tetrapentylammonium hydroxide, tetrahexylammonium hydroxide, tetraoctylammonium hydroxide, ethyltrimethylammonium hydroxide, butyltrimethylammonium hydroxide, methyltriamylammonium hydroxide, dibutyldipentylammonium hydroxide, triethylphenyl ammonium hydroxide, trimethylbenzylammonium hydroxide, triethylbenzylammonium hydroxide, tribenzylmethylammonium hydroxide, tetrabenzylammonium hydroxide, trimethylcyclohexylammonium hydroxide, tributylcyclohexylammonium hydroxide, monohydroxyethyl trimethylammonium hydroxide, dihydroxyethyl dimethylammonium hydroxide (dimethylbis(2-hydroxyethyl)ammonium hydroxide), trihydroxyethyl monomethylammonium hydroxide, monohydroxyethyl triethylammonium hydroxide, dihydroxyethyl diethylammonium hydroxide, trihydroxyethyl monoethylammonium hydroxide, monohydroxypropyl trimethylammonium hydroxide, dihydroxypropyl di methyl ammonium hydroxide, trihydroxypropyl monomethylammonium hydroxide, monohydroxypropyl triethylammonium hydroxide, dihydroxypropyl diethylammonium hydroxide, trihydroxypropyl monoethylammonium hydroxide, and the like.

Among these, as the quaternary ammonium compound, tetramethylammonium hydroxide, tetraethylammonium hydroxide, tetrabutylammonium hydroxide, or dimethylbis(2-hydroxyethyl)ammonium hydroxide is preferable, and tetramethylammonium hydroxide or dimethylbis(2-hydroxyethyl)ammonium hydroxide is more preferable.

The content of the quaternary ammonium compound in the chemical liquid is not particularly limited. Generally, the content of the quaternary ammonium compound with respect to the total mass of the chemical liquid is preferably equal to or smaller than 25% by mass, and more preferably equal to or smaller than 20% by mass. Furthermore, the content of the quaternary ammonium compound with respect to the total mass of the chemical liquid is preferably equal to or greater than 15% by mass, and more preferably equal to or greater than 10% by mass.

One kind of quaternary ammonium compound may be used singly, or two or more kinds of quaternary ammonium compounds may be used in combination. In a case where two or more kinds of quaternary ammonium compounds are used in combination, the total content thereof is preferably within the above range.

The quaternary ammonium compound can be purified by known methods. For example, in addition to the adsorption purification using silicon carbide described in WO12/043496A, repeated filtration using filter can be performed for purification.

Chelating Agent

The chemical liquid may contain a chelating agent. The chelating agent is not particularly limited, but is preferably a compound forming a coordinate bond with a metal atom through two or more functional groups in one molecule. The functional groups may be metal adsorbing groups. The chelating agent more preferably contains two or more metal adsorbing groups in one molecule.

As the metal adsorbing group, an acid group or a cationic group is preferable. The acid group preferably has an acid dissociation constant (pKa) equal to or lower than 7. Examples of the acid group include a phenolic hydroxyl group, —COOH, —SO$_3$H, —OSO$_3$H, —PO$_3$H$_2$, —OPO$_3$H$_2$, COCH$_2$COCH$_3$, and the like. As the acid group, —COOH is particularly preferable.

These acid groups may be salts of acid groups. Examples of the salts of acid groups include a metal salt and a salt of nitrogen-containing cation.

As the metal salt, at least one kind of salt selected from the group consisting of Na, K, Ca, Fe, Cu, Mg, Mn, Li, Al, Cr, Ni, and Zn is preferable.

The nitrogen-containing cation is not particularly limited as long as it is a cation as a hydrogen adduct of a quaternary ammonium cation and an amine.

Examples of the quaternary ammonium cation include a tetramethylammonium cation, a tetraethylammonium cation, a tetrapropylammonium cation, a methyltributylammonium cation, a tetrabutylammonium cation, a choline-type cation (hydroxyethyl trimethylammonium cation), and the like.

Among these, a tetramethylammonium cation, a tetraethylammonium cation, a tetrapropylammonium cation, a tetrabutylammonium cation, or a choline-type cation is preferable, and a tetramethylammonium cation, a tetraethylammonium cation, a tetrapropylammonium cation, or a choline-type cation is more preferable.

Furthermore, a cationic polymer may be used as a counterion.

The cationic group as the metal adsorbing group is preferably an onium group. Examples of the onium group include an ammonium group, a phosphonium group, an arsonium group, a stibonium group, an oxonium group, a sulfonium group, a selenonium group, a stannonium group, and an iodonium group. As the onium group, an ammonium group, a phosphonium group, or a sulfonium group is preferable, an ammonium group or a phosphonium group is more preferable, and an ammonium group is even more preferable.

Specific examples of the chelating agent of the present invention include a compound having a carboxy group (hereinafter, referred to as "carboxylic acid compound" as appropriate). The carboxylic acid compound has at least one carboxy group in one molecule. The carboxylic acid compound more preferably has two or more carboxy groups in one molecule.

It is preferable that the carboxylic acid compound having one carboxy group has, in addition to the carboxy group, another metal absorbing group or a functional group such as an alcoholic hydroxyl group, a mercapto group, an amino group, or a carbonyl which is capable of forming a coordinate bond with a metal although the binding force thereof is weaker than that of a carboxy group. Specifically, examples thereof include glycolic acid, thioglycolic acid, lactic acid, β-hydroxypropionic acid, gluconic acid, pyruvic acid, acetoacetate, salicylic acid, 5-sulfosalicylic acid, β-alanine, phenylalanine, N-ethylglycine, and the like.

Specific examples of the carboxylic acid compound having two carboxy groups include oxalic acid, malonic acid, succinic acid, glutaric acid, adipic acid, pimelic acid, suberic acid, azelaic acid, sebacic acid, maleic acid, phthalic acid, 3-sulfophthalic acid, 4-sulfophthalic acid, 2-sulfoterephthalic acid, 3-hydroxyphthalic acid, 4-hydroxyphthalic acid, tartaric acid, malic acid, dipicolinic acid, citric acid, and the like.

Among these, a compound such as 3-sulfophthalic acid, 4-sulfophthalic acid, or 2-sulfoterephthalic acid which has two or more carboxy groups and one sulfo group on an aromatic ring; a compound such as 5-sulfosalicylic acid which has a hydroxyl group, a carboxy group, and a sulfo group on an aromatic ring; 4-hydroxyphthalic acid, oxalic acid, tartaric acid, malic acid, dipicolinic acid, and the like are preferable, and sulfophthalic acid such as 3-sulfophthalic acid or 4-sulfophthalic acid; 5-sulfosalicylic acid; and 4-hydroxyphthalic acid are more preferable.

Furthermore, the following low-molecular-weight organic compound, which has three or more carboxy groups but does not have other functional groups containing atoms other than a carbon atom and a hydrogen atom, is also preferred as the carboxylic acid compound.

Specific examples of the compound include propane-1,2,3-tricarboxylic acid, butane-1,2,3-tricarboxylic acid, butane-1,2,4-tricarboxylic acid, butane-1,2,3,4-tetracarboxylic acid, 2-carboxymethylpropane-1,3-dicarboxylic acid, pentane-1,2,3-tricarboxylic acid, pentane-1,2,4-tricarboxylic acid, pentane-1,2,5-tricarboxylic acid, pentane-1,3,4-tricarboxylic acid, acid, pentane-2,3,4-tricarboxylic acid, pentane-1,2,3,4-tetracarboxylic acid, pentane-1,2,3,5-tetracarboxylic acid, 2-carboxymethylbutane-1,3-dicarboxylic acid, 2-carboxymethylbutane-1,4-dicarboxylic acid, 3-carboxymethylbutane-1,2-dicarboxylic acid, 3-carboxymethylbutane-1,2,4-tricarboxylic acid, 2,2-dicarboxymethylpropane-1,3-dicarboxylic acid, 1,2,3,4-cyclopentanetetracarboxylic acid, hemimellitic acid, trimellitic acid, pyromellitic acid, naphthalene-1,4,5,8-tetracarboxylic acid, and the like.

Among these, a compound having three or more carboxy groups substituted with an alkyl group having five or less carbon atoms is preferable, and propane-1,2,3-tricarboxylic acid is more preferable.

In addition, a compound such as 2-phosphonobutane-1,2,3-tricarboxylic acid is preferable which has three or more carboxy groups and has another functional group containing a heteroatom.

Furthermore, as the chelating agent, a compound represented by the following General Formula (K1) or a compound represented by the following General Formula (K2) is preferable.

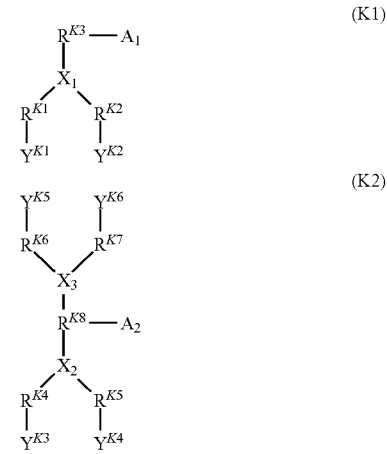

In General Formula (K1), $R^{K1}$ and $R^{K2}$ each independently represent a single bond or an alkylene group.

$R^{K3}$ represents a divalent organic group.

$X_1$ represents a CH group or a nitrogen atom.

$Y^{K1}$ and $Y^{K2}$ each independently represent a metal adsorbing group.

$A_1$ represents a hydrogen atom or a hydrophilic group.

In General Formula (K2), $R^{K4}$, $R^{K5}$, $R^{K6}$, and $R^{K7}$ each independently represent a single bond or an alkylene group.

$R^{K8}$ represents a trivalent organic group.

$X_2$ and $X_3$ represent a CH group or a nitrogen atom.

$Y^{K3}$, $Y^{K4}$, $Y^{K5}$, and $Y^{K6}$ each independently represent a metal adsorbing group.

$A_2$ represents a hydrogen atom or a hydrophilic group.

Hereinafter, General Formula (K1) will be described.

$R^{K1}$ and $R^{K2}$ each independently represent a single bond or an alkylene group.

For example, the alkylene group represented by $R^{K1}$ and $R^{K2}$ preferably has 1 to 6 carbon atoms, and more preferably has 1 to 3 carbon atoms.

The alkylene group represented by $R^{K1}$ and $R^{K2}$ may be linear or branched, and is preferably linear.

Specifically, as the alkylene group represented by $R^{K1}$ and $R^{K2}$, a methylene group is more preferable.

$R^{K3}$ represents a divalent organic group. The organic group refers to a group having at least one carbon atom.

Examples of the divalent organic group represented by $R^{K3}$ include an alkylene group, an arylene group, and the like.

The alkylene group represented by $R^{K3}$ may be linear or branched, and is preferably linear.

The alkylene group and the arylene group represented by $R^{K3}$ preferably has 1 to 10 carbon atoms, more preferably has 1 to 8 carbon atoms, and even more preferably has 1 to 6 carbon atoms.

As the divalent organic group represented by $R^{K3}$, a methylene group, an ethylene group, or a phenyl group is preferable.

$X_1$ represents a CH group or a nitrogen atom. $X_1$ is preferably a nitrogen atom.

$Y^{K1}$ and $Y^{K2}$ each independently represent a metal adsorbing group.

As the metal adsorbing group, an acid group or a cationic group is preferable. Specifically, examples thereof are the same as those listed as specific examples of the acid group or the cationic group described above regarding the metal adsorbing group of the carboxylic acid compound. Furthermore, the cationic group may be a counterion.

$A_1$ represents a hydrogen atom or a hydrophilic group.

Examples of the hydrophilic group represented by $A_1$ include a hydroxyl group, a carboxy group, a carboxylate group, a hydroxyethyl group, a polyoxyethyl group, a hydroxypropyl group, a polyoxypropyl group, an amino group, an aminoethyl group, an aminopropyl group, an ammonium group, an amide group, a carboxymethyl group, a sulfo group, a phosphoric acid group, and the like.

The hydrophilic group represented by $A_1$ is preferably a hydroxyl group.

Hereinafter, General Formula (K2) will be described.

$R^{K4}$, $R^{K5}$, $R^{K6}$, and $R^{K7}$ each independently represent a single bond or an alkylene group.

The alkylene group represented by $R^{K4}$, $R^{K5}$, $R^{K6}$, and $R^{K7}$ has the same definition as $R^{K1}$ and $R^{K2}$ in General Formula (K1). Preferred aspects of $R^{K4}$, $R^{K5}$, $R^{K6}$, and $R^{K7}$ are the same as preferred aspects of $R^{K1}$ and $R^{K2}$ in General Formula (K1).

$R^{K8}$ represents a trivalent organic group. The organic group refers to a group having at least one carbon atom.

The trivalent organic group represented by $R^{K8}$ preferably has 1 to 10 carbon atoms, more preferably has 1 to 8 carbon atoms, and even more preferably has 1 to 6 carbon atoms. Furthermore, the trivalent organic group may have substituents. The substituents may form a cyclic structure by being bonded to each other, and the organic group may have a heteroatom in the organic chain thereof. As the cyclic structure formed by the bonding of the substituents, a cycloalkyl group is preferable. Furthermore, as the heteroatom that the organic group may have in the main chain thereof, an oxygen atom or a nitrogen atom is preferable.

$X_2$ and $X_3$ represent a CH group or a nitrogen atom. $X_2$ is preferably a nitrogen atom. $X_3$ is preferably a nitrogen atom.

$Y^{K3}$, $Y^{K4}$, $Y^{K5}$, and $Y^{K6}$ each independently represent a metal adsorbing group.

The metal adsorbing group represented by $Y^{K3}$, $Y^{K4}$, $Y^{K5}$, and $Y^{K6}$ has the same definition as the metal adsorbing group represented by $Y^{K1}$ and $Y^{K2}$ in General Formula (K1). Preferred aspects of the metal adsorbing group represented by $Y^{K3}$, $Y^{K4}$, $Y^{K5}$, and $Y^{K6}$ are the same as preferred aspects of the metal adsorbing group represented by $Y^{K1}$ and $Y^{K2}$ in General Formula (K1).

$A_2$ represents a hydrogen atom or a hydrophilic group.

The hydrophilic group represented by $A_2$ has the same definition as $A_1$ in General Formula (K1). Preferred aspects of $A_2$ are the same as preferred aspects of $A_1$ in General Formula (K1).

Specific examples of the chelating agent represented by General Formula (K1) and the chelating agent represented by General Formula (K2) will be shown below.

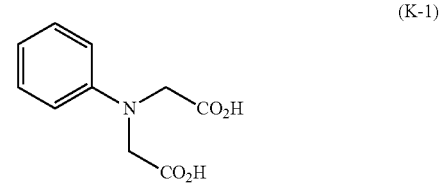

(K-1)

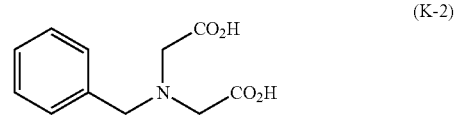

(K-2)

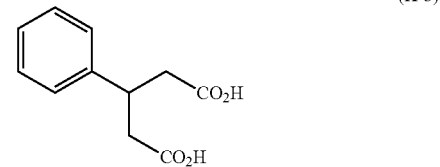

(K-3)

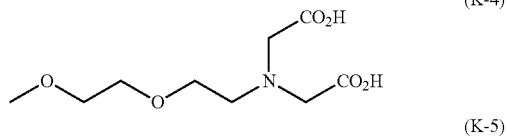

(K-4)

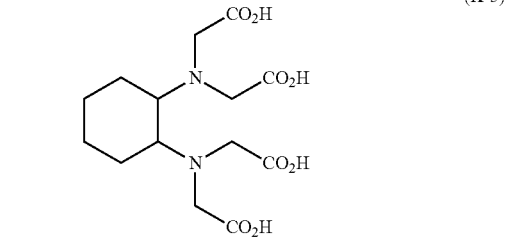

(K-5)

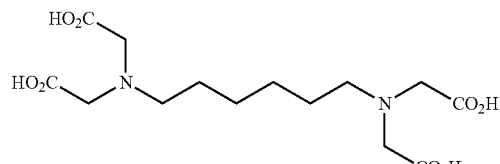
(K-6)

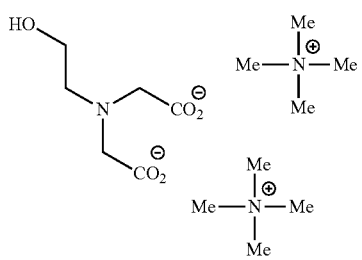
(K-7)

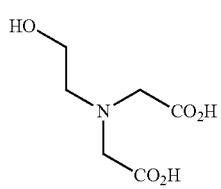
(K-8)

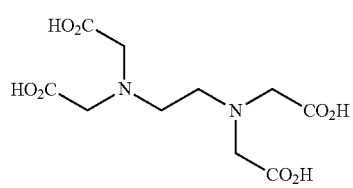
(K-9)

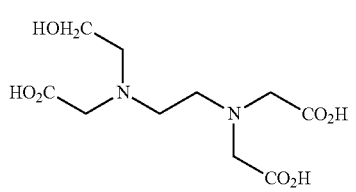
(K-10)

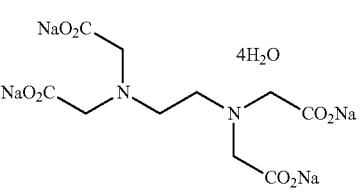
(K-11)

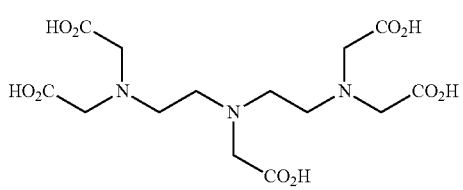
(K-12)

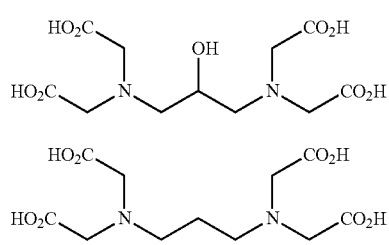
(K-13)

(K-14)

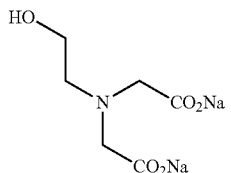
(K-15)

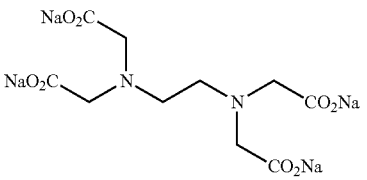
(K-16)

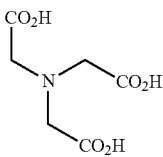
(K-17)

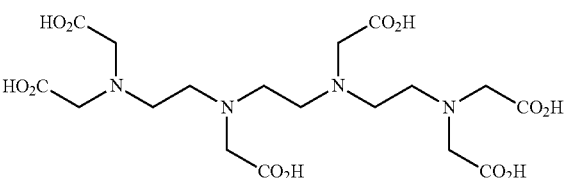
(K-18)

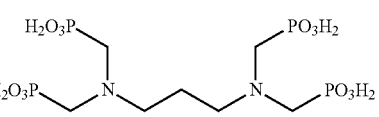
(K-19)

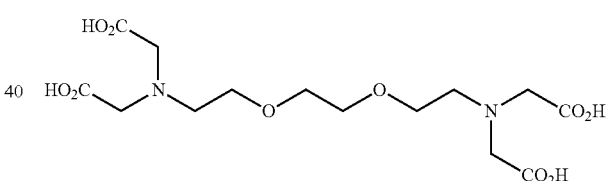
(K-20)

In a case where a treatment solution for semiconductor manufacturing of the present invention is used as a developer, the chelating agent is preferably a chelating agent for a divalent metal.

Examples of the chelating agent for a divalent metal include polyphosphate such as $Na_2P_2O_7$, $Na_5P_3O_3$, $Na_3P_3O_9$, $Na_2O_4P(NaO_3P)PO_3Na_2$, or Calgon (sodium polymetaphosphate), aminopolycarboxylic acids such as ethylenediamine tetraacetic acid and a potassium salt, a sodium salt, and an amine salt thereof; diethylenetriamine pentaacetic acid and a potassium salt and a sodium salt thereof; triethylenetetramine hexaacetic acid and a potassium salt and a sodium salt thereof; hydroxyethyl ethylenediamine triacetic acid and a potassium salt and a sodium salt thereof; nitrilotriacetic acid and a potassium salt and a sodium salt thereof; 1,2-diaminocyclohexane tetraacetic acid and a potassium salt and a sodium salt thereof; and 1,3-diamino-2-propanol tetraacetic acid and a potassium salt and a sodium salt thereof; and organic phosphonic acids such as 2-phosphonobutanonetricarboxylic acid-1,2,4 and a potassium salt and a sodium salt thereof; 2-phosphonobutanotricarboxylic acid-2,3,4 and a potassium salt and a sodium salt thereof; 1-phosphonoethanetricarboxylic acid-1,2,2 and a potassium salt and a sodium salt thereof; 1-hydroxyethane-1,1-diphosphonic acid and a potassium salt and a sodium salt thereof; and aminotri(methylenephosphonic acid) and a potassium salt and a sodium salt thereof.

Among these, ethylenediamine tetraacetic acid and a potassium salt, a sodium salt, and an amine salt thereof; ethylenediamine tetra(methylenephosphonic acid) and an ammonium salt and a potassium salt thereof; and hexamethylenediamine tetra(methylenephosphonic acid) and an ammonium salt and a potassium salt thereof are preferable.

In a case where the chemical liquid is used as a developer, generally, the optimal amount of the chelating agent for a divalent metal with respect to the total mass of the chemical liquid is preferably 0.01% to 5% by mass, and more preferably 0.01% to 0.5% by mass.

<Chemical Liquid Based on Organic Solvent>

The chemical liquid based on an organic solvent contains an organic solvent. The content of the organic solvent in the chemical liquid with respect to the total mass of the chemical liquid is not particularly limited as long as it is greater than 50% by mass. Generally, the content of the organic solvent with respect to the total mass of the chemical liquid is preferably 97.0% to 99.999% by mass, and more preferably 99.9% to 99.9% by mass. One kind of organic solvent may be used singly, or two or more kinds of solvents may be used in combination. In a case where two or more kinds of organic solvents are used in combination, the total content thereof is preferably within the above range.

In the present specification, an organic solvent means one liquid organic compound which is contained in the chemical liquid in an amount greater than 10,000 mass ppm with respect to the total mass of the chemical liquid. That is, in the present specification, a liquid organic compound contained in the chemical liquid in an amount greater than 10,000 mass ppm with respect to the total mass of the chemical liquid corresponds to an organic solvent.

In the present specification, "liquid" means that the compound stays in liquid form at 25° C. under atmospheric pressure.

(Organic Solvent)

The type of the organic solvent is not particularly limited, and known organic solvents can be used. Examples of the organic solvent include alkylene glycol monoalkyl ether carboxylate, alkylene glycol monoalkyl ether, a lactic acid alkyl ester, alkoxyalkyl propionate, cyclic lactone (preferably having 4 to 10 carbon atoms), a monoketone compound which may have a ring (preferably having 4 to 10 carbon atoms), alkylene carbonate, alkoxyalkyl acetate, alkyl pyruvate, and the like.

Furthermore, as the organic solvent, those described in JP2016-057614A, JP2014-219664A, JP2016-138219A, and JP2015-135379A may be used.

As the organic solvent, at least one kind of organic solvent is preferable which is selected from the group consisting of propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, γ-butyrolactone, diisoamyl ether, butyl acetate, isoamyl acetate, isopropanol, and 4-methyl-2-pentanol, dimethyl sulfoxide, n-methyl-2-pyrrolidone, diethylene glycol, ethylene glycol, dipropylene glycol, propylene glycol, ethylene carbonate, propylene carbonate, sulfolane, cycloheptanone, and 2-heptanone.

Examples of the chemical liquid based on an organic solvent include a solvent-based developer, prewet solution, and the like.

<Other Components>

The chemical liquid may contain other components in addition to the above components. Examples of those other components include a surfactant, specific metal ions, other impurities, and the like.

(Surfactant)

It is preferable that the chemical liquid contains a surfactant. The content of the surfactant in the chemical liquid is not particularly limited. Generally, the content of the surfactant with respect to the total mass of the surfactant is preferably 0.0001% to 2.0% by mass, and more preferably 0.0005% to 1.0% by mass.

One kind of surfactant may be used singly, or two or more kinds of surfactants may be used in combination. In a case where two or more kinds of surfactants are used in combination, the total content thereof is preferably within the above range.

As the surfactant contained in the chemical liquid, known surfactants can be used without particular limitation. As the surfactant, a fluorine-based surfactant and/or a silicon-based surfactant may be used, or other surfactants may be used. As those other surfactants, it is possible to appropriately use an anionic surfactant, a nonionic surfactant, or a cationic surfactant, which will be described later, containing none of fluorine and silicon.

Examples of the fluorine-based surfactant and/or the silicon-based surfactant include the surfactants described in paragraph "0276" in US2008/0248425B.

Furthermore, as surfactants other than the fluorine-based surfactant and the silicon-based surfactant, for example, it is possible to use the surfactants described in paragraph "0280" in US2008/0248425B. In addition, the surfactants described in paragraphs "0313" to "0316" in JP2010-256842A can also be used.

One kind of surfactant may be used singly, or two or more kinds of surfactants may be used in combination. In a case where two or more kinds of surfactants are used in combination, the total content thereof is preferably within the above range.

In a case where the composition according to the embodiment of the present invention contains a surfactant, the amount of the surfactant used with respect to the total solid content in the composition is preferably 0.0001% to 2% by mass, and more preferably 0.0005% to 1% by mass.

As surfactants other than the above surfactants, an anionic surfactant, a nonionic surfactant, and a cationic surfactant can also be used.

Examples of the anionic surfactant include an alkyl sulfuric acid ester, alkyl sulfonate, alkyl benzene sulfonate, alkyl naphthalene sulfonate, alkyl diphenyl ether sulfonate, polyoxyethylene alkyl ether carboxylate, polyoxyethylene alkyl ether acetate, polyoxyethylene alkyl ether propionate, polyoxyethylene alkyl ether sulfate, polyoxyethylene aryl ether acetate, polyoxyethylene aryl ether propionate, polyoxyethylene aryl ether sulfate, salts of these, and the like.

Among these, an alkyl sulfuric acid ester, polyoxyethylene aryl ether sulfate, or polyoxyethylene alkyl ether sulfate is preferable, and polyoxyethylene aryl ether sulfate is more preferable.

Examples of the nonionic surfactant include a polyalkylene oxide alkyl phenyl ether-based surfactant, a polyalkylene oxide alkyl ether-based surfactant, a block copolymer-based surfactant formed of polyethylene oxide and polypropylene oxide, a polyoxyalkylene distyrenated phenyl ether-based surfactant, a polyalkylene tribenzyl phenyl ether-based surfactant, an acetylene polyalkylene oxide-based surfactant, and the like.

As the nonionic surfactant, a compound represented by the following General Formula (A1) is preferable.

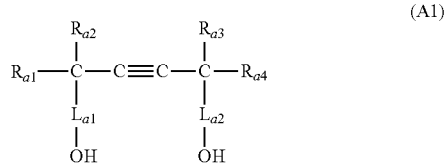
(A1)

In General Formula (A1), $R_{a1}$, $R_{a2}$, $R_{a3}$, and $R_{a4}$ each independently represent an alkyl group.

$L_{a1}$ and $L_{a2}$ each independently represent a single bond or a divalent linking group.

Hereinafter, General Formula (A1) will be described.

$R_{a1}$, $R_{a2}$, $R_{a3}$, and $R_{a4}$ each independently represent an alkyl group.

The alkyl group represented by $R_{a1}$, $R_{a2}$, $R_{a3}$, and $R_{a4}$ may be linear or branched and may have a substituent.

The alkyl group represented by $R_{a1}$, $R_{a2}$, $R_{a3}$, and $R_{a4}$ preferably has 1 to 5 carbon atoms. Examples of the alkyl group having 1 to 5 carbon atoms include a methyl group, an ethyl group, an isopropyl group, a butyl group, and the like.

$L_{a1}$ and $L_{a2}$ each independently represent a single bond or a divalent linking group. As the divalent linking group represented by $L_{a1}$ and $L_{a2}$, an alkylene group, a —$OR_{a5}$— group, and a combination of these are preferable. $R_{a}$, represents an alkylene group.

Examples of the nonionic surfactant include 2,4,7,9-tetramethyl-5-decyne-4,7-diol, 3,6-dimethyl-4-octyne-3,6-diol, and 3,5-dimethyl-1-hexyne-triol.

Examples of the compound represented by General Formula (A2) include a compound represented by the following General Formula (A2).

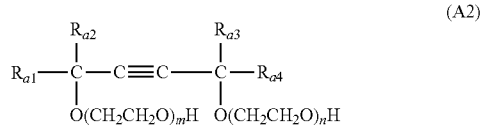
(A2)

In General Formula (A2), $R_{a1}$, $R_{a2}$, $R_{a3}$, and $R_{a4}$ each independently represent an alkyl group.

m and n each independently represent a positive number of 0.5 to 80. m and n satisfy m+n≥1.

Hereinafter, General Formula (A2) will be described.

$R_{a1}$, $R_{a2}$, $R_{a3}$, and $R_{a4}$ each independently represent an alkyl group.

The alkyl group represented by $R_{a1}$, $R_{a2}$, $R_{a3}$, and $R_{a4}$ has the same definition as the alkyl group represented by $R_{a1}$, $R_{a2}$, $R_{a3}$, and $R_{a4}$ in General Formula (A1).

m and n each represent the number of moles of ethylene oxide added. m and n each independently represent a positive number of 0.5 to 80. m and n satisfy m+n≥1. As m and n, any number can be selected as long as the number is within a range satisfying m+n≥1. m and n preferably satisfy 1≤m+n≤100, and more preferably satisfy 3≤m+n≤80.

Examples of the compound represented by General Formula (A2) include 2,5,8,11-tetramethyl-6-dodecyne-5,8-diol, 5,8-dimethyl-6-dodecyne-5,8-diol, 2,4,7,9-tetramethyl-5-decyne-4,7-diol, 4,7-dimethyl-5-decyne-4,7-diol, 8-hexadecyne-7,10-diol, 7-tetradecyne-6,9-diol, 2,3,6,7-tetramethyl-4-octyne-3,6-diol, 3,6-diethyl-4-octyne-3,6-diol, 3,6-dimethyl-4-octyne-3,6-diol, 2,5-dimethyl-3-hexyne-2,5-diol, and the like.

As the nonionic surfactant, commercial products can be used. Specifically, examples thereof include SURFYNOL 82, 465, and 485 and DYNOL 604 and 607 manufactured by Air Products & Chemicals, Inc., OLFINE STG and OLFINE E1010 manufactured by Nissin Chemical Co., Ltd., and the like.

The value of hydrophilic-lipophilic balance (HLB) of the nonionic surfactant is preferably equal to or greater than 8, and more preferably equal to or greater than 10. Furthermore, the HLB value of the nonionic surfactant is preferably equal to or smaller than 16, and more preferably equal to or smaller than 14. The HLB value is defined by a value calculated by the Griffin's formula (20 Mw/M; Mw=molecular weight of hydrophilic moiety, M=molecular weight of nonionic surfactant). In some cases, the values descried in a catalog or the values calculated by other methods may also be used.

Two or more kinds of nonionic surfactants may be used in combination. In a case where two or more kinds of nonionic surfactants are used, it is preferable that at least two kinds of nonionic surfactants are the compound represented by General Formula (A1).

It is also preferable that two or more kinds of the nonionic surfactants include at least one kind of nonionic surfactant having HLB equal to or greater than 12 and at least one kind of nonionic surfactant having HLB equal to or smaller than 10. According to the combination described above, in a case where the chemical liquid is used as a developer, a pattern having excellent rectangularity can be obtained.

The total mass of the nonionic surfactant having HLB equal to or greater than 12 with respect to the total mass of the nonionic surfactant having HLB equal to or smaller than 10 is preferably 0.5 to 4, more preferably 0.7 to 3.5, and even more preferably 1.0 to 3.0. According to the inventors of the present invention, it was found that in a case where the total mass of the nonionic surfactant having HLB equal to or greater than 12 is greater than the total mass of the nonionic surfactant having HLB equal to or smaller than 10, and the chemical liquid is used as a developer, a pattern having excellent rectangularity is obtained.

Examples of the cationic surfactant include a quaternary ammonium salt-based surfactant, an alkyl pyridium-based surfactant, and the like.

Examples of the quaternary ammonium salt-based surfactant include tetramethyl ammonium chloride, tetrabutyl ammonium chloride, dodecyldimethylbenzyl ammonium chloride, alkyltrimethyl ammonium chloride, octyltrimethyl ammonium chloride, decyltrimethyl ammonium chloride, dodecyltrimethyl ammonium chloride, tetradecyltrimethyl ammonium chloride, cetyltrimethyl ammonium chloride, stearyltrimethyl ammonium chloride, and the like. The quaternary ammonium salt-based surfactant is not particularly limited, but is preferably dodecyldimethylbenzyl ammonium chloride.

Examples of the alkyl pyridium-based surfactant include butyl pyridinium chloride, dodecyl pyridinium chloride, cetyl pyridinium chloride, and the like. The alkyl pyridium-based surfactant is not particularly limited, but is preferably butyl pyridinium chloride.

For obtaining the cationic surfactant, for example, first, triethanolamine, methyldiethanolamine, 3-(N,N-dimethylamino)-1,2-propylene glycol, or the like is acylated using a long-chain fatty acid or methyl fatty acid so as to synthesize an alkanolamine ester as an intermediate. Thereafter, by using a quaternization agent such as methyl chloride, dimethyl sulfate, or diethyl sulfate, the intermediate is converted into a cationic compound, thereby obtaining the cationic surfactant.

[Physical Properties of Chemical Liquid]

<Condition 1>

It is preferable that the chemical liquid stored in the chemical liquid storage body satisfies the following condition 1, because then the performance of the chemical liquid tends to be maintained for a longer period of time.

Condition 1: in a case where a surface of a substrate is coated with the chemical liquid and measured using a particle inspection device before and after the coating with the chemical liquid, a change in density of particles on the substrate having a particle diameter equal to or smaller than 19 nm is equal to or smaller than 0.3 particles/cm$^2$. The change in density of particles is more preferably equal to or smaller than 0.2 particles/cm$^2$, and even more preferably equal to or smaller than 0.1 particles/cm$^2$, because then the performance of the chemical liquid tends to be maintained for a longer period of time.

How to check whether the chemical liquid taken out of the container satisfies the condition 1 will be described. First, a surface of a substrate is coated with the chemical liquid. At this time, the substrate to be used is not particularly limited. However, a silicon wafer is preferable because this substrate makes it possible to more simply measure the change in density of particles. As the coating method, spin coating is preferable.

Then, a change in density of the particles on the substrate before and after coating is measured, and whether the change is equal to or smaller than 0.3 particles/cm$^2$ is checked. The change in density of the particles on the substrate before and after coating with the chemical liquid can be determined by measuring the density of the particles on the substrate not yet being coated with the chemical liquid and the density of the particles on the substrate having been coated with the chemical liquid, and calculating a difference therebetween. In this case, the density of the particles on the substrate before and after coating can be measured, for example, by a method of using a particle inspection device. For example, the density can be measured using SP-5 manufactured by KLA-Tencor Corporation, and the like.

<Condition 2>

It is preferable that the chemical liquid stored in the chemical liquid storage body satisfies the following condition 2, because then the performance of the chemical liquid tends to be maintained for a longer period of time.

Condition 2: the chemical liquid contains water, the content of the water in the chemical liquid is equal to or smaller than 50% by mass, and a content of particle-like substances, which are measured using a single particle inductively coupled plasma mass spectrometer (SP-ICP-MS) and have a particle diameter equal to or smaller than 30 nm, in the chemical liquid is equal to or smaller than 1.0 mass ppb (preferably equal to or smaller than 0.5 mass ppb, and more preferably equal to or smaller than 0.2 mass ppb) with respect to the total mass of the chemical liquid.

The device used in SP-ICP-MS is the same as the device used in general inductively coupled mass spectrometry (ICP-MS) (hereinafter, simply referred to as "ICP-MS" as well). The only difference between SP-ICP-MS and ICP-MS is how to analyze data. With SP-ICP-MS, data can be analyzed using commercial software.

With ICP-MS, the content of components as a measurement target is measured regardless of the way the metal components are present. Accordingly, the components as a measurement target is quantified as a total mass of substances in the form of particles (particle-like substances) and ions.

In contrast, with SP-ICP-MS, the content of the particle-like substances, which are components as a measurement target, is separately measured.

Examples of the device for SP-ICP-MS include Agilent 8800 triple quadrupole inductively coupled plasma mass spectrometry (ICP-MS, for semiconductor analysis, option #200) manufactured by Agilent Technologies, Inc. This device can measure the content of the particle-like substances by the method described in Examples. Examples of the device other than the above include NexION350S manufactured by PerkinElmer Inc., Agilent 8900 manufactured by Agilent Technologies, Inc., and the like.

<Amount of Metal Components>

The amount of metal components in the chemical liquid is not particularly limited, but is preferably equal to or smaller than 1 mass ppb. Examples of the metal components include metal ions, metal particles, and the like.

<Content of Compound Having Boiling Point Equal to or Higher than 300° C.>

In the chemical liquid, the content of a compound having a boiling point equal to or higher than 300° C. is not particularly limited, but is preferably equal to or smaller than 1 mass ppm.

Examples of the compound having a boiling point equal to or higher than 300° C. include an organic compound selected from the group consisting of an ester structure, an sulfonamide structure, an amide structure, a urethane structure, a urea structure, and a carbonic acid ester structure.

<Specific Metal Ions>

In a case where the chemical liquid contains one kind of specific metal ions, the content of one kind of the specific metal ions is preferably equal to or smaller than 1,000 mass ppt, more preferably equal to or smaller than 500 mass ppt, and even more preferably equal to or smaller than 100 mass ppt. The lower limit thereof is not particularly limited. In view of quantitative lower limit, the lower limit is preferably equal to or greater than 0.01 mass ppt in general.

At the time of evaluation, in a case where the content of the specific metal ions is measured after the chemical liquid is concentrated, the content can be more accurately measured.

In a case where the chemical liquid contains two or more kinds of specific metal ions, it is preferable that the arithmetic mean of the content of two or more kinds of the specific metal ions is within the above range.

<Objects to be Counted>

In the chemical liquid, the number of objects to be counted having a size equal to or greater than 30 nm that are counted by a light scattering-type liquid-borne particle counter is preferably equal to or smaller than 100 per 1 ml of the chemical liquid, more preferably equal to or smaller than 70 per 1 ml of the chemical liquid, and even more preferably equal to or smaller than 30 per 1 ml of the chemical liquid. The lower limit thereof is not particularly limited. From the viewpoint of quantitative lower limit, the lower limit is preferably equal to or greater than 0.1 in general.

<Other Impurities (Inorganic Salts)>

In a case where the chemical liquid contains an anionic surfactant or a cationic surfactant, sometimes the chemical liquid contains inorganic salts as impurities. Examples of the inorganic salts include sulfate, nitrate, acetate, phosphate, and the like.

In the chemical liquid, the content of the inorganic salts with respect to the total mass of the chemical liquid is preferably 1.0 mass ppq to 1,000 mass ppt, more preferably 5.0 mass ppq to 500 mass ppt, even more preferably 10 mass ppq to 500 mass ppt, and particularly preferably 100 mass ppq to 100 mass ppt.

The inorganic salts react with metal atoms in the chemical liquid, and as a result, metal salts are precipitated, which lead to the occurrence of defects. Accordingly, it is preferable that the content of the inorganic salts with respect to the chemical liquid is within the above range.

<Other Impurities (Peroxides)>

In a case where the chemical liquid contains a nonionic surfactant, sometimes the chemical liquid contains peroxides as impurities.

Examples of the peroxides include calcium peroxide, magnesium peroxide, potassium peroxide, sodium peroxide, and the like.

In the chemical liquid, the content of the peroxides with respect to the total mass of the chemical liquid is preferably 1.0 mass ppq to 1,000 mass ppt, more preferably 5.0 mass ppq to 500 mass ppt, even more preferably 10 mass ppq to 500 mass ppt, and particularly preferably 100 mass ppq to 100 mass ppt. The peroxides cause the deterioration of electrical characteristics of electronic devices and cause pattern defects. Accordingly, it is preferable that the content of the peroxides with respect to the chemical liquid is within the above range.

<Other Impurities (Ester Compounds)>

In a case where the chemical liquid contains a nonionic surfactant, sometimes the chemical liquid contains ester compounds as impurities.

Examples of the ester compounds include a stearic acid methyl ester, a stearic acid octyl ester, an oleic acid butyl ester, a lauric acid oleyl ester, a palmitic acid stearyl ester, a behenic acid stearyl ester, a myristic acid myristyl ester, an acrylic acid hexyl ester, a methacrylic acid octyl ester, a caproic acid vinyl ester, an oleyl acetate ester, and the like.

In the chemical liquid, the content of the ester compounds with respect to the chemical liquid is preferably 1.0 mass ppq to 1,000 mass ppt, more preferably 5.0 mass ppq to 500 mass ppt, even more preferably 10 mass ppq to 500 mass ppt, and particularly preferably 100 mass ppq to 100 mass ppt. The ester compounds are adsorbed onto metal atoms and aggregated. The aggregated ester compounds are adsorbed onto a substrate and remain as they are. In this way, the ester compounds cause defects. Accordingly, it is preferable that the content of the ester compounds with respect to the chemical liquid is within the above range.

<Other Impurities (Amine Compounds)>

In a case where the chemical liquid contains a nonionic surfactant, sometimes the chemical liquid contains amine compounds as impurities.

Examples of the amine compounds include monomethylamine, dimethylamine, trimethylamine, monoethylamine, diethylamine, triethylamine, and the like.

In the chemical liquid, the content of the amine compounds with respect to the total mass of the chemical liquid is preferably 1.0 mass ppq to 1,000 mass ppt, more preferably 5.0 mass ppq to 500 mass ppt, even more preferably 10 mass ppq to 500 mass ppt, and particularly preferably 100 mass ppq to 100 mass ppt. The amine compounds are adsorbed onto metal atoms and aggregated. The aggregated amine compounds are adsorbed onto a substrate and remain as they are. In this way, the amine compounds cause defects. Accordingly, it is preferable that the content of the amine compounds with respect to the chemical liquid is within the above range.

<Other Impurities (Chelate Complexes)>

In a case where the chemical liquid contains a chelating agent, sometimes the chemical liquid contains chelate complexes as impurities. The metal atoms of the specific metal ions and the like contained in the chemical liquid are bonded not with all of the chelating agents described above but with some of the chelating agents, and as a result, the chelate complexes are formed.

Examples of the chelate complexes include monocalcium ethylenediaminetetraacetate, copper (II) ethylenediaminetetraacetate, and the like.

In the chemical liquid, the content of the chelate complexes with respect to the total mass of the chemical liquid is preferably 1.0 mass ppq to 1,000 mass ppt, more preferably 5.0 mass ppq to 500 mass ppt, even more preferably 10 mass ppq to 500 mass ppt, and still more preferably 100 mass ppq to 100 mass ppt. The chelate complexes adhere to and accumulate on a wafer. In this way, the chelate complexes increase the load resulting from development or washing such as rinsing. Furthermore, the chelate complexes that cannot be removed by development or washing such as rinsing cause defects. Accordingly, it is preferable that the content rate of the chelate complexes with respect to the chemical liquid is within the above range.

EXAMPLES

Hereinafter, the present invention will be more specifically described based on examples. The materials, the amount and proportion of the materials used, the details of treatments, the procedure of treatments, and the like shown in the following examples can be appropriately modified as long as the gist of the present invention is maintained. Accordingly, the scope of the present invention is not limited to the following examples.

[Preparation of Container]

Container Manufacturing Example 1: Examples 3 to 9, 11, and 12 and Comparative Examples 1 and 2

As a substrate, a commercial canister made of polyethylene (manufactured by AICELLO CORPORATION, described as "Commercial PE canister" in Table 1) was prepared. It was confirmed that the canister made of polyethylene contained the specific metal. Then, the substrate was sequentially washed by the methods described in Table 1, thereby obtaining a container. The order of washing is as described in (1) to (11) in Table 1, and the whole washing treatment was performed in the environment of a class 100 clean room. The type of the washing solution used, the washing method, the temperature at the time of washing, and the washing time are described in Table 1. In Comparative Example 1, the commercial canister made of polyethylene was used without being washed.

In Table 1, the washing with ultrapure water in (1) of Example 2 is described as "room temperature, 5 minutes, flowing water", which means that the washing temperature is "room temperature", the washing time is "5 minutes", and the washing method is "flowing water". The washing with ultrapure water in (1) of Example 4 is described as "ultrasound, 90° C./1 h", which means that the washing method is "ultrasound", the washing temperature is "90° C.", and the washing time is "1 h (that is, 1 hour)". In (1) of Comparative Example 2, washing was performed using, instead of ultrapure water, tap water filtered through a simple filter having a pore size of 1 μm.

Regarding the washing with an acid in (2), for example, "hydrochloric acid (1 N, 40° C./1 h)" is described for Example 4, which means that the substrate was washed with 1 N hydrochloric acid under the conditions of 40° C. and 1 hour. "Hydrochloric acid (1 N, 80° C./12 h), this treatment was performed 3 cycles" descried for Example 12 means that washing of the substrate with 1 N hydrochloric acid under the conditions of 60° C. for 12 hours was performed 3 cycles.

Regarding the washing with ultrapure water in (3), for example, "ultrasound, 90° C./1 h" is described for Example 4, which means that an ultrasound treatment was performed for "1 h" at a washing temperature of "90° C.".

Regarding the washing with an acid in (4), for example, "dilute hydrofluoric acid (0.8% by mass, 40° C./1 h" is described for Example 4, which means that an ultrasound treatment was performed for "1 h" at a washing temperature of "40° C." by using 0.8% by mass dilute hydrofluoric acid.

Regarding the washing with a base in (6), for example, "ammonium sulfate (1.0% by mass, 60° C./1 h)" is described for Example 4, which means that a 1.0% by mass aqueous ammonium sulfate solution was used, the washing temperature was "60° C.", and the washing time was "1 h".

Regarding the washing with a mixture in (8), for example, "mixture B: aqueous containing TMAH (0.5%)/EDTA (0.3%)/ethylenediamine (0.1%)/diethylenetriamine (0.1%)/ethylene glycol monobutyl ether (10%) (ultrasound, 120° C./1 h)" is descried for Example 5, which means that the mixture B was used, the washing temperature was "120° C.", and the washing time was "1 h".

Regarding the washing with an organic solvent in (10), "IPA (room temperature, 5 minutes, washing out)" means that isopropanol (IPA) was used, the washing temperature was "room temperature", the washing time was "5 minutes", and the washing method is "washing out". "IPA (ultrasound, 40° C./1 h)" in Example 11 means that an ultrasound treatment was performed for "1 hour" by using IPA at a washing temperature of "40° C.". Furthermore, "PGMEA/PGME/butyl acetate (ultrasound, 40° C./1 h)" in Example 12 means that an ultrasound treatment was performed for "1 hour" by using PGMEA (30%)/PGME (40%)/butyl acetate (30%) at a washing temperature of "40° C.".

"Ultrasound, heat (90° C./1 h)" described for the washing with ultrapure water in (11) means that a washing method was used in which an ultrasound treatment was performed for 1 hour in an ultrasound treatment tank heated to 90° C. In addition, "-" in the table means that the washing solution was not used. For Examples 1, 2, and 10, "RCA" and "RCB" in the table are read by being replaced with RCAs and RCBs respectively.

Container Manufacturing Example 2: Example 1

Polyethylene was adopted as a base material. By an injection blow molding method, a coating layer 1 formed of a composition 1 for forming a coating layer prepared according to the following procedure was disposed on a portion that will be a liquid contact portion in the base material, thereby obtaining a container. The thickness of the coating layer 1 was 250 μm.

In Table 1, (Coating layer 1/PE) described in the column of "Substrate" means that the container has the coating layer 1 on PE as a base material. The same is true for Example 2.

(Preparation of Composition 1 for Forming a Coating Layer)

First, HDPE was synthesized by the following method. First, by using a tubular polymerization device, a Ti/Mg-based catalyst, and triethyl aluminum as a co-catalyst, HDPE was synthesized in hexane in an environment with a temperature of 80° C. and a pressure of 260 MPa under a condition of a retention time of 2 hours.

Then, the synthesized HDPE was further dissolved in decahydronaphthalene at a temperature of 90° C., and then subjected to a separatory purification treatment using 0.1 N HCl at 90° C. Thereafter, HDPE was subjected to a separatory purification treatment using pure water and precipitated using high-purity cyclohexanone, thereby obtaining the composition 1 for forming a coating layer.

Container Manufacturing Example 3: Example 2

The container obtained by the same method as that in Example 1 was further washed under the conditions described in Table 1. The thickness of the coating layer 1 was 250 μm.

Container Manufacturing Example 4: Example 10

Polyethylene was adopted as a base material. On a portion that will be a liquid contact portion in the base material, a coating layer was prepared according to the following procedure.

In order for the liquid contact portion to be formed of a composition 2 for forming a coating layer to be obtained, a coating layer 2 formed of the composition 2 for forming a coating layer was disposed by an injection blow molding method, thereby obtaining a container. The container of the coating layer 2 was 250 μm.

(Coating layer 2/PE) described in the column of "Substrate" in Table 1 means that the container has the coating layer 2 on PE as a base material.

(Preparation of Composition 2 for Forming a Coating Layer)

First, HDPE was synthesized by the following method. First, by using a tubular polymerization device, a Ti/Mg-based catalyst, and triethyl aluminum as a co-catalyst, HDPE was synthesized in hexane in an environment with a temperature of 80° C. and a pressure of 260 MPa under a condition of a retention time of 2 hours.

Then, the synthesized HDPE was further dissolved in decahydronaphthalene at a temperature of 90° C., and then subjected to a separatory purification treatment using pure water at 90° C. Thereafter, HDPE was subjected to a separatory purification treatment using pure water, thereby obtaining the composition 2 for forming a coating layer.

[Preparation of Washing Solution]

The washing solutions used in each step were prepared by the following methods, and then all of the washing solutions were filtered using a filter (pore size: 20 nm, having undergone hydrophilization treatment, manufactured by Pall Corporation) having a filter medium made of Nylon.

(1) Ultrapure water: by using an ultrapure water generator (manufactured by Kurita Water Industries Ltd.), ultrapure water with a total atom content equal to or smaller than 100 mass ppt was obtained and used as a washing solution. This ultrapure water was also used for preparing the following washing solutions.

(2) Hydrochloric acid: by mixing an aqueous hydrogen chloride solution (TAMAPURE-AA-10 grade) manufactured by Tama Chemicals Co., Ltd. with the aforementioned pure water, 1 N hydrochloric acid was prepared.

(3) Dilute hydrofluoric acid: by mixing an aqueous hydrofluoric acid solution (TAMAPURE-AA-100 grade) manufactured by Tama Chemicals Co., Ltd. with the aforementioned pure water, a 0.8 wt % aqueous HF solution was prepared.

(4) Ammonium sulfate: by using sulfuric acid (TAMAPURE-AA-100 grade) and aqueous ammonia (TAMAPURE-AA-100 grade) manufactured by Tama Chemicals Co., Ltd. as well as the aforementioned pure water, a 1% aqueous ammonium sulfate solution was prepared.

(5) Isopropyl alcohol (IPA): IPA manufactured by FUJIFILM Ultra Pure Solutions, Inc. was used.

(6) Mixture A: by using the aqueous ammonia described in (4) and a 40% aqueous EDTA2 ammonium solution (manufactured by TOMIYAMA PURE CHEMICAL INDUSTRIES, LTD.), an aqueous solution containing 20% aqueous ammonia (5.0%)/EDTA (0.3%)/ethylenediamine (0.1%)/diethylenetriamine (0.1%)/ethylene glycol butyl ether (10%) was prepared. EDTA is an abbreviation for ethylenediamine tetraacetic acid. Furthermore, ethylene glycol butyl ether (manufactured by KH Neochem Co., Ltd., ethylenediamine (manufactured by Hayashi Pure Chemical Ind., Ltd.), and diethylenetriamine (manufactured by Hayashi Pure Chemical Ind., Ltd.) were used.

(7) Mixture B: by using TMAH described in (2) and a 40% aqueous EDTA2 ammonium solution (manufactured by TOMIYAMA PURE CHEMICAL INDUSTRIES, LTD.), an aqueous solution containing TMAH (0.5%)/EDTA (0.3%)/ethylenediamine (0.1%)/diethylenetriamine (0.1%)/ethylene glycol butyl ether (10%) was prepared. Furthermore, ethylene glycol butyl ether (manufactured by KH Neochem Co., Ltd., ethylenediamine (manufactured by Hayashi Pure Chemical Ind., Ltd.), and diethylenetriamine (manufactured by Hayashi Pure Chemical Ind., Ltd.) were used.

(13) Butyl acetate (50%)/PGMEA (50%): by using FN-DP001 manufactured by FUJIFILM Electronic Materials Taiwan Co., Ltd. as butyl acetate and PGMEA (manufactured by KH Neochem Co., Ltd.), a mixed solution of butyl acetate (50%)/PGMEA (50%) was prepared.

It has been confirmed that the content of metal ions contained in each of the washing solutions is equal to or smaller than 100 mass ppt, the content of organic impurities contained in each of the washing solutions is equal to or smaller than 100 mass ppm, and the number of objects to be counted having a size equal to or greater than 30 nm that is counted by a light scattering-type liquid-borne particle counter is equal to or smaller than 50 per 1 ml of each of the washing solutions.

Furthermore, in all of the washing solutions having been used for washing, the average of the content of the specific metal ions contained in the washing solutions was within a range of 0.01 mass ppt to 1.0 mass ppm in all the washing solutions, and the content of the organic impurities contained in the washing solutions was within a range of 1.0 mass ppt to 500 mass ppm.

[Preparation of Chemical Liquid]

Chemical liquids used for evaluation were prepared by the following method. Then, all of the chemical liquids were filtered using a filter (pore size 20 nm, having undergone a hydrophilization treatment, manufactured by Pall Corporation) having a filter medium made of Nylon.

(8) TMAH developer: by using TMAH (manufactured by Tama Chemicals Co., Ltd.) and ultrapure water, a 2.38% by mass aqueous solution was prepared. (TMAH is an abbreviation for tetramethylammonium hydroxide). The solution was thoroughly stirred. After it was confirmed that the solution was dissolved, the solution was filtered (used filter: filter manufactured by Entegris, Inc having a filter medium made of ultra-high-molecular-weight polyethylene), pore size: 20 nm), thereby obtaining a chemical liquid.

(9) Resist Used for Evaluation: Positive Resist Composition

As a positive resist composition, the resist composition described in Example 1 in JP2010-256842A was prepared. That is, the following resin A, an acid generator, a basic compound, a surfactant, a hydrophobic resin, and a solvent were mixed together, stirred for 12 hours, and filtered through a 3 nm UPE filter (manufactured by Entegris, Inc, a capsule filter, UPE is an abbreviation for ultra-high-molecular-weight polyethylene).

Resin A: (87.01 parts by mass)

Polymer having compositional ratio of 40/10/50, Mw of 8,200, and dispersity of 1.53

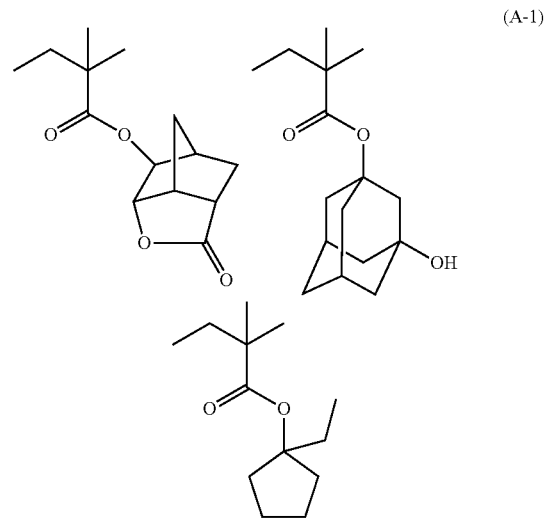

(A-1)

Acid generator: (10.9 parts by mass) (b36)

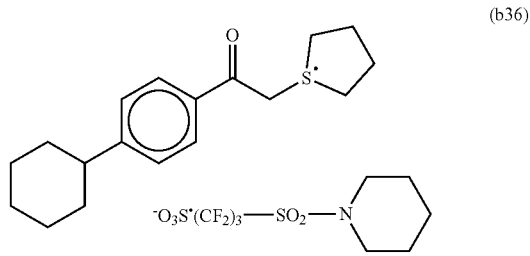

(b36)

Basic compound: (0.71 parts by mass) (N-1) 2,6-diisopropylaniline

Surfactant: (0.50 parts by mass) PF6320

Hydrophobic resin: (0.879 parts by mass)

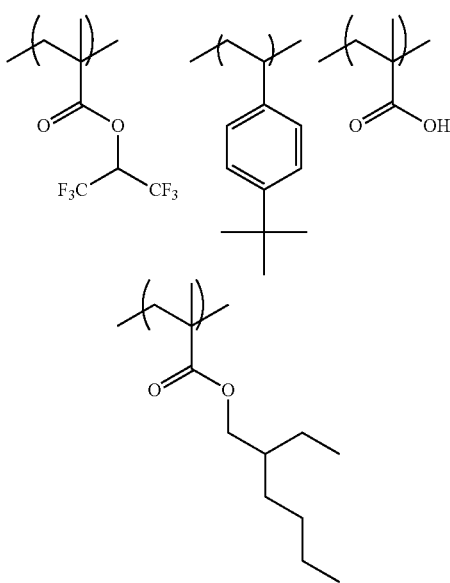

Hydrophobic resin:compositional ratio=40/56/2/2 (from left)

Solvents: propylene glycol monomethyl ether acetate (1,540 parts by mass) and propylene glycol monomethyl ether (360 parts by mass)

(10) Ultra-high-purity hydrofluoric acid: BHL manufactured by Stella Chemifa Corporation. was used.

(11) Clean 100: post-CMP cleaner (manufactured by Wako Pure Chemical Industries, Ltd.)

(12) CMP slurry: CMP-slurry was prepared using PGMEA (manufactured by KH Neochem Co., Ltd.) instead of methanol in the CMP slurry described in "8071+150 ppm methanol" in Table 2 in paragraph "0058" in JP2009-510224A.

[Measurement Method 1]

In this paragraph, "in a liquid" means "in a washing solution" and "in a chemical liquid".

In the present specification, the content of metal ions in a liquid was evaluated using ICP-MS (manufactured by Agilent Technologies, Inc.).

In the present example, the number of objects to be counted having a size equal to or greater than 30 nm in a liquid was counted using KS-19X (manufactured by RION Co., Ltd.).

In the present example, the content of organic impurities in a liquid was measured by directly injecting a liquid as a measurement target into a GC/MS (gas chromatography mass spectrometer). Among the detected components, components having a molecular weight equal to or smaller than 500 were measured to determine the content, and the content was adopted as the content of organic impurities.

[Measurement Method 2]

In the present example, containers were measured by the following method.

(Preparation of Sample)

From the containers prepared by the method described in Table 1 and the containers of comparative examples, a portion of the liquid contact portion (inner wall) was cut out, thereby obtaining a plurality of slices. From the slices, a sample for surface region evaluation and a sample for internal region evaluation were prepared by the following method.

Sample for Surface Region Evaluation

The slice of the liquid contact portion of the container was obliquely cut from the surface of the liquid contact portion along the thickness direction. At this time, the cross section (cut surface) obtained by cutting was caused to slant such that a cutting length with respect to a region ranging to 1 µm from the surface of the liquid contact portion in the thickness direction became 5 mm.

Within the obtained cut surface, a region having a cutting length of 50 µm that corresponded to the surface region 10 nm below the surface of the liquid contact portion in the thickness direction was adopted as a sample for surface region evaluation. In a case where the cut surface is observed from above, "cutting length" mentioned herein means a distance from a start point of cutting of the cut surface in the cutting direction.

Sample for Internal Region Evaluation

The slice of the liquid contact portion of the container was obliquely cut from the surface of the liquid contact portion along the thickness direction. At this time, the cross section (cut surface) obtained by cutting was caused to slant such that a cutting length with respect to a region ranging to 50 µm from the surface of the liquid contact portion in the thickness direction became 10 mm.

Within the obtained cut surface, a region having a cutting length of 4 mm that corresponded to the internal region 30 to 50 µm below the surface of the liquid contact portion in the thickness direction was adopted as a sample for internal region evaluation.

(Measurement of Peak Intensity Derived from Each of Metal Components)

The cut surface of the sample for surface region evaluation prepared as above was adopted as observation surface, and a peak intensity of secondary ions derived from each of the metal components was measured at 20 spots along the cutting direction at equal intervals. In addition, the position of each of the measurement spots in the width direction of the cut surface was converted into a position to which each of the measurement spots corresponds in the thickness direction of the coating layer (or the container). In this way, it was confirmed that the measurement results are data reflecting the content of the specific metal in the desired surface region.

Thereafter, the peak intensity of secondary ions derived from each of the metal components at 20 measurement spots was divided by the intensity of all the ions detected at each of the measurement spots so as to obtain a relative peak intensity of secondary ions derived from each of the metal components. The average of the relative peak intensity was calculated for each of the metal components at each of the measurement spots. The obtained average for each of the metal components was adopted as a relative peak intensity of secondary ions derived from each of the metal components in the surface region. For the uppermost surface, the average of peak intensity measured at 5 uncut sites was adopted as a measured peak intensity of the uppermost surface.

Subsequently, the cut surface of the sample for internal region evaluation was adopted as an observation surface, and a peak intensity of secondary ions derived from each of the metal components was measured at 20 spots along the cutting direction at equal intervals. Then, according to the same measurement and calculation procedure as that adopted for the surface region, the average of the relative peak intensity of secondary ions derived from each of the metal components in the internal region was calculated.

For measuring the aforementioned peak intensity, a time-of-flight secondary ion mass spectrometer (TOF-SIMS V manufactured by ION-TOF GmbH) was used.
(Measurement of Peak Derived from Polyolefin)

The cut surface of the sample for surface region evaluation prepared as above was adopted as an observation surface. Furthermore, by the same method as that used for measuring the relative peak intensity of secondary ions derived from the metal components, the intensity of a fragment of each component represented by $C_nH_{2n}^-$ (n=2 to 20) in each measurement site was measured, the intensity was divided by the intensity of all the ions detected, and the resulting quotients were added together. Subsequently, the measurement results from the measurement spots were averaged, thereby obtaining a relative peak intensity of secondary ions derived from a polyolefin in the internal region.

In addition, by the same method as that described above, a relative peak intensity of secondary ions derived from a polyolefin in the internal region was obtained.
(Calculation of RCA)

The ratio of the relative peak intensity of secondary ions derived from each of the metal components to the relative peak intensity of secondary ions derived from a polyolefin calculated as above was determined.

The ratio was calculated for each of the surface region and the internal region and named CA1 (corresponding to the surface region, data for each of the metal components) and CA2 (corresponding to the internal region, data for each of the metal components).

Thereafter, RCA=CA1/CA2 was calculated. The value of RCA (or RCAs) was calculated for each of metal components consisting of Ti, Mg, Al, Cr, Hf, Zr, Fe, Sn, Ni, and Mo, and the arithmetic mean of the values of RCA of the metal components was adopted as a value of RCA of the sample. The results are shown in Table 1.
(Calculation of RCB)

The intensity ratio of the peak intensity of fragment ions represented by $C_nH_{2n}$— to the peak intensity of secondary ions derived from a polyolefin detected at each of the measurement spots, the intensity ratio of the peak intensity of secondary ions derived from $C_pH_{2p}COO$— to the peak intensity of secondary ions derived from a polyolefin detected at each of the measurement spots, and the intensity ratio of the peak intensity of secondary ions represented by $C_qH_{2q}PO_2$— the peak intensity of secondary ions derived from a polyolefin detected at each of the measurement spots were calculated respectively. The peak intensity corresponds to the relative intensity of each of the components. For each of the measurement spots, the average of the intensity ratio was calculated for each component, and the obtained average for each component was further averaged. The finally obtained average intensity ratio corresponds to CB1 for the surface region and to CB2 for the internal region. Based on CB1 and CB2, a value of RCB (RCB=CB1/CB2) was calculated. The results are shown in Table 1.

n represents an integer of 12 to 20, p represents an integer of 8 to 24, and q represents an integer of 8 to 24.
[Measurement Method 3]

An elution test was performed as below. Pure water (100 ml) was stored in each of the containers of examples and comparative examples (the pure water took up 50% of the volume of each of the containers). The pure water was kept as it was for 1 day at 40° C. Then, the pure water was collected, and the content of metal components (described as "Metal" in the table) contained in the pure water was measured using ICP-MS, and TOC was measured using total carbon concentration meter (TOC-Vw manufactured by Shimadzu Corporation).
[Evaluation]
[Temporal Performance Stability of TMAH Developer]

The 2.38% by mass TMAH developer prepared in (8) described above was stored in each of the containers described in Table 1, thereby obtaining chemical liquid storage bodies. Each of the chemical liquid storage bodies was stored for 1 month at 45° C. After the storage, the developer was taken out of each of the chemical liquid storage bodies, and the lithography performance thereof was evaluated. The lithography performance was evaluated by the following method.

A silicon wafer was coated with ARC29A (manufactured by NISSAN CHEMICAL INDUSTRIES, LTD.) as a composition for forming an organic antireflection film, and the composition was baked for 60 seconds at 205° C., thereby forming an antireflection film having a film thickness of 86 nm. Then, the antireflection film was coated with the aforementioned positive resist composition, and the resist composition was baked for 60 seconds at 100° C. so as to form a resist film having a film thickness of 100 nm, thereby obtaining a wafer with a resist film. Subsequently, By using an ArF excimer laser immersion scanner (XT1700i manufactured by ASML, NA1.20, C-Quad, outer a: 0.981, inner a: 0.895, XY-polarized), the obtained wafer with a resist film was exposed through a 6% halftone mask capable of forming 1:1 line and space patterns with a half pitch of 40 nm. As an immersion liquid, ultrapure water was used. Thereafter, the exposed resist film was heated for 60 seconds at 100° C., then developed for 30 seconds by using the aforementioned developer, rinsed pure water, and then spin-dried, thereby obtaining a resist pattern.

By using a critical dimension SEM (CG4500 (manufactured by Hitachi High-Technologies Corporation), the line edge roughness (LWR) was measured at 100 positions within the prepared resist pattern, and a difference (variation) between maximum LWR and minimum LWR in the obtained data was calculated and adopted as an indicator of pattern quality.

The results were evaluated based on the following standards and described in Table 1 (described in the column of "Lithography performance").

A: The variation in LWR was equal to or smaller than 0.3 nm.
B: The variation in LWR was greater than 0.3 nm and equal to or smaller than 0.5 nm.
C: The variation in LWR was greater than 0.5 nm and equal to or smaller than 0.8 nm.
D: The variation in LWR was greater than 0.8 nm and equal to or smaller than 1.2 nm.
E: The variation in LWR was greater than 1.2 nm.

<Number of Objects to be Counted in Liquid>

After the storage, the developer was taken out of the chemical liquid storage body, and the number of objects to be counted having a size equal to or greater than 30 nm was counted using a light scattering-type liquid-borne particle counter: KS-19X manufactured by RION Co., Ltd. The results are evaluated based on the following standards and described in Table 1 (shown in the column of "Number of objects to be counted in liquid"). In the present example, for measuring the objects to be counted in a liquid, the same method as that described above was used.

A: The number of objects to be counted was equal to or smaller than 30/ml.

B: The number of objects to be counted was greater than 30/ml and equal to or smaller than 70/ml.

C: The number of objects to be counted was greater than 70/ml and equal to or smaller than 100/ml.

D: The number of objects to be counted was greater than 100/ml and equal to or smaller than 200/ml.

E: The number of objects to be counted was greater than 200/ml.

<Change in Density of Particles on Substrate>

By using a coater Lithius-PRO, a silicon wafer was coated with the developer taken out of the chemical liquid storage body after storage. At this time, a change in density of particles on the silicon wafer before and after coating was measured using SP5 (manufactured by KLA-Tencor Corporation). What was counted was the number of particles having a particle diameter equal to or greater than 19 nm. The results were evaluated based on the following standards and shown in Table 1 (column of "coating particles"). In the present example, for measuring the density of particles on a substrate, the same method as that described above was used.

A: The change in density of particles was equal to or smaller than 0.06 particles/cm$^2$.

B: The change in density of particles was greater than 0.06 particles/cm$^2$ and equal to or smaller than 0.1 particles/cm$^2$.

C: The change in density of particles was greater than 0.1 particles/cm$^2$ and equal to or smaller than 0.2 particles/cm$^2$.

D: The change in density of particles was greater than 0.2 particles/cm$^2$ and equal to or smaller than 0.3 particles/cm$^2$.

E: The change in density of particles was greater than 0.3 particles/cm$^2$.

<Evaluation of Particle-Like Substances in Liquid>

Evaluation Device: Agilent 8900

By using SP-ICP-MS described above, the content of particle-like substances in the chemical liquid taken out of the chemical liquid storage body after passage of time was evaluated. The results were evaluated based on the following standards and shown in the column of "Evaluation of particle-like substances" in Table 1.

A: The content of particle-like substances was equal to or smaller than 0.05 mass ppb.

B: The content of particle-like substances was greater than 0.05 mass ppb and equal to or smaller than 0.2 mass ppb.

C: The content of particle-like substances was greater than 0.2 mass ppb and equal to or smaller than 0.5 mass ppb.

D: The content of particle-like substances was greater than 0.5 mass ppb and equal to or smaller than 1.0 mass ppb.

E: The content of particle-like substances was greater than 1.0 mass ppb.

[Temporal Performance Stability of $H_2O_2$/Sulfuric Acid Stripping Solution]

A hydrogen peroxide (30% by mass) and aqueous sulfuric acid (98% by mass) were mixed together at a mixing ratio (mass ratio)=1/1 and stirred for 2 hours. After being stirred, the mixed solution was filtered using a 5 nm nylon filter, thereby preparing an aqueous hydrogen peroxide solution for evaluation. The aqueous hydrogen peroxide solution was stored in each of the containers, thereby obtaining chemical liquid storage bodies. Each of the chemical liquid storage bodies was stored for 2 weeks at 30° C. and 5° C.

From each of the chemical liquid storage bodies after storage, the aqueous hydrogen peroxide solution was taken out. The temporal performance stability was evaluated based on the resist stripping performance. The test method is as below.

In the present evaluation, aqueous sulfuric acid was heated to 60° C. in advance and then mixed with the aqueous hydrogen peroxide solution. In all of examples, the aqueous hydrogen peroxide solution and the aqueous sulfuric acid were mixed together, heated to "treatment temperature", and then used in a resist stripping test.

(Resist Stripping Test)

Test wafer: the surface of a silicon wafer was treated with hexamethyldisilazane (HMDS), a film having a thickness of 4 μm was then formed thereon by using OFPR800 (positive resist manufactured by TOKYO OHKA KOGYO CO., LTD.), and a stripping ability for the resist layer was evaluated under the following conditions.

Amount of chemical liquid: 600 ml

Wafer size: 12-inch Si wafer

Treatment method: single-type washing treatment device

Treatment condition: 120 rpm/1 min.+1,500 rpm/30 s

Flow rate: 10 ml./min./liquid temperature of 90° C.

For examining the resist stripping ability, by using VM-3110 (manufactured by Dainippon Screen Mfg. Co., Ltd.), film thickness distribution of the treated wafer was determined, the area containing wafer residues was evaluated based on the film thickness distribution, and a removal rate calculated based on the area was evaluated. For each of the container samples, temporal evaluation was performed at a frequency of n=20. The evaluation was performed based on the ratio of a standard deviation of a removal rate obtained in a case where a chemical liquid stored at 30° C. to a standard deviation of a removal rate obtained in a case where a chemical liquid stored at 5° C.

Ratio=standard deviation obtained in a case where chemical liquid stored at 30° C. is used/standard deviation obtained in a case where chemical liquid stored at 5° C. is used A: The ratio of the standard deviation was equal to or lower than 1.1.

B: The ratio of the standard deviation was higher than 1.1 and equal to or lower than 1.3.

C: The ratio of the standard deviation was higher than 1.3 and equal to or lower than 1.5.

D: The ratio of the standard deviation was higher than 1.5 and equal to or lower than 2.0.

E: The ratio of the standard deviation was higher than 2.0.

The number of objects to be counted in a liquid, the coating particles, and the particle-like substances were evaluated as described above.

[Temporal Stability of Buffered Hydrofluoric Acid Etching Solution]

First, an aqueous (20% by mass) containing a hydroxylamine compound was prepared. Then, 14.9 g of a 48% by mass aqueous potassium hydroxide (KOH) solution (containing KOH equivalent to 0.13 mol), 13.3 g of potassium carbonate ($K_2CO_3$) powder (equivalent to 0.096 mol $K_2CO_3$), 500.0 g of a 20% by weight aqueous hydroxylamine (HA) solution, and 471.8 g of water were mixed together, thereby preparing 1,000 g of an etching solution. In the etching solution, the calculated concentration of potassium ions was 0.32 mol/kg, the calculated concentration of carbonic acid ions was 0.096 mol/kg, and a molar ratio of the concentration of carbonic acid ions to the concentration of potassium ions was 0.30. A HA concentration in the etching solution was 10% by mass, and pH of the etching solution was equal to or higher than 13.

<Temporal Storage Test>

The etching solution was stored in the container described above, thereby preparing a chemical liquid storage body. The prepared chemical liquid storage body was stored for 1 month in an environment at 4° C. and 40° C. For the chemical liquid taken out of the chemical liquid storage body after storage, the number of objects to be counted in the liquid, the change in density of particles on the substrate, and the particle-like substances in the liquid were measured by the same method as that described above. The results are shown in Table 1.

<Evaluation of Etching Speed>

A wafer with an oxide film having a diameter of 300 nm was prepared which was constituted with a wafer and a 200 nm oxide film laminated thereon. Then, by using the chemical liquid (etching solution) taken out of the chemical liquid storage body after storage, the wafer with an oxide film was treated for 30 seconds at 60° C. by an immersion method. Thereafter, the wafer having undergone immersion was rinsed with pure water plural times and then spin-dried, thereby preparing a treated wafer. The thickness of the oxide film on the wafer before and after treatment was evaluated, and from the difference in the thickness between the oxide film before treatment and the oxide film after treatment, an etching speed was determined.

Specifically, an average 1 of an etching speed of the etching solution taken out of the chemical liquid storage body stored for 1 month in an environment of 4° C. and an average 2 of an etching speed of the etching solution taken out of the chemical liquid storage body stored for 1 month in an environment of 45° C. were calculated. Furthermore, a reduction rate expressed by the following equation was calculated and evaluated based on the following standards. The results are shown in Table 1.

The average 1 of an etching speed is a value obtained by preparing 50 samples of the chemical liquid storage body stored for 1 month in an environment of 4° C., calculating the etching speed of the etching solution in each of the samples, and calculating the arithmetic mean thereof. Furthermore, the average 2 of an etching speed is a value obtained by preparing 50 samples of the chemical liquid storage body stored for 1 month in an environment of 40° C., calculating the etching speed of the etching solution in each of the samples, and calculating the arithmetic mean thereof.

reduction rate (%)={(average 1 of etching speed−average 2 of etching speed)/average 1 of etching speed}×100    Equation:

A: The reduction rat was equal to or lower than 0.5%.
B: The reduction rate was higher than 0.5% and equal to or lower than 1.0%.
C: The reduction rate was higher than 1.0% and equal to or lower than 3.0%.
D: The reduction rate was higher than 3.0% and equal to or lower than 5.0%.
E: The reduction rate was higher than 5.0%.

[Temporal Stability of Chemical Mechanical Polishing (CMP) Slurry]

CSL9044C (manufactured by FUJIFILM Ultra Pure Solutions, Inc. (FFPS)) was diluted 10×, thereby preparing a CMP slurry (chemical liquid). By storing the CMP slurry in the container described above, a chemical liquid storage body was prepared. Then, the chemical liquid storage body was stored for 1 month at 4° C. and 40° C. For the chemical liquid taken out of the chemical liquid storage body after storage, the number of objects to be counted in the liquid, the change in density of particles on the substrate, and the particle-like substances in the liquid were measured by the same method as that described above. The results are shown in Table 1.

<Evaluation of Polishing Speed>

A wafer with an oxide film having a diameter of 300 mm was prepared which was constituted with a wafer and a 200 nm oxide film laminated thereon. According to the following evaluation method, a wafer having undergone a polishing treatment was prepared, and the thickness of the oxide film of the wafer before and after the polishing treatment was evaluated. From the difference in the film thickness between the oxide film not yet being treated and the treated oxide film, a polishing speed was determined.

<Evaluation Method>

By using a device "LGP-612" manufactured by LAPMASTER WOLTERS as a polishing device, each of the following wafer films was polished under the following conditions in a state of supplying a slurry (polishing solution).

Table rotation speed: 90 rpm
Head rotation speed: 85 rpm
Polishing pressure: 13.79 kPa
Polishing pad: Polotexpad manufactured by RODEL NITTA COMPANY
Polishing solution supply speed: 200 ml/min For the evaluation, an average 1 of a polishing speed of the CMP slurry out of the chemical liquid storage body stored for 1 month in an environment of 4° C. and an average 2 of a polishing speed of the CMP slurry taken out of the chemical liquid storage body stored for 1 month in an environment of 40° C. were calculated. Furthermore, a reduction rate (%) expressed by the following equation was calculated and evaluated based on the following standards.

The average 1 of a polishing speed is a value obtained by preparing 50 samples of the chemical liquid storage body stored for 1 month in an environment of 4° C., calculating the polishing speed of the CMP slurry in each of the samples, and calculating the arithmetic mean thereof. Furthermore, the average 2 of a polishing speed is a value obtained by preparing 50 samples of the chemical liquid storage body stored for 1 month in an environment of 40° C., calculating the polishing speed of the CMP slurry in each of the samples, and calculating the arithmetic mean thereof.

reduction rate (%)={(average 1 of polishing speed−average 2 of polishing speed)/average 1 of polishing speed}×100    Equation:

A: The reduction rate (%) was equal to or lower than 1.0%.
B: The reduction rate (%) was higher than 1.0% and equal to or lower than 1.5%.
C: The reduction rate (%) was higher than 1.5% and equal to or lower than 2.0%.
D: The reduction rate (%) was higher than 2.0% and equal to or lower than 3.0%.
E: The reduction rate (%) was higher than 3.0%.

[Evaluation of Temporal Stability pCMP Cleaner]

As a post-CMP cleaner (described as "pCMP cleaner" in the table), Clean-100 (manufactured by Wako Pure Chemical Industries, Ltd.) was used. Clean-100 was stored in the container described above, thereby preparing a chemical liquid storage body. Then, the chemical liquid storage body was stored for 1 month in an environment of 4° C. and 40° C. For the chemical liquid (pCMP cleaner) taken out of the chemical liquid storage body after storage, the number of objects to be counted in the liquid, the change in density of particles on the substrate, and the particle-like substances in the liquid were measured by the same method as that described above. The results are described in Table 1.

<Evaluation of Defect Inhibition Performance>

An oxide film having a thickness of 100 nm was formed on a silicon wafer, thereby obtaining a silicon wafer with an oxide film. Then, a film was formed on the oxide film by using a composition for forming a resist film, and subjected to pattern exposure by using an LS pattern having a line width of 40 nm and to a development treatment, thereby forming a pattern-like resist film.

By using the obtained pattern-like resist film as a mask, the insulting film (oxide film) was etched, thereby forming opening portions on the insulating film. The etching was performed by a plasma etching method by using an etching gas containing nitrogen gas and halogen gas.

Then, by using a resist stripping solution (MS6800 manufactured by FUJIFILM Electronic Materials Co., Ltd. (FFEM)) for oxygen ashing or general purposes, the pattern-like resist film was removed. Furthermore, the wafer was washed with a treatment solution containing a hydroxylamine compound, and unnecessary residues were removed by an etching treatment.

Subsequently, on the insulating film with opening portions formed thereon, metal films including a film formed of Ti (corresponding to a barrier film) and a film formed of Co were sequentially formed by a chemical vapor deposition method, thereby filling the opening portions. For the obtained base material having the metal films, chemical mechanical polishing was performed so as to remove unnecessary portions from the metal films and to smoothen the base material, thereby forming an insulating film in which metal wiring was embedded. At this time, the chemical mechanical polishing was performed in stages by using two kinds of polishing solutions. Specifically, the base material was polished using a solution, which was obtained by 10× diluting CSL9044C (manufactured by FFPS), as a polishing solution until the film formed of Ti was exposed, and then polished using a solution, which was obtained by 2× diluting BSL8178C (manufactured by FFPS), as a polishing solution until smoothing finished.

After polishing, the obtained insulating film in which metal wiring was embedded was washed with the chemical liquid taken out of the chemical liquid storage body after storage, and then further washed using water and isopropanol in this order. For evaluating defect inhibition performance, the pattern having undergone washing was observed using UVsion 5, the number of defects was counted, and an increase in number of defects was determined by the following method.

Specifically, during the evaluation, an average 1 of number of defects occurring in a case where the insulating film was treated with the chemical liquid taken out of the chemical liquid storage body stored for 1 month in an environment of 4° C. and an average 2 of the number of defects occurring in a case where the insulating film was treated with the chemical liquid taken out of the chemical liquid storage body stored for 1 month in an environment of 40° C. were calculated. Furthermore, an increasing rate (%) of number of defects was calculated according to the following equation, and evaluated according to the following standards.

The average 1 of number of defects is a value obtained by preparing 50 samples of the chemical liquid storage body stored for 1 month in an environment of 4° C., calculating the number of defects occurring in a case where the chemical liquid in each of the samples was used, and calculating the arithmetic mean thereof. Furthermore, the average 2 of number of defects is a value obtained by preparing 50 samples of the chemical liquid storage body stored for 1 month in an environment of 40° C., calculating the number of defects occurring in a case where the chemical liquid in each of the samples was used, and calculating the arithmetic mean thereof.

Increasing rate (%)={(average 2 of number of defects−average 1 of number of defects)/average 1 of number of defects}×100    Equation:

A: The increasing rate was equal to or lower than 1.0%.
B: The increasing rate was higher than 1.0% and equal to or lower than 2.0%.
C: The increasing rate was higher than 2.0% and equal to or lower than 3.0%.
D: The increasing rate was higher than 3.0% and equal to or lower than 5.0%.
E: The increasing rate was higher than 5.0%.

[Evaluation of Temporal Stability of Prewet Solution]

Cyclohexanone, propylene glycol 1-monomethyl ether 2-acetate (PGMEA), ethyl lactate (EL), and PGMEA/PC (propylene carbonate) were stored in the container described above, thereby preparing a chemical liquid storage body.

The chemical liquid storage body prepared as above was stored for 1 month in an environment of 4° C. and 40° C. For the chemical liquid (prewet solution) taken out of the chemical liquid storage body after storage, the number of objects to be counted in the liquid, the change in density of particles on the substrate, and the particle-like substances in the liquid were measured by the same method as that described above. The results are shown in Table 1.

Furthermore, for the chemical liquid storage body containing PGMEA/PC, as a temporal test, a cycled temporal test, in which (1) storage for 2 days at −20° C. and (2) storage for 5 days at 60° C. are alternately performed as one cycle, was carried out 10 cycles in a state where the chemical liquid was stored in the container. After the cycled temporal test, the chemical liquid stored in the container was evaluated in the same manner as in <Change in density of particles on substrate> so as to evaluate the durability of the container. The evaluation results are described in Table 1 as <Cycle evaluation>.

<Evaluation of Lithography Performance>

The prewet solution (10 cm$^3$) was caused to wet and spread on a 300 mm b silicon wafer, on which an antireflection film as an underlayer was formed, for 5 seconds at 500 rpm, and then 1 cm$^3$ of the composition for forming a resist film was jetted to wet and spread on the wafer for 30 seconds at 1,500 rpm. Thereafter, the composition was dried for 60 seconds at 100° C., thereby forming a resist film. By the same method as that used for the TMAH developer, the lithography performance of the obtained resist film was evaluated.

[Temporal Performance Stability of Butyl Acetate Developer]

In a case where a butyl acetate developer was used instead of the TMAH developer used in [Temporal performance stability of TMAH developer] described above, the developer was evaluated in terms of various items according to the same procedure as that in [Temporal performance stability of TMAH developer].

Furthermore, <Cycle evaluation> described regarding [Evaluation of temporal stability of prewet solution] described above was performed.

As a resist composition, a resist composition for negative development was used, and the evaluation was performed by changing the condition such that a rinsing treatment was not carried out.

As the resist composition for negative development, a composition using a resin A2 (87.01 parts by mass) instead of the resin A in the positive resist composition was used.

Resin A2: polymer having compositional ratio of 30/10/60, Mw of 8,200, and a dispersity of 1.53

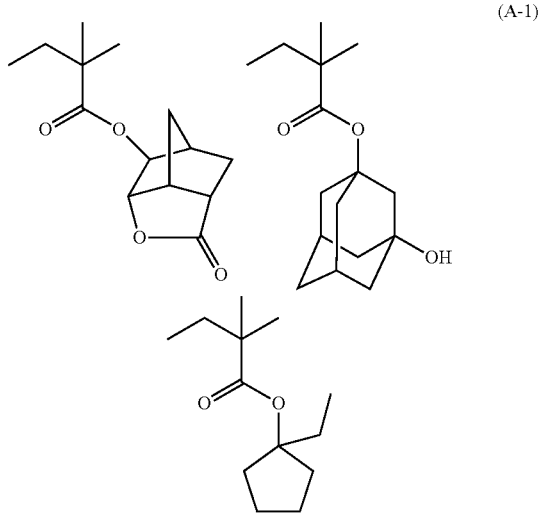

(A-1)

In Table 1, the method for manufacturing a container of each of examples and comparative examples, the physical properties of the container, and the performance of a chemical liquid stored in the container are described in the respective columns. For example, for the container of Example 1, the results are described in Table 1-1-1 and Table 1-2-1. That is, the container of Example 1 is a container having a coating layer on a base material, has been found to have a metal content of 0.9 mass ppb and TOC of 200 mass ppm as a result of the elution test, and has RCA of 0.92 and RCB of 0.94. Furthermore, the performance of each of the chemical liquids stored in the container is as below. Regarding the TMAH developer, the lithiography performance is graded D, the number of objects to be counted in the liquid is graded C, the coating particles are graded C, and the particle-like substances are graded C by the evaluation. Regarding the $H_2O_2$/sulfuric acid stripping solution, the stripping performance is graded D, the number of objects to be counted in the liquid is graded C, the coating particles are graded C, and the particle-like substances are graded C by the evaluation. Regarding the buffered etching solution, the etching speed is graded D, the number of objects to be counted in the liquid is graded C, the coating particles are graded C, and the particle-like substances are graded C by the evaluation. Regarding the CMP slurry, the polishing speed is graded D, the number of objects to be counted in the liquid is graded C, the coating particles are graded C, and the particle-like substances are graded C by the evaluation. Regarding the pCMP cleaner, the defect inhibition performance is graded D, the number of objects to be counted in the liquid is graded C, the coating particles are graded C, and the particle-like substances are graded C by the evaluation. Regarding the cyclohexanone prewet solution, the lithiography performance is graded D, the number of objects to be counted in the liquid is graded C, the coating particles are graded C, and the particle-like substances are graded C by the evaluation. Regarding the PGMEA prewet solution, the lithography performance is graded D, the number of objects to be counted in the liquid is graded C, the coating particles are graded C, and the particle-like substances are graded C by the evaluation. Regarding the EL prewet solution, the lithography performance is graded D, the number of objects to be counted in the liquid is graded C, the coating particles are graded C, and the particle-like substances are graded C by the evaluation.

Likewise, regarding other examples and comparative examples, the results of Example 2 are described in Table 1-1-2 and Table 1-2-2, the results of Example 4 are described in Table 1-1-3 and Table 1-2-3, the results of Example 6 are described in Table 1-1-4 and Table 2-4, the results of Example 8 are described in Table 1-1-5 and Table 2-2-5, the results of Example 10 are described in Table 1-1-6 and Table 1-2-6, and the results of Example 11 are described in Table 1-1-7 and Table 1-2-7.

In the tables, the columns of "Fe", "Ni", and "Cr" represent the content of an Fe element, the content of a Ni element, and the content of a Cr element (mass ppb) respectively.

The columns of "Oleic acid amide" and "Polyethylene" represent the content of oleic acid amide and the content of polyethylene (mass ppm) respectively. The polyethylene is polyethylene of a low degree of polymerization (polyethylene having 22 or less carbon atoms), which corresponds to an organic substance having a boiling point equal to or higher than 300° C.

TABLE 1

| Table 1-1-1 | | | Comparative Example 1 | Example 1 |
|---|---|---|---|---|
| Container | | Base material | Commercial PE canister | (Coating layer 1/PE) |
| | Washing | (1) Ultrapure water | — | — |
| | | (2) Acid | — | — |
| | | (3) Ultrapure water | — | — |
| | | (4) Acid | — | — |
| | | (5) Ultrapure water | — | — |
| | | (6) Base | — | — |
| | | (7) Ultrapure water | — | — |
| | | (8) Mixture | — | — |
| | | (9) Ultrapure water | — | — |
| | | (10) Organic solvent | — | — |
| | | (11) Ultrapure water | — | — |
| Physical properties of container | Elution test | Metal (mass ppb) | 1.2 | 0.9 |
| | | Fe | 0.41 | 0.05 |
| | | Ni | 0.15 | 0.03 |
| | | Cr | 0.32 | 0.02 |
| | | TOC (mass ppm) | 1500 | 200 |
| | | Oleic acid amide | 1065 | 135 |
| | | Polyethylene | 32 | 15 |
| | | RCA | 1.03 | 0.92 |
| | | RCB | 1.06 | 0.94 |

TABLE 2

| Table 1-1-2 | | | Example 2 | Example 3 |
|---|---|---|---|---|
| Container | | Base material | (Coating layer 1/PE) | Commercial PE canister |
| | Washing | (1) Ultrapure water | (1) (Room temperature, 5 minutes, flowing water) | (1) (Room temperature, 5 minutes, flowing water) |

TABLE 2-continued

| Table 1-1-2 | | | Example 2 | Example 3 |
|---|---|---|---|---|
| | (2) Acid | | — | — |
| | (3) Ultrapure water | | — | — |
| | (4) Acid | | — | — |
| | (5) Ultrapure water | | — | — |
| | (6) Base | | — | — |
| | (7) Ultrapure water | | — | — |
| | (8) Mixture | | — | — |
| | (9) Ultrapure water | | — | — |
| | (10) Organic solvent | | (10) IPA (Room temperature, 5 minutes, washing out) | (10) IPA (Room temperature, 5 minutes, washing out) |
| | (11) Ultrapure water | | (11) (Room temperature, 5 minutes, flowing water) | (11) (Room temperature, 5 minutes, flowing water) |
| Physical properties of container | Elution test | Metal (mass ppb) | 0.021 | 0.089 |
| | | Fe | 0.002 | 0.011 |
| | | Ni | — | 0.001 |
| | | Cr | — | 0.002 |
| | | TOC (mass ppm) | 3 | 40 |
| | | Oleic acid amide | 1.5 | 24 |
| | | Polyethylene | 0.2 | 0.9 |
| | | RCA | 0.85 | 0.98 |
| | | RCB | 0.91 | 0.92 |

TABLE 3

| Table 1-1-3 | | | Example 4 | Example 5 |
|---|---|---|---|---|
| Container | Base material | | Commercial PE canister | Commercial PE canister |
| | Washing | (1) Ultrapure water | (1) (Ultrasound, 90° C./1 h) | (1) (Ultrasound, 90° C./1 h) |
| | | (2) Acid | (2) Hydrochloric acid (1N, 40° C./1 h) | (2) Hydrochloric acid (1N, 40° C./1 h) |
| | | (3) Ultrapure water | (3) (Ultrasound, 90° C./1 h) | (3) (Ultrasound, 90° C./1 h) |
| | | (4) Acid | — | (4) Dilute hydrofluoric acid (0.8% by mass, 40° C./1 h) |
| | | (5) Ultrapure water | — | (5) (Ultrasound, 90° C./1 h) |
| | | (6) Base | (6) Ammonium sulfate (1.0% by mass, 60° C./1 h) | (6) Ammonium sulfate (1.0% by mass, 60° C./1 h) |
| | | (7) Ultrapure water | (7) (Ultrasound, 120° C./1 h) | (7) (Ultrasound, 120° C./1 h) |
| | | (8) Mixture | — | (8) Mixture B: water containing TMAH (0.5%)/EDTA (0.3%)/ethylenediamine (0.1%)/diethylenetriamine (0.1%)/ethylene glycol butyl ether (10%) (Ultrasound, 120° C./1 h) |
| | | (9) Ultrapure water | — | (9) (Ultrasound, 120° C./1 h) |
| | | (10) Organic solvent | (10) IPA (Ultrasound, 40° C./1 h) | (10) IPA (Ultrasound, 40° C./1 h) |
| | | (11) Ultrapure water | (11) (Ultrasound, heat (90° C./1 h)) | (11) (Ultrasound, heat (90° C./1 h)) |
| Physical properties of container | Elution test | Metal (mass ppb) | 0.0036 | 0.00079 |
| | | Fe | 0.001 | 0.001 |
| | | Ni | — | — |
| | | Cr | 0.001 | — |
| | | TOC (mass ppm) | 0.1 | 0.001 |
| | | Oleic acid amide | 0.03 | 0.0005 |
| | | Polyethylene | 0.01 | 0.0002 |
| | | RCA | 0.33 | 0.23 |
| | | RCB | 0.21 | 0.18 |

TABLE 4

| Table 1-1-4 | | | Example 6 | Example 7 |
|---|---|---|---|---|
| Container | Base material | | Commercial PE canister | Commercial PE canister |
| | Washing | (1) Ultrapure water | (1) (Ultrasound, 90° C./1 h) | (1) (Ultrasound, 90° C./1 h) |
| | | (2) Acid | (2) Hydrochloric acid (1N, 40° C./1 h) | — |

TABLE 4-continued

| Table 1-1-4 | | | Example 6 | Example 7 |
|---|---|---|---|---|
| | | (3) Ultrapure water | (3) (Ultrasound, 90° C./1 h) | — |
| | | (4) Acid | — | — |
| | | (5) Ultrapure water | — | — |
| | | (6) Base | (6) Ammonium sulfate (1.0% by mass, 60° C./1 h) | — |
| | | (7) Ultrapure water | (7) (Ultrasound, 120° C./1 h) | — |
| | | (8) Mixture | (8) Mixture A: water containing 20% aqueous ammonia (5.0%)/EDTA (0.3%)/ethylenediamine (0.1%)/diethylenetriamine (0.1%)/ethylene glycol butyl ether (10%) (Ultrasound, 120° C./1 h) | (8) Mixture B: water containing TMAH (0.5%)/EDTA (0.3%)/ethylenediamine (0.1%)/diethylenetriamine (0.1%)/ethylene glycol butyl ether (10%) (Ultrasound, 120° C./1 h) |
| | | (9) Ultrapure water | (9) (Ultrasound, 120° C./1 h) | (9) (Ultrasound, 120° C./1 h) |
| | | (10) Organic solvent | — | (10) IPA (Ultrasound, 40° C./1 h) |
| | | (11) Ultrapure water | (11) (Ultrasound, heat (90° C./1 h)) | (11) (Ultrasound, heat (90° C./1 h)) |
| Physical properties of container | Elution test | Metal (mass ppb) | 0.0022 | 0.0059 |
| | | Fe | 0.001 | 0.002 |
| | | Ni | — | — |
| | | Cr | — | 0.001 |
| | | TOC (mass ppm) | 0.02 | 0.08 |
| | | Oleic acid amide | 0.013 | 0.043 |
| | | Polyethylene | 0.004 | 0.005 |
| | | RCA | 0.29 | 0.58 |
| | | RCB | 0.48 | 0.32 |

TABLE 5

| Table 1-1-5 | | | Example 8 | Example 9 |
|---|---|---|---|---|
| Container | | Base material | Commercial PE canister | Commercial PE canister |
| | Washing | (1) Ultrapure water | (1) (Ultrasound, 90° C./1 h) | (1) (Ultrasound, 90° C./1 h) |
| | | (2) Acid | — | (2) Hydrochloric acid (0.01N, 30° C./1 h) |
| | | (3) Ultrapure water | — | (3) (Ultrasound, 90° C./1 h) |
| | | (4) Acid | — | — |
| | | (5) Ultrapure water | — | — |
| | | (6) Base | — | — |
| | | (7) Ultrapure water | — | — |
| | | (8) Mixture | — | — |
| | | (9) Ultrapure water | — | — |
| | | (10) Organic solvent | (10) IPA (Ultrasound, 40° C./1 h) | — |
| | | (11) Ultrapure water | (11) (Ultrasound, heat (90° C./1 h)) | (11) (Ultrasound, heat (90° C./1 h)) |
| Physical properties of container | Elution test | Metal (mass ppb) | 0.012 | 0.031 |
| | | Fe | 0.002 | 0.001 |
| | | Ni | — | — |
| | | Cr | — | — |
| | | TOC (mass ppm) | 0.9 | 800 |
| | | Oleic acid amide | 0.63 | 633 |
| | | Polyethylene | 0.03 | 42 |
| | | RCA | 0.65 | 0.61 |
| | | RCB | 0.51 | 1.01 |

TABLE 6

| Table 1-1-6 | | | Example 10 | Comparative Example 2 |
|---|---|---|---|---|
| Container | | Base material | (Coating layer 2/PE) | Commercial PE canister |
| | Washing | (1) Ultrapure water | (1) (Room temperature, 5 minutes, flowing water) | (1) (Ultrasound, 90° C./h), using tap water filtered through 1 μm simple filter |
| | | (2) Acid | — | (2) Hydrochloric acid (1N, 40° C./1 h), using special grade hydrochloric acid |
| | | (3) Ultrapure water | — | (3) (Ultrasound, 90° C./1 h) |
| | | (4) Acid | — | (4) Dilute hydrofluoric acid (0.8% by mass, 40° C./1 h) |

TABLE 6-continued

| Table 1-1-6 | | | Example 10 | Comparative Example 2 |
|---|---|---|---|---|
| | | (5) Ultrapure water | — | (5) (Ultrasound, 90° C./1 h), using tap water filtred through 1 μm simple filer |
| | | (6) Base | — | (6) Ammonium sulfate (1.0% by mass, 60° C./1 h), using special grade ammonium sulfate reagent and tap water filtered through 1 μm simple filter |
| | | (7) Ultrapure water | — | (7) (Ultrasound, 120° C./1 h) |
| | | (8) Mixture | — | (8) Using water containing 20% aqueous ammonia (5.0%)/EDTA (0.3%)/ethylene glycol butyl ether (10%) (Ultrasound, 120° C./1 h), and special grade EDTA |
| | | (9) Ultrapure water | — | (9) (Ultrasound, 120° C./1 h), using tap water filtred through 1 μm simple filer |
| | | (10) Organic solvent | (10) IPA (Room temperature, 5 minutes, washing out) | (10) IPA (Ultrasound, 40° C./1 h), using special grade IPA |
| | | (11) Ultrapure water | (11) (Room temperature, 5 minutes, flowing water) | (11) (Ultrasound, heat (90° C./1 h)), using tap water filtred through 1 μm simple filer |
| Physical properties of container | Elution test | Metal (mass ppb) | 0.31 | 1.5 |
| | | Fe | 0.002 | 0 12 |
| | | Ni | — | 0.02 |
| | | Cr | — | 0.04 |
| | | TOC (mass ppm) | 800 | 3100 |
| | | Oleic acid amide | 533 | 1430 |
| | | Polyethylene | 18 | 32 |
| | | RCA | 0.89 | 1.2 |
| | | RCB | 0.98 | 1.8 |

TABLE 7

| Table 1-1-7 | | | Example 11 | Example 12 |
|---|---|---|---|---|
| Container | Base material | | Commercial PE canister | Commercial PE canister |
| | Washing | (1) Ultrapure water | (1) (Ultrasound, 90° C./1 h) | (1) (Ultrasound, 90° C./1 h) |
| | | (2) Acid | (2) Hydrochloric acid (1N, 40° C./1 h) | (2) Hydrochloric acid (1N, 80° C./12 h), performed present treatment 3 cycles |
| | | (3) Ultrapure water | (3) (Ultrasound, 90° C./1 h) | (3) (Ultrasound, 90° C./1 h) |
| | | (4) Acid | — | (4) Dilute hydrofluoric acid (0.8% by mass, 60° C./1 h) |
| | | (5) Ultrapure water | — | (5) (Ultrasound, 90° C./1 h) |
| | | (6) Base | (6) Ammonium sulfate (1.0% by mass, 60° C./1 h) | (6) Ammonium sulfate (1.0% by mass, 60° C./1 h) |
| | | (7) Ultrapure water | (7) (Ultrasound, 120° C./1 h) | (7) (Ultrasound, 120° C./1 h) |
| | | (8) Mixture | (8) Butyl acetate (50%)/PGMEA (50%) Room temperature × immersion for 1 week | (8) Mixture B: water containing TMAH (0.5%)/EDTA (0.3%)/ethylenediamine (0.1%)/diethylenetriamine (0.1%)/ethylene glycol butyl ether (10%) (Ultrasound, 120° C./24 h), performed present treatment 3 cycles |
| | | (9) Ultrapure water | — | (9) (Ultrasound, 120° C./1 h) |
| | | (10) Organic solvent | (10) IPA (Ultrasound, 40° C./1 h) | (10) PGMEA/PGME/butyl acetate (Ultrasound, 60° C./12 h) |
| | | (11) Ultrapure water | (11) (Ultrasound, heat (90° C./1 h)) | (11) (Ultrasound, heat (90° C./1 h)) |
| Physical properties | Elution test | Metal (mass ppb) | 0.0036 | 0.000002 |

TABLE 7-continued

| Table 1-1-7 | | Example 11 | Example 12 |
|---|---|---|---|
| of container | Fe | 0.001 | 0.000005 |
| | Ni | — | — |
| | Cr | 0.001 | — |
| | TOC (mass ppm) | 0.1 | 0.0003 |
| | Oleic acid amide | 0.03 | 0.00008 |
| | Polyethylene | 0.01 | 0.00007 |
| | RCA | 0.33 | 0.05 |
| | RCB | 0.21 | 0.08 |

TABLE 8

| Table 1-2-1 | | Comparative Example 1 | Example 1 |
|---|---|---|---|
| TMAH developer | Lithography performance | E | D |
| | Number of objects to be counted in liquid | E | C |
| | Coating particles | E | C |
| | Evaluation of particle-like substances | E | C |
| H$_2$O$_2$/sulfuric acid stripping solution | Stripping performance | E | D |
| | Number of objects to be counted in liquid | E | C |
| | Coating particles | E | C |
| | Evaluation of particle-like substances | E | C |
| Buffered hydrofluoric acid etching solution | Etching speed | E | D |
| | Number of objects to be counted in liquid | E | C |
| | Coating particles | E | C |
| | Evaluation of particle-like substances | E | C |
| CMP slurry | Polishing speed | E | D |
| | Number of objects to be counted in liquid | E | C |
| | Coating particles | E | C |
| | Evaluation of particle-like substances | E | C |
| pCMP cleaner | Defect inhibition performance | E | D |
| | Number of objects to be counted in liquid | E | C |
| | Coating particles | E | C |
| | Evaluation of particle-like substances | E | C |
| Cyclohexanone prewet solution | Lithography performance | E | D |
| | Number of objects to be counted in liquid | E | C |
| | Coating particles | E | C |
| | Evaluation of particle-like substances | E | C |
| PGMEA prewet solution | Lithography performance | E | D |
| | Number of objects to be counted in liquid | E | C |
| | Coating particles | E | C |
| | Evaluation of particle-like substances | E | C |
| EL prewet solution | Lithography performance | E | D |
| | Number of objects to be counted in liquid | E | C |
| | Coating particles | E | C |
| | Evaluation of particle-like substances | E | C |
| PGMEA/PC prewet solution | Lithography performance | E | D |
| | Number of objects to be counted in liquid | E | C |
| | Coating particles | E | C |
| | Evaluation of particle-like substances | E | C |
| | Cycled temporal test | E | C |
| Butyl acetate developer | Lithography performance | E | D |
| | Number of objects to be counted in liquid | E | C |
| | Coating particles | E | C |
| | Evaluation of particle-like substances | E | C |
| | Cycled temporal test | E | C |

TABLE 9

| Table 1-2-2 | | Example 2 | Example 3 |
|---|---|---|---|
| TMAH developer | Lithography performance | D | D |
| | Number of objects to be counted in liquid | C | C |
| | Coating particles | C | C |
| | Evaluation of particle-like substances | C | C |
| H$_2$O$_2$/sulfuric acid stripping solution | Stripping performance | C | D |
| | Number of objects to be counted in liquid | C | C |
| | Coating particles | C | C |
| | Evaluation of particle-like substances | C | C |
| Buffered hydrofluoric | Etching speed | C | D |
| | Number of objects to be counted in liquid | C | C |

TABLE 9-continued

| Table 1-2-2 | | Example 2 | Example 3 |
|---|---|---|---|
| acid etching solution | Coating particles | C | C |
| | Evaluation of particle-like substances | C | C |
| CMP slurry | Polishing speed | D | D |
| | Number of objects to be counted in liquid | C | C |
| | Coating particles | C | C |
| | Evaluation of particle-like substances | C | C |
| pCMP cleaner | Defect inhibition performance | C | D |
| | Number of objects to be counted in liquid | C | C |
| | Coating particles | C | C |
| | Evaluation of particle-like substances | C | C |
| Cyclohexanone prewet solution | Lithography performance | C | D |
| | Number of objects to be counted in liquid | C | C |
| | Coating particles | C | C |
| | Evaluation of particle-like substances | C | C |
| PGMEA prewet solution | Lithography performance | C | D |
| | Number of objects to be counted in liquid | C | C |
| | Coating particles | C | C |
| | Evaluation of particle-like substances | C | C |
| EL prewet solution | Lithography performance | C | D |
| | Number of objects to be counted in liquid | C | C |
| | Coating particles | C | C |
| | Evaluation of particle-like substances | C | C |
| PGMEA/PC prewet solution | Lithography performance | C | D |
| | Number of objects to be counted in liquid | C | C |
| | Coating particles | C | C |
| | Evaluation of particle-like substances | C | C |
| | Cycled temporal test | C | C |
| Butyl acetate developer | Lithography performance | C | D |
| | Number of objects to be counted in liquid | C | C |
| | Coating particles | C | C |
| | Evaluation of particle-like substances | C | C |
| | Cycled temporal test | C | C |

TABLE 10

| Table 1-2-3 | | Example 4 | Example 5 |
|---|---|---|---|
| TMAH developer | Lithography performance | B | A |
| | Number of objects to be counted in liquid | A | A |
| | Coating particles | A | A |
| | Evaluation of particle-like substances | A | A |
| H$_2$O$_2$/sulfuric acid stripping solution | Stripping performance | B | A |
| | Number of objects to be counted in liquid | A | A |
| | Coating particles | A | A |
| | Evaluation of particle-like substances | A | A |
| Buffered hydrofluoric acid etching solution | Etching speed | B | A |
| | Number of objects to be counted in liquid | A | A |
| | Coating particles | A | A |
| | Evaluation of particle-like substances | A | A |
| CMP slurry | Polishing speed | B | A |
| | Number of objects to be counted in liquid | A | A |
| | Coating particles | A | A |
| | Evaluation of particle-like substances | A | A |
| pCMP cleaner | Defect inhibition performance | B | A |
| | Number of objects to be counted in liquid | A | A |
| | Coating particles | A | A |
| | Evaluation of particle-like substances | A | A |
| Cyclohexanone prewet solution | Lithography performance | B | B |
| | Number of objects to be counted in liquid | A | A |
| | Coating particles | C | B |
| | Evaluation of particle-like substances | A | A |
| PGMEA prewet solution | Lithography performance | B | B |
| | Number of objects to be counted in liquid | A | A |
| | Coating particles | C | B |
| | Evaluation of particle-like substances | A | A |
| EL prewet solution | Lithography performance | B | B |
| | Number of objects to be counted in liquid | A | A |
| | Coating particles | C | B |
| | Evaluation of particle-like substances | A | A |
| PGMEA/PC prewet solution | Lithography performance | B | B |
| | Number of objects to be counted in liquid | A | A |
| | Coating particles | C | B |
| | Evaluation of particle-like substances | A | A |
| | Cycled temporal test | A | A |

TABLE 10-continued

| Table 1-2-3 | | Example 4 | Example 5 |
|---|---|---|---|
| Butyl acetate developer | Lithography performance | B | B |
| | Number of objects to be counted in liquid | A | A |
| | Coating particles | C | B |
| | Evaluation of particle-like substances | A | A |
| | Cycled temporal test | A | A |

TABLE 11

| Table 1-2-4 | | Example 6 | Example 7 |
|---|---|---|---|
| TMAH developer | Lithography performance | B | C |
| | Number of objects to be counted in liquid | A | C |
| | Coating particles | A | C |
| | Evaluation of particle-like substances | A | C |
| $H_2O_2$/sulfuric acid stripping solution | Stripping performance | B | C |
| | Number of objects to be counted in liquid | A | C |
| | Coating particles | A | C |
| | Evaluation of particle-like substances | A | C |
| Buffered hydrofluoric acid etching solution | Etching speed | B | C |
| | Number of objects to be counted in liquid | A | C |
| | Coating particles | A | C |
| | Evaluation of particle-like substances | A | C |
| CMP slurry | Polishing speed | B | C |
| | Number of objects to be counted in liquid | A | C |
| | Coating particles | A | C |
| | Evaluation of particle-like substances | A | C |
| pCMP cleaner | Defect inhibition performance | B | C |
| | Number of objects to be counted in liquid | A | C |
| | Coating particles | A | C |
| | Evaluation of particle-like substances | A | C |
| Cyclohexanone prewet solution | Lithography performance | B | C |
| | Number of objects to be counted in liquid | A | C |
| | Coating particles | C | C |
| | Evaluation of particle-like substances | A | C |
| PGMEA prewet solution | Lithography performance | B | C |
| | Number of objects to be counted in liquid | A | C |
| | Coating particles | C | C |
| | Evaluation of particle-like substances | A | C |
| EL prewet solution | Lithography performance | B | C |
| | Number of objects to be counted in liquid | A | C |
| | Coating particles | C | C |
| | Evaluation of particle-like substances | A | C |
| PGMEA/PC prewet solution | Lithography performance | B | C |
| | Number of objects to be counted in liquid | A | C |
| | Coating particles | C | C |
| | Evaluation of particle-like substances | A | C |
| | Cycled temporal test | A | C |
| Butyl acetate developer | Lithography performance | B | C |
| | Number of objects to be counted in liquid | A | C |
| | Coating particles | C | C |
| | Evaluation of particle-like substances | A | C |
| | Cycled temporal test | A | C |

TABLE 12

| Table 1-2-5 | | Example 8 | Example 9 |
|---|---|---|---|
| TMAH developer | Lithography performance | C | D |
| | Number of objects to be counted in liquid | C | D |
| | Coating particles | C | D |
| | Evaluation of particle-like substances | C | D |
| $H_2O_2$/sulfuric acid stripping solution | Stripping performance | C | C |
| | Number of objects to be counted in liquid | C | D |
| | Coating particles | C | D |
| | Evaluation of particle-like substances | C | D |
| Buffered hydrofluoric acid etching solution | Etching speed | C | C |
| | Number of objects to be counted in liquid | C | D |
| | Coating particles | C | D |
| | Evaluation of particle-like substances | C | D |
| CMP slurry | Polishing speed | C | D |
| | Number of objects to be counted in liquid | C | D |
| | Coating particles | C | D |
| | Evaluation of particle-like substances | C | D |

TABLE 12-continued

|  | Table 1-2-5 | Example 8 | Example 9 |
|---|---|---|---|
| pCMP cleaner | Defect inhibition performance | C | D |
|  | Number of objects to be counted in liquid | C | D |
|  | Coating particles | C | D |
|  | Evaluation of particle-like substances | C | D |
| Cyclohexanone prewet solution | Lithography performance | C | D |
|  | Number of objects to be counted in liquid | C | D |
|  | Coating particles | C | D |
|  | Evaluation of particle-like substances | C | D |
| PGMEA prewet solution | Lithography performance | C | D |
|  | Number of objects to be counted in liquid | C | D |
|  | Coating particles | C | D |
|  | Evaluation of particle-like substances | C | D |
| EL prewet solution | Lithography performance | C | D |
|  | Number of objects to be counted in liquid | C | D |
|  | Coating particles | C | D |
|  | Evaluation of particle-like substances | C | D |
| PGMEA/PC prewet solution | Lithography performance | C | D |
|  | Number of objects to be counted in liquid | C | D |
|  | Coating particles | C | D |
|  | Evaluation of particle-like substances | C | D |
|  | Cycled temporal test | C | D |
| Butyl acetate developer | Lithography performance | C | D |
|  | Number of objects to be counted in liquid | C | D |
|  | Coating particles | C | D |
|  | Evaluation of particle-like substances | C | D |
|  | Cycled temporal test | C | D |

TABLE 13

|  | Table 1-2-6 | Example 10 | Comparative Example 2 |
|---|---|---|---|
| TMAH developer | Lithography performance | D | E |
|  | Number of objects to be counted in liquid | D | E |
|  | Coating particles | D | E |
|  | Evaluation of particle-like substances | D | E |
| H$_2$O$_2$/sulfuric acid stripping solution | Stripping performance | C | E |
|  | Number of objects to be counted in liquid | D | E |
|  | Coating particles | D | E |
|  | Evaluation of particle-like substances | D | E |
| Buffered hydrofluoric acid etching solution | Etching speed | C | E |
|  | Number of objects to be counted in liquid | D | E |
|  | Coating particles | D | E |
|  | Evaluation of particle-like substances | D | E |
| CMP slurry | Polishing speed | D | E |
|  | Number of objects to be counted in liquid | D | E |
|  | Coating particles | D | E |
|  | Evaluation of particle-like substances | D | E |
| pCMP cleaner | Defect inhibition performance | D | E |
|  | Number of objects to be counted in liquid | D | E |
|  | Coating particles | D | E |
|  | Evaluation of particle-like substances | D | E |
| Cyclohexanone prewet solution | Lithography performance | D | E |
|  | Number of objects to be counted in liquid | D | E |
|  | Coating particles | D | E |
|  | Evaluation of particle-like substances | D | E |
| PGMEA prewet solution | Lithography performance | D | E |
|  | Number of objects to be counted in liquid | D | E |
|  | Coating particles | D | E |
|  | Evaluation of particle-like substances | D | E |
| EL prewet solution | Lithography performance | D | E |
|  | Number of objects to be counted in liquid | D | E |
|  | Coating particles | D | E |
|  | Evaluation of particle-like substances | D | E |
| PGMEA/PC prewet solution | Lithography performance | D | E |
|  | Number of objects to be counted in liquid | D | E |
|  | Coating particles | D | E |
|  | Evaluation of particle-like substances | D | E |
|  | Cycled temporal test | D | E |
| Butyl acetate developer | Lithography performance | D | E |
|  | Number of objects to be counted in liquid | D | E |
|  | Coating particles | D | E |
|  | Evaluation of particle-like substances | D | E |
|  | Cycled temporal test | D | E |

TABLE 14

| Table 1-2-7 | | Example 11 | Example 12 |
|---|---|---|---|
| TMAH developer | Lithography performance | B | A |
| | Number of objects to be counted in liquid | A | A |
| | Coating particles | A | A |
| | Evaluation of particle-like substances | A | A |
| $H_2O_2$/sulfuric acid stripping solution | Stripping performance | B | A |
| | Number of objects to be counted in liquid | A | A |
| | Coating particles | A | A |
| | Evaluation of particle-like substances | A | A |
| Buffered hydrofluoric acid etching solution | Etching speed | B | A |
| | Number of objects to be counted in liquid | A | A |
| | Coating particles | A | A |
| | Evaluation of particle-like substances | A | A |
| CMP slurry | Polishing speed | B | A |
| | Number of objects to be counted in liquid | A | A |
| | Coating particles | A | A |
| | Evaluation of particle-like substances | A | A |
| pCMP cleaner | Defect inhibition performance | B | A |
| | Number of objects to be counted in liquid | A | A |
| | Coating particles | A | A |
| | Evaluation of particle-like substances | A | A |
| Cyclohexanone prewet solution | Lithography performance | B | B |
| | Number of objects to be counted in liquid | A | A |
| | Coating particles | C | B |
| | Evaluation of particle-like substances | A | A |
| PGMEA prewet solution | Lithography performance | B | B |
| | Number of objects to be counted in liquid | A | A |
| | Coating particles | C | B |
| | Evaluation of particle-like substances | A | A |
| EL prewet solution | Lithography performance | B | B |
| | Number of objects to be counted in liquid | A | A |
| | Coating particles | C | B |
| | Evaluation of particle-like substances | A | A |
| PGMEA/PC prewet solution | Lithography performance | B | B |
| | Number of objects to be counted in liquid | A | A |
| | Coating particles | C | B |
| | Evaluation of particle-like substances | A | A |
| | Cycled temporal test | A | C |
| Butyl acetate developer | Lithography performance | B | B |
| | Number of objects to be counted in liquid | A | A |
| | Coating particles | C | B |
| | Evaluation of particle-like substances | A | A |
| | Cycled temporal test | A | C |

The content of metals contained in each of the chemical liquids stored in each of the containers was measured. As a result, by ICP-MS (Agilent 8900), it has been confirmed that the content of all kinds of metals (Ti, Al, Zr, Hf, Fe, Ni, Sn, Zn, Cr, Mo, Fe, and Ni) is equal to or smaller than 10 mass ppt.

Furthermore, as a result of measuring the organic impurities in each of the chemical liquids, it has been confirmed that the content of the organic impurities containing oleic acid amide and an alkyl olefin of a low degree of polymerization (an alkyl olefin having 22 or less carbon atoms) is equal to or smaller than 1 mass ppm.

In a case where the content of contaminant components in the stored chemical liquid is further reduced as described above, the damage of the container resulting from impurities can be further suppressed, and particularly, the amount of impurities eluted over time in a low temperature/high temperature cycle can be further reduced.

As is evident from the results described in Table 1, the performance of the chemical liquid stored in the container of each of the examples hardly deteriorates. In contrast, the performance of the chemical liquid stored in the container of each of the comparative examples deteriorated.

Compared to the container of Example 3 formed of the specific composition, the container of Example 2 having the coating layer formed of the specific composition on the base material had a lower RCA(s). Consequently, the performance of the chemical liquid stored in the container of Example 2 hardly deteriorated.

Compared to the container of Example 1 not being subjected to the washing step, the container of Example 2, which had the coating layer formed of the specific composition on the base material and was manufactured by washing the coating layer by the method described in Table 1, had a lower RCAs and a lower RCB. Consequently, the performance of the chemical liquid stored in the container of Example 2 hardly deteriorated.

Compared to the container of Example 3, the container of Example 8, which was subjected to the washing step using a washing solution of a higher temperature and washed by a method of using ultrasound, had a lower RCA and a lower RCB. Consequently, the performance of the chemical liquid stored in the container of Example 8 hardly deteriorated over time.

Compared to the container of Example 9, the container of Example 7, which was subjected to the washing step using an acid and an organic solvent as washing solutions, had a lower RCB. Furthermore, in the elution test, the amount of TOC eluted from the container of Example 7 was small. Consequently, in the container of Example 7, the performance of the chemical liquid (other than the $H_2O_2$/sulfuric acid stripping solution and the buffered hydrofluoric acid etching solution) affected more by organic impurities hardly deteriorated over time.

In the container of Example 8, which was subjected to the washing step of washing the container with ultrapure water for 1 hour, the performance of the TMAH developer and the CMP slurry affected more by water-soluble impurities (salts and the like) hardly deteriorated over time, compared to the container of Example 2 which was washed for 5 minutes with ultrapure water.

In the container of Example 5, particularly, the chemical liquid based on an organic solvent contained fewer coating particles than in the containers of Example 4 and Example 6. The coating particles are evaluated based on rigorous standards, and exert an influence even though the amount thereof is extremely small. Particularly, the coating particles of a high evaluation rank result in a marked difference. In a case where the chemical liquid is based on an organic solvent, the coating particles are easily eluted, and hence the evaluation result worsens. However, the container of Example 5 had further improved effects of the present invention.

Before storing the chemical liquids, the containers of Examples 1 to 12 were washed with the chemical liquids to be stored, and then the chemical liquids were stored in the containers. In a case where the obtained chemical liquid storage bodies were used, the same results as described above were obtained.

Furthermore, before storing the chemical liquids, the containers of Examples 1 to 12 were immersed for 1 week in the chemical liquids to be stored, and then the chemical liquids were stored in the containers. In a case where the obtained chemical liquid storage bodies were used, the same results as described above were obtained.

For a process unit including piping connected to a 2 t tank for chemical liquid supply, which was connected to a solvent line of a coater/developer Lithius-ProZ for a lithography process, and a lithography device, the piping was washed with the prepared chemical liquid. As a chemical liquid line connected to the device, a tank/line made of SUS were used. The washing was performed under the conditions of filling the supply tank with the prepared chemical liquid and flushing the piping out with the chemical liquid caused to flow in an amount 10 times the total volume of the chemical liquid in the tank and the piping. After the flushing was further carried out 3 cycles, a chemical liquid for manufacturing was injected. After a chemical liquid was manufactured, the containers described in Examples 1 to 12 were filled with the chemical liquid.

For the chemical liquid in the prepared chemical liquid storage body, the lithography performance, the number of objects to be counted in the liquid, the coating particles, and the particle-like substances were evaluated as described above. As a result, the same results as those of the examples described above were obtained.

Before being loaded in the coater/developer, a POU filter was immersed for 1 week in advance in the chemical liquid to be used, and then used by being connected to the coater/developer before flushing.

Furthermore, as a manufacturing line, a semiconductor chemical liquid manufacturing line, which was constituted with a 2 t tank made of SUS having a polytetrafluoroethylene (PTFE) lining, piping made of SUS having a PTFE lining, and a filter unit made of SUS (a pressure-resistant container) having a PTFE lining connected to each other, was used. For the manufacturing line, the number of objects to be counted in the liquid, the coating particles, and the particle-like substances were evaluated as described above. As a result, the same results as those described above were obtained.

The same treatment as that in examples was performed on a container having the size of a 18 L canister, a container having the size of a 200 L drum, a container having the size of a 1 t Tote, and a container having the size of a 10 t container, thereby preparing containers. The prepared containers were evaluated in terms of various items according to the same procedure as that described above. As a result, the same results as described above were obtained.

Samples were prepared by the same method as that used in Examples 1 to 12, except that the chemical liquid was stored in each of the containers in a class 1000 clean room. The containers were evaluated in the same manner as in Examples 1 to 12. As a result, the same results as those in Examples 1 to 12 were obtained.

Furthermore, samples were prepared by the same method as that used in Examples 1 to 12, except that the chemical liquid was stored in each of the containers in a class 100 clean room. The containers were evaluated in the same manner as in Examples 1 to 12. As a result, the same results as those in Examples 1 to 12 were obtained.

In addition, samples were prepared by the same method as that used in Examples 1 to 12, except that the chemical liquid was stored in each of the containers in a class 10 clean room. The containers were evaluated in the same manner as in Examples 1 to 12. As a result, the same results as those in Examples 1 to 12 were obtained.

The aspect of Examples 4 and 5 corresponds to an aspect in which a filling rate represented by the following equation is 80% by volume.

Filling rate=(volume of chemical liquid in container/volume of container)   Equation (X):

For the aspect of Examples 4 and 5, the filling rate and the content of organic substances were adjusted as described in Table 2, and the containers were evaluated as described above. The results will be shown below. Example 4-1 corresponds to an aspect obtained by changing the filling rate and the content of organic substances in the aspect of Example 4. Example 5-1 corresponds to an aspect obtained by changing the filling rate and the content of organic substances in the aspect of Example 5.

Concentration of organic substances=(volume of organic substances in space not being filled with chemical liquid in container/volume of space not being filled with chemical liquid in container)×100   Equation (Y):

TABLE 15

| | Table 2 | Example 4-1 | Example 5-1 |
|---|---|---|---|
| PGMEA prewet solution | Filling rate | 90% by volume | 90% by volume |
| | Concentration of organic substances | 0.01 volume ppm | 0.01 volume ppm |
| | Lithography performance | B | B |
| | Number of objects to be counted in liquid | A | A |
| | Coating particles | C | A |
| | Evaluation of particle-like substances | A | A |

TABLE 15-continued

| Table 2 | | Example 4-1 | Example 5-1 |
|---|---|---|---|
| Cyclohexanone prewet solution | Filling rate | 90% by volume | 90% by volume |
| | Concentration of organic substances | 0.01 volume ppm | 0.01 volume ppm |
| | Lithography performance | B | B |
| | Number of objects to be counted in liquid | A | A |
| | Coating particles | C | A |
| | Evaluation of particle-like substances | A | A |
| PGMEA/PC prewet solution | Filling rate | 90% by volume | 90% by volume |
| | Concentration of organic substances | 0.01 volume ppm | 0.01 volume ppm |
| | Lithography performance | B | B |
| | Number of objects to be counted in liquid | A | A |
| | Coating particles | C | A |
| | Evaluation of particle-like substances | A | A |
| Butyl acetate developer | Filling rate | 90% by volume | 90% by volume |
| | Concentration of organic substances | 0.01 volume ppm | 0.01 volume ppm |
| | Lithography performance | B | B |
| | Number of objects to be counted in liquid | A | A |
| | Coating particles | C | A |
| | Evaluation of particle-like substances | A | A |
| PGMEA prewet solution | Filling rate | 70% by volume | 70% by volume |
| | Concentration of organic substances | 0.05 volume ppm | 0.05 volume ppm |
| | Lithography performance | B | B |
| | Number of objects to be counted in liquid | A | A |
| | Coating particles | C | B |
| | Evaluation of particle-like substances | A | A |
| Cyclohexanone prewet solution | Filling rate | 70% by volume | 70% by volume |
| | Concentration of organic substances | 0.05 volume ppm | 0.05 volume ppm |
| | Lithography performance | B | B |
| | Number of objects to be counted in liquid | A | A |
| | Coating particles | C | B |
| | Evaluation of particle-like substances | A | A |
| PGMEA/PC prewet solution | Filling rate | 70% by volume | 70% by volume |
| | Concentration of organic substances | 0.05 volume ppm | 0.05 volume ppm |
| | Lithography performance | B | B |
| | Number of objects to be counted in liquid | A | A |
| | Coating particles | C | B |
| | Evaluation of particle-like substances | A | A |
| Butyl acetate developer | Filling rate | 70% by volume | 70% by volume |
| | Concentration of organic substances | 0.05 volume ppm | 0.05 volume ppm |
| | Lithography performance | B | B |
| | Number of objects to be counted in liquid | A | A |
| | Coating particles | C | B |
| | Evaluation of particle-like substances | A | A |
| PGMEA prewet solution | Filling rate | 50% by volume | 50% by volume |
| | Concentration of organic substances | 1.2 volume ppm | 1.2 volume ppm |
| | Lithography performance | B | B |
| | Number of objects to be counted in liquid | A | A |
| | Coating particles | C | C |
| | Evaluation of particle-like substances | C | C |
| Cyclohexanone prewet solution | Filling rate | 50% by volume | 50% by volume |
| | Concentration of organic substances | 1.2 volume ppm | 1.2 volume ppm |
| | Lithography performance | B | B |
| | Number of objects to be counted in liquid | A | A |
| | Coating particles | C | C |
| | Evaluation of particle-like substances | C | C |
| PGMEA/PC prewet solution | Filling rate | 50% by volume | 50% by volume |
| | Concentration of organic substances | 1.2 volume ppm | 1.2 volume ppm |
| | Lithography performance | B | B |
| | Number of objects to be counted in liquid | A | A |
| | Coating particles | C | C |
| | Evaluation of particle-like substances | C | C |
| Butyl acetate developer | Filling rate | 50% by volume | 50% by volume |
| | Concentration of organic substances | 1.2 volume ppm | 1.2 volume ppm |
| | Lithography performance | B | B |
| | Number of objects to be counted in liquid | A | A |
| | Coating particles | C | C |
| | Evaluation of particle-like substances | C | C |

What is claimed is:

1. A container formed of a composition containing a polyolefin and at least one kind of metal component selected from the group consisting of Sn and Mo, wherein in a case where the composition contains one kind of metal component, provided that a region between a surface of the container and a position 10 nm below the surface in a thickness direction of the container is a surface region, a region between a position 30 μm below the surface in the thickness direction of the container and a position 50 μm below the surface in the thickness direction of the container is an internal region, the surface region and the internal region are measured using a time-of-flight secondary ion mass spectrometer, CA1 represents an intensity ratio of a peak intensity of secondary ions derived from the metal component in the surface region to a peak intensity of secondary ions derived from the polyolefin in the surface region in at least a portion of the container, and CA2 represents an intensity ratio of a peak intensity of secondary ions derived from the metal component in the internal region to a peak intensity of secondary ions derived from the polyolefin in the internal region in at least a portion of the container, a ratio RCA calculated by CA1/CA2 is less than 1.00, or in a case where the composition contains two or more kinds of metal components, an average of RCA determined for each of two or more kinds of the metal components is less than 1.00 in at least a portion of the container, and wherein the polyolefin is a high-density polyethylene and a molecular weight distribution of the high-density polyethylene is 2.0 to 6.0.

2. The container according to claim 1, wherein provided that CB1 represents an average of an intensity ratio of a peak intensity of secondary ions represented by $C_nH_{2n}^-$ to a peak intensity of secondary ions derived from the polyolefin measured in the surface region in at least a portion of the surface by using a time-of-flight secondary ion mass spectrometer, an intensity ratio of a peak intensity of secondary ions represented by $C_pH_{2p}COO-$ to a peak intensity of secondary ions derived from the polyolefin measured in the surface region in at least a portion of the surface by using a time-of-flight secondary ion mass spectrometer, and an intensity ratio of a peak intensity of secondary ions represented by $C_qH_{2q}PO_2-$ to a peak intensity of secondary ions derived from the polyolefin measured in the surface region in at least a portion of the surface by using a time-of-flight secondary ion mass spectrometer, and CB2 represents an average of an intensity ratio of a peak intensity of secondary ions represented by $C_nH_{2n}-$ to a peak intensity of secondary ions derived from the polyolefin measured in the internal region in at least a portion of the surface by using a time-of-flight secondary ion mass spectrometer, an intensity ratio of a peak intensity of secondary ions represented by $C_pH_{2p}COO-$ to a peak intensity of secondary ions derived from the polyolefin measured in the internal region in at least a portion of the surface by using a time-of-flight secondary ion mass spectrometer, and an intensity ratio of a peak intensity of secondary ions represented by $C_qH_{2q}PO_2-$ to a peak intensity of secondary ions derived from the polyolefin measured in the internal region in at least a portion of the surface by using a time-of-flight secondary ion mass spectrometer, a ratio RCB calculated by CB1/CB2 is less than 1.00, n is an integer of 12 to 20, p is an integer of 8 to 24, and q is an integer of 8 to 24.

3. A container formed of a composition containing a polyolefin and at least one kind of metal component selected from the group consisting of Ti, Al, Mg, Zr, Hf, Fe, Ni, Sn, Zn, Cr, and Mo, wherein in a case where the composition contains one kind of metal component, provided that a region between a surface of the container and a position 10 nm below the surface in a thickness direction of the container is a surface region, a region between a position 30 μm below the surface in the thickness direction of the container and a position 50 μm below the surface in the thickness direction of the container is an internal region, the surface region and the internal region are measured using a time-of-flight secondary ion mass spectrometer, CA1 represents an intensity ratio of a peak intensity of secondary ions derived from the metal component in the surface region to a peak intensity of secondary ions derived from the polyolefin in the surface region in at least a portion of the container, and CA2 represents an intensity ratio of a peak intensity of secondary ions derived from the metal component in the internal region to a peak intensity of secondary ions derived from the polyolefin in the internal region in at least a portion of the container, a ratio RCA calculated by CA1/CA2 is equal to or lower than 0.90, or in a case where the composition contains two or more kinds of metal components, an average of RCA determined for each of two or more kinds of the metal components is equal to or lower than 0.90 in at least a portion of the container, and wherein the polyolefin is a high-density polyethylene and a molecular weight distribution of the high-density polyethylene is 2.0 to 6.0.

4. A container formed of a composition containing a polyolefin and at least one kind of metal component selected from the group consisting of Ti, Al, Mg, Zr, Hf, Fe, Ni, Sn, Zn, Cr, and Mo, wherein in a case where the composition contains one kind of metal component, provided that a region between a surface of the container and a position 10 nm below the surface in a thickness direction of the container is a surface region, a region between a position 30 μm below the surface in the thickness direction of the container and a position 50 μm below the surface in the thickness direction of the container is an internal region, the surface region and the internal region are measured using a time-of-flight secondary ion mass spectrometer, CA1 represents an intensity ratio of a peak intensity of secondary ions derived from the metal component in the surface region to a peak intensity of secondary ions derived from the polyolefin in the surface region in at least a portion of the container, and CA2 represents an intensity ratio of a peak intensity of secondary ions derived from the metal component in the internal region to a peak intensity of secondary ions derived from the polyolefin in the internal region in at least a portion of the container, a ratio RCA calculated by CA1/CA2 is less than 1.00, or in a case where the composition contains two or more kinds of metal components, an average of RCA determined for each of two or more kinds of the metal components is less than 1.00 in at least a portion of the container wherein provided that CB1 represents an average of an intensity ratio of a peak intensity of secondary ions represented by $C_nH_{2n}^-$ to a peak intensity of secondary ions derived from the polyolefin measured in the surface region in at least a portion of the surface by using a time-of-flight secondary ion mass spectrometer, an intensity ratio of a peak intensity of secondary ions represented by $C_pH_{2p}COO-$ to a peak intensity of secondary ions derived from the polyolefin measured in the surface region in at least a portion of the surface by using a time-of-flight secondary ion mass spectrometer, and an intensity ratio of a peak intensity of secondary ions represented by $C_qH_{2q}PO_2-$ to a peak intensity of secondary ions derived from the polyolefin measured in the surface region in at least a portion of the surface by using a time-of-flight secondary ion mass spectrometer, and CB2 represents an average of an intensity ratio of a peak intensity of secondary ions represented by $C_nH_{2n}-$ to a peak intensity of secondary ions derived from the polyolefin measured in the internal region in at least a portion of the surface by using a time-of-flight secondary ion mass spectrometer, an intensity ratio of a peak intensity of secondary ions represented by $C_pH_{2p}COO-$ to a peak intensity of secondary ions derived from the polyolefin measured in the internal region in at least a portion of the surface by using a time-of-flight secondary ion mass spectrometer, and an intensity ratio of a peak intensity of secondary ions represented by $C_qH_{2q}PO_2-$ to a peak intensity of secondary ions derived from the polyolefin measured in the internal region in at least a portion of the surface by using a time-of-flight secondary ion mass spectrometer, a ratio RCB calculated by CB1/CB2 is less than 0.70, n is an integer of 12 to 20,
p is an integer of 8 to 24, and
q is an integer of 8 to 24, and
wherein the polyolefin is a high-density polyethylene and a molecular weight distribution of the high-density polyethylene is 2.0 to 6.0.

* * * * *